US008752582B2

(12) United States Patent
Spitzer

(10) Patent No.: US 8,752,582 B2
(45) Date of Patent: Jun. 17, 2014

(54) ALTERNATIVE STATE FLOW VALVE

(75) Inventor: Jeffrey J. Spitzer, San Diego, CA (US)

(73) Assignee: Aeromaster Innovations, Inc., San Diego, CA (US)

( * ) Notice: Subject to any disclaimer, the term of this patent is extended or adjusted under 35 U.S.C. 154(b) by 782 days.

(21) Appl. No.: 12/785,176

(22) Filed: May 21, 2010

(65) Prior Publication Data

US 2010/0276011 A1 Nov. 4, 2010

Related U.S. Application Data

(63) Continuation-in-part of application No. 12/435,271, filed on May 4, 2009.

(60) Provisional application No. 61/216,920, filed on May 22, 2009, provisional application No. 61/206,186, filed on Jan. 28, 2009.

(51) Int. Cl.
*B01D 17/12* (2006.01)

(52) U.S. Cl.
USPC ............... 137/624.18; 137/624.2; 137/627; 137/509; 137/624.13; 137/624.14; 137/119.08; 251/230; 251/54.77

(58) Field of Classification Search
USPC ............ 137/494, 497, 504, 505.13, 505.14, 137/505.46, 505.47, 460, 508, 514, 509, 137/627, 624.13, 624.14, 624.11, 119.8, 137/119.32, 624.18; 251/230, 54.77
See application file for complete search history.

(56) References Cited

U.S. PATENT DOCUMENTS

| 2,793,908 | A |   | 5/1957  | Carver          |            |
|-----------|---|---|---------|-----------------|------------|
| 3,018,788 | A |   | 1/1962  | Perlis          |            |
| 3,080,881 | A | * | 3/1963  | Stilwell et al. | 137/119.03 |
| 3,147,770 | A |   | 9/1964  | Perlis          |            |
| 3,220,695 | A |   | 11/1965 | Downey et al.   |            |
| 3,241,569 | A | * | 3/1966  | Brink et al.    | 137/624.13 |
| 3,519,016 | A |   | 7/1970  | Kah, Jr. et al. |            |
| 3,853,145 | A | * | 12/1974 | Judd            | 137/624.18 |
| 4,029,119 | A |   | 6/1977  | Klieves         |            |
| 4,051,767 | A |   | 10/1977 | Landsberg       |            |
| 4,092,995 | A |   | 6/1978  | Stubenruss      |            |
| 4,109,670 | A |   | 8/1978  | Slagel          |            |
| 4,116,216 | A |   | 9/1978  | Rosenberg       |            |
| 4,201,340 | A |   | 5/1980  | Georgiev et al. |            |
| 4,221,236 | A |   | 9/1980  | Rosenberg       |            |
| 4,262,879 | A |   | 4/1981  | Gonner          |            |
| 4,407,451 | A |   | 10/1983 | Hunter          |            |
| 4,546,787 | A |   | 10/1985 | Meyers et al.   |            |
| 4,561,343 | A |   | 12/1985 | Mummert         |            |

(Continued)

Primary Examiner — Jason Boeckmann
Assistant Examiner — Joel Zhou
(74) Attorney, Agent, or Firm — Lowe Graham Jones PLLC

(57) ABSTRACT

An improved sequencing fluid control valve comprising a housing having inlet and outlet ports, a valve seat disposed within the housing, a collapsible valve member disposed within the housing and forming a chamber and a bulb. A sequencing means disposed within the chamber that controls the axial motion of the valve member in response to application of fluid pressure at the inlet such that the motion of valve member alternates between an open free flowing state and a closed restricted flow state. Housing and valve member cooperate in the open position to provide an annular flow path that does not require the fluid flow direction to substantially change while flowing from inlet to outlet. Housing and valve member bulb cooperate in the closed position to form a circumferential seal to restrict the fluid flow. Alternative embodiments including viscous damping means and variations on the housing mount are described.

35 Claims, 45 Drawing Sheets

(56) References Cited

U.S. PATENT DOCUMENTS

| | | |
|---|---|---|
| 4,632,361 A | 12/1986 | Callison |
| 4,643,217 A | 2/1987 | Frentzel |
| 4,662,397 A | 5/1987 | Callison |
| 4,729,406 A * | 3/1988 | Frentzel .................... 137/624.14 |
| 4,790,512 A | 12/1988 | Lindsay |
| 4,821,996 A | 4/1989 | Bellotti et al. |
| 4,823,837 A | 4/1989 | Frentzel |
| 4,872,638 A | 10/1989 | Thompson et al. |
| 4,960,218 A | 10/1990 | Toida et al. |
| 5,003,771 A | 4/1991 | Kester et al. |
| 5,022,426 A | 6/1991 | Fischer |
| 5,086,852 A | 2/1992 | van Buskirk |
| 5,100,056 A | 3/1992 | Theodorsen et al. |
| 5,251,343 A | 10/1993 | Goettl |
| 5,609,178 A | 3/1997 | Hennig et al. |
| 5,687,815 A | 11/1997 | Antila et al. |
| 5,708,219 A | 1/1998 | Scheppers et al. |
| 5,878,953 A | 3/1999 | Coffman |
| 5,944,052 A | 8/1999 | Rashidi |
| 6,176,258 B1 | 1/2001 | Bernardi |
| 6,186,413 B1 | 2/2001 | Lawson |
| 6,286,765 B1 | 9/2001 | Byles |
| 6,495,034 B1 | 12/2002 | Schmidtke et al. |
| 6,622,933 B1 | 9/2003 | Young et al. |
| 6,702,138 B1 * | 3/2004 | Bielecki et al. ............ 220/254.9 |
| 6,755,204 B2 | 6/2004 | Herbert et al. |
| 6,899,285 B2 | 5/2005 | Goettl et al. |
| 6,932,277 B1 | 8/2005 | Ericksen et al. |
| 6,957,782 B2 | 10/2005 | Clark et al. |
| 7,040,840 B2 | 5/2006 | Zook |
| 7,073,678 B1 | 7/2006 | Dibdin et al. |
| 7,084,741 B2 | 8/2006 | Plummer |
| 7,156,322 B1 | 1/2007 | Heitzman |
| 7,246,635 B2 * | 7/2007 | Caleffi ...................... 137/514.3 |
| 2003/0164192 A1 | 9/2003 | Herbert et al. |
| 2007/0235559 A1 | 10/2007 | Miyake |

* cited by examiner

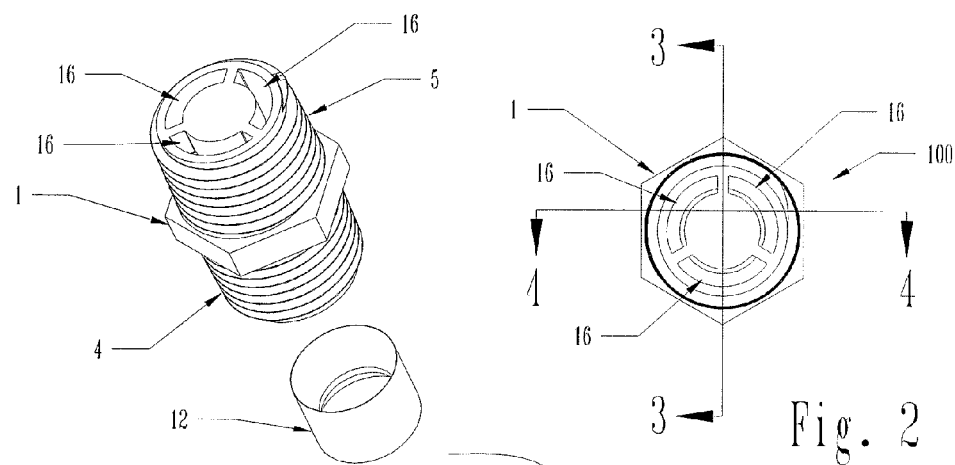
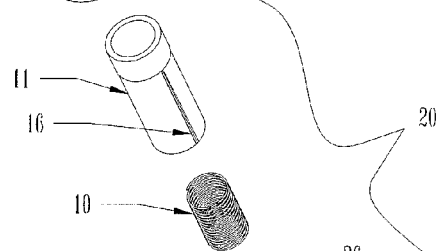
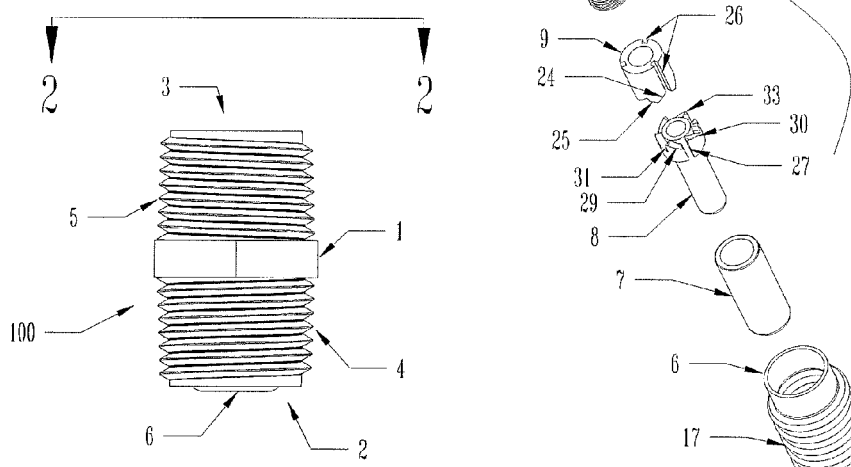

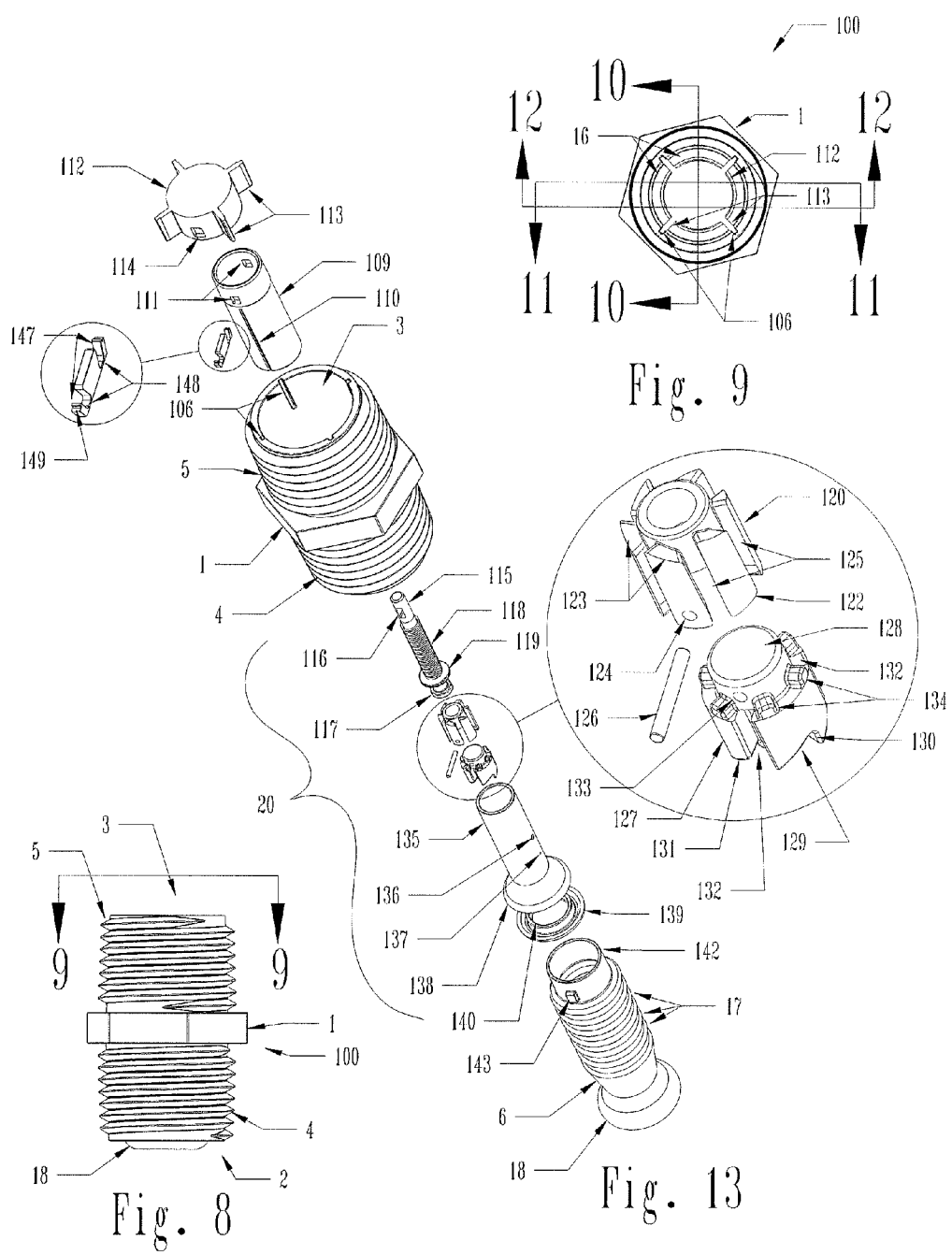

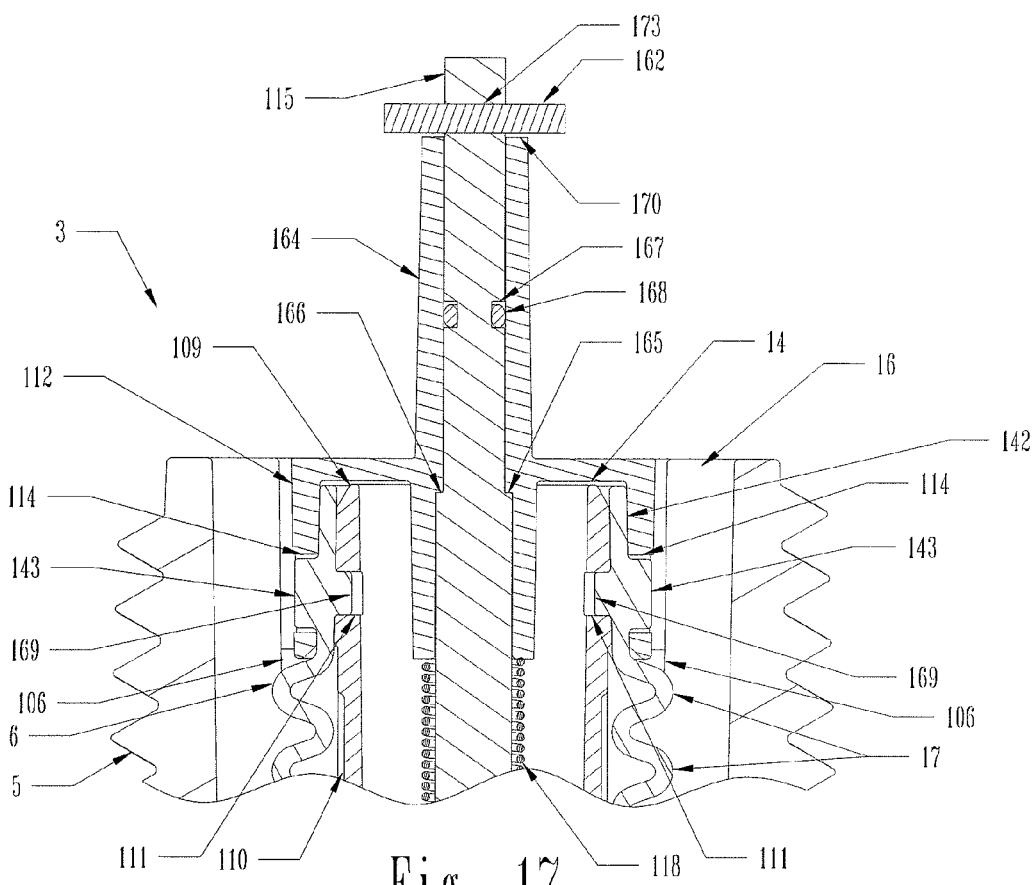
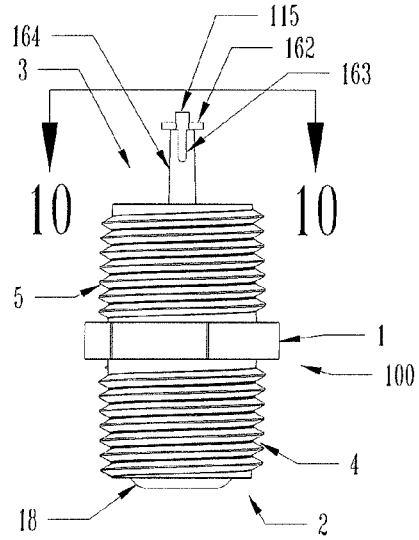
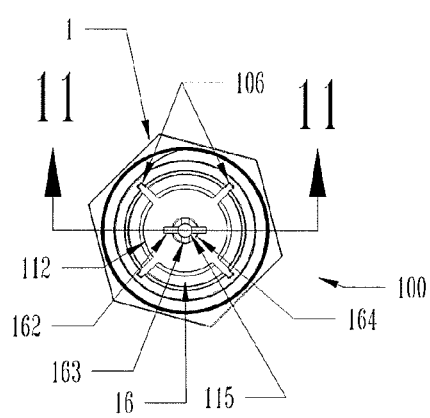
Fig. 17
Fig. 15
Fig. 16

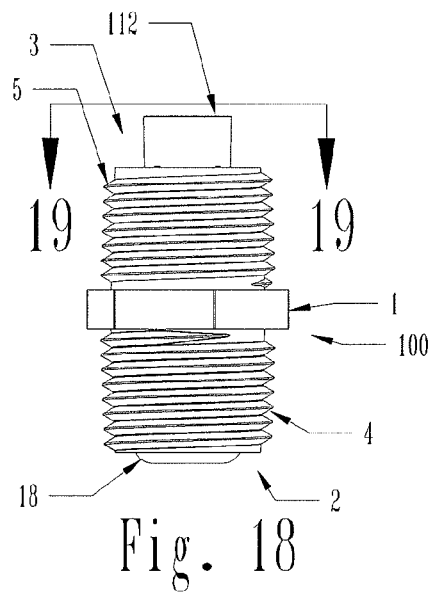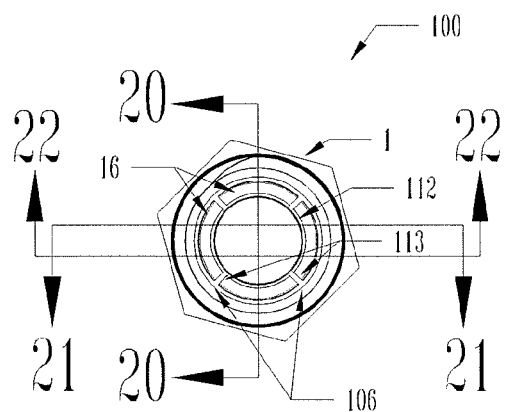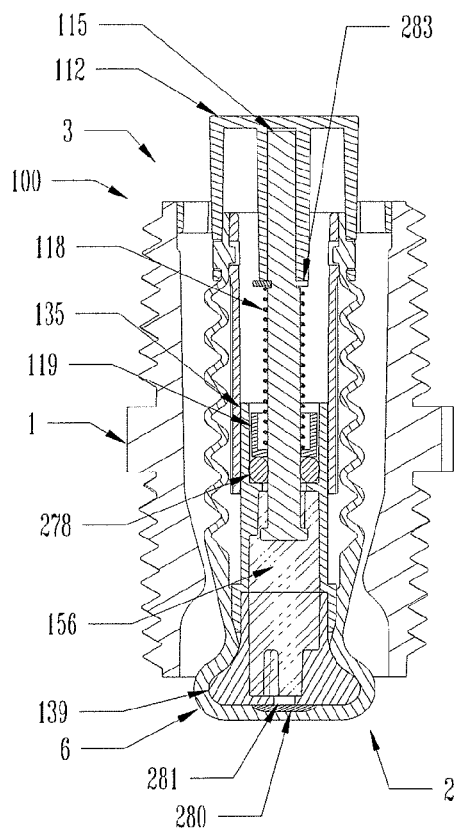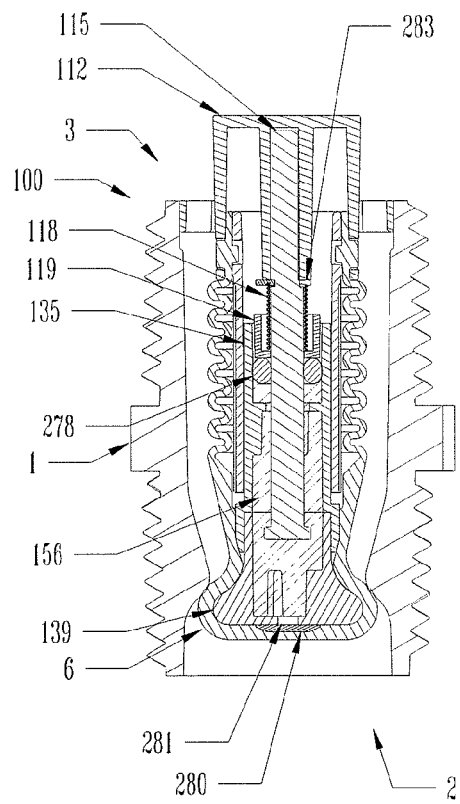
Fig. 18
Fig. 19
Fig. 20f
Fig. 20g

ALTERNATIVE STATE FLOW VALVE

PRIORITY CLAIM

This application is a Continuation-in-Part of U.S. application Ser. No. 12/435,271 filed on May 4, 2009, which application claims priority to U.S. Provisional Application No. 61/206,186, filed Jan. 28, 2009, and also claims priority to U.S. Provisional Application No. 61/216,920, filed May 22, 2009, the subject matter of which is incorporated herein in its entirety.

FIELD OF THE INVENTION

This invention relates generally to an improved valve configured to add new capability to fluid flow systems and, more specifically, to an improved valve that responds to periodic applications of pressure by alternating from a free flowing configuration to a restricted flow configuration.

BACKGROUND OF THE INVENTION

In many dry climates, distributed subterranean plumbing systems are used to supplement natural watering for landscape irrigation. These systems typically consist of one or more zonal fluid circuits each comprising a single control valve, a main supply conduit and a plurality of spray heads connected to the main supply conduit using a threaded adapter commonly called a nipple. In the majority of US residential and commercial ornamental applications, the nipple size is ½" NPT (National Pipe Thread) and has an internal dimension of approximately 0.55 inches and a minimum length of approximately 1.3 inches when the input and output threads are nearly touching at the midpoint. This shortest length is referred to as a "close nipple." Longer nipples are also available. The proper length nipple positions the spray head at the desired height for the particular spray head and main supply conduit depth. Adapters are available that allow a close nipple to be extended to any common length, thus making the close nipple a universally adaptable size. When the control valve is open, water flows from the source into the fluid circuit thus pressurizing the main supply conduit. The pressurized water then flows through the plurality of nipple adapters and emanates from the spray heads with velocity sufficient to propel the water through the air. By arranging the location of the spray heads and the direction of spray, large areas can be irrigated with relatively few spray heads.

The spray distance is determined by the elevation angle and velocity of the spray. The elevation angle is typically fixed by the spray head geometry. The velocity is directly related to the pressure in the circuit. The pressure is determined by an equilibrium condition between the supply capacity and the total usage of the spray heads. A problem arises when the equilibrium pressure is insufficient to provide adequate velocity. Inadequate velocity results in insufficient spray distance and thus inadequate water distribution. The inadequate pressure is caused by a mismatch in the system. Too many heads or heads that require high flow volume can over-burden the supply. Alternately, too much restriction or flow distance between the supply and flow heads can compromise the capability of the supply.

Once a distribution problem is recognized, the solution alternatives are very limited. The typical response is to add more heads to the circuit in an attempt to "fill-in" the areas where the existing heads do not adequately irrigate. This often fails to produce the desired results. The additional heads use more flow and thus reduce the equilibrium pressure. This results in additional loss of spray distance and thus introduces new distribution problems. Another alternative is to reduce the number of heads. This allows for higher equilibrium pressure and thus greater spray distance but distribution options are reduced. Two more difficult alternatives are to add a new circuit or improve the plumbing of the existing circuit. Both of these alternatives require digging up the landscape areas that are receiving insufficient irrigation. This fact, combined with high cost and excessive labor requirements, makes these alternatives unattractive.

Prior art has taught that a sequencing valve can be used to allow a fluid flow conduit to be subdivided such that the fluid selectively flows to the subdivided conduits without the need for additional activated control valves. The advantage of these sequencing valves is that a larger number of spray heads can be attached to the subdivided system without causing excessive flow demand.

The first known prior art was Carver, U.S. Pat. No. 2,793,908. Carver taught the method of using a sequencing valve associated with each spray head, said valve being sequenced between open and closed states by application and removal of pressure from the valve inlet port. Carver's valve contained design features which would have made it unreliable in service. The valve depended upon sliding seals that would be subject to wear. Such wear would lead to external leakage. The sliding seals were also in contact with the fluid passing through the valve. It is likely that impurities in the fluid would have caused frictional changes in the seals that would impede proper operation. The Carver valve was also very large compared to the normal flow conduit.

Perlis, U.S. Pat. No. 3,018,788 taught of an improved design that eliminated most of these problems. Perlis' valve was more compact and closely matched the existing conduit size. Perlis' valve also did not rely on sliding seals and avoided any possibility of external leakage due to wear. Perlis' valve had a critical flaw, however, wherein the pressure responsive piston relied upon a close fit within the valve body to prevent the fluid from passing the piston without actuating the valve. This valve would have been very sensitive to impurities such as dirt or grit which would become lodged between the piston and the housing thus rendering the valve nonfunctional. Perlis' improved valve, U.S. Pat. No. 3,147,770 re-arranged the sequencing and valve means to avoid the aforementioned contamination problem at the expense of increased size and addition of a sliding internal seal.

Henning, et at U.S. Pat. No. 5,609,178 taught of an alternative means to actuate the valve wherein a flow obstruction within the valve caused a differential pressure between the inlet and outlet ports that actuated the sequencing means. This method is undesirable because the design requires a predetermined flow rate to operate properly and necessarily causes a pressure loss as the fluid passes through.

Perhaps the most advanced prior art belongs to Sully et al, U.S. Pat. No. 3,241,569. In this example, the major problems related to sliding seals and contamination are fully eliminated. However, this design still has major shortcomings. It is large and complex and therefore cannot be retrofit into residential systems economically. It also requires the fluid to make two 90 degree turns through a passage that is relatively small compared to the inlet and outlet ports. While this arrangement is widely accepted in the art of flow control valves, it is also well known to cause a relatively large pressure loss when the fluid flow rate through the valve is high compared to the port size.

Other prior art failed to fully address all of the shortcomings described here. Examples include:

Kah, Jr. et al, U.S. Pat. No. 3,519,016
Judd, U.S. Pat. No. 3,853,145
Rosenberg, U.S. Pat. No. 4,116,216 and U.S. Pat. No. 4,221,236
Callison, U.S. Pat. No. 4,632,361 and U.S. Pat. No. 4,662,397
Fischer, U.S. Pat. No. 5,022,426
Young, et al, U.S. Pat. No. 6,622,933

All of the above referenced patents suffer from one or more of the following shortcomings: (1) The pressure responsive and/or sequencing means is exposed to the fluid flow and is therefore sensitive to impurities in the fluid; (2) The size and/or complexity does not allow for economical retrofit within existing residential systems; and (3) The fluid flow path contains abrupt changes of cross sectional area and/or direction that lead to large pressure losses for high fluid flow rates.

SUMMARY OF THE INVENTION

The present invention provides a sequencing valve that addresses these shortcomings. Specifically, the present invention provides a valve configured to operate with impurities in the fluid flow ranging in size from microscopic to objects as large as the conduit itself. The present invention provides a valve that has the same dimensions as an existing ½" NPT close nipple, making it universally adaptable to all typical residential and commercial ornamental applications. The present invention also provides a valve that can be manufactured for low cost such that an economic advantage can be realized when a plurality of valves are used instead of a major redesign of the main supply conduits. Finally, the present invention provides a valve having a highly efficient fluid flow path in the open state thus minimizing the fluid pressure drop for high flow rates.

Improvements to the invention further disclosed and claimed herein provide a more robust design of the aforementioned sequencing valve that tolerates variations in the supply pressure by providing a damped response that requires persistent pressure changes to effect a change of state. In addition, they provide a more convenient embodiment of the aforementioned sequencing valve where the instant state can be altered from the top of the valve thus eliminating the need to remove the valve to reset the sequence state.

BRIEF DESCRIPTION OF THE DRAWINGS

Preferred and alternative examples of the present invention are described in detail below with reference to the following drawings:

FIG. 1: Is an elevation view of the preferred embodiment.
FIG. 2: Is a plan view of the preferred embodiment as defined in FIG. 1.
FIG. 5: Is an exploded view of the preferred embodiment shown in FIGS. 1 through 4.
FIG. 8: Is an elevation view of a first alternate embodiment.
FIG. 9: Is a plan view of the first alternate embodiment as defined in FIG. 8.

FIG. 13: Is an exploded view of the first alternate embodiment shown in FIGS. 8 through 12.

FIG. 15: Is an elevation view of a second alternate embodiment showing the external sequence reset capability.

FIG. 16: Is a plan view of a second alternate embodiment as defined in FIG. 15.

FIG. 17: Is a partial section view of a second alternate embodiment as defined in FIG. 16 showing the relevant internal changes compared to the first alternate embodiment.

FIG. 18: Is an elevation view of a third alternate embodiment.

FIG. 19: Is a plan view of the third alternate embodiment as defined in FIG. 18.

FIG. 20f: Is a section view as defined in FIG. 19 through the third alternate embodiment with many parts removed to show the damping fluid in the first free state.

FIG. 20g: Is a section view as defined in FIG. 19 through the third alternate embodiment with many parts removed to show the damping fluid in the second closed state.

DETAILED DESCRIPTION OF THE PREFERRED EMBODIMENT

Figure 7:
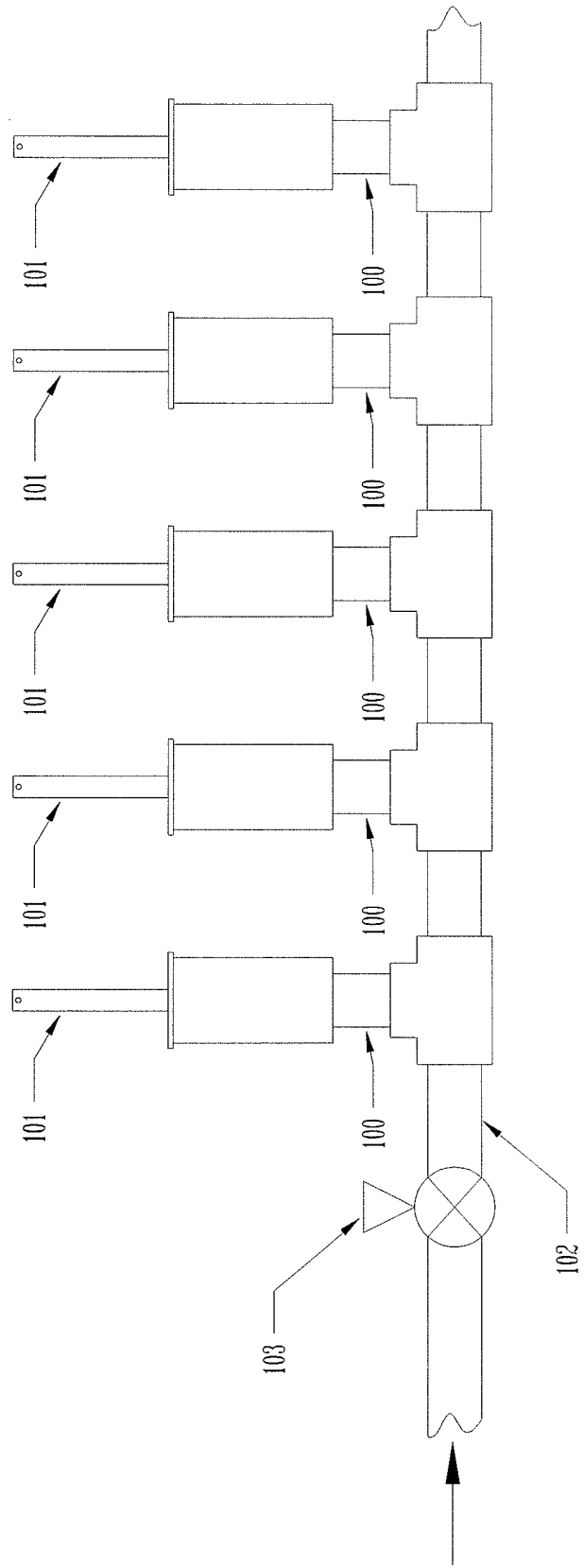
FIG. 7 is a schematic view showing the fluid flow apparatus installed in a typical irrigation system.

The present invention provides a low cost and convenient solution to the problem of improving irrigation sprinkler coverage. Referring to FIG. 7, the threaded pipe nipple that commonly attaches each spray head 101 to a main supply conduit 102 is replaced with an alternating fluid flow valve 100 (alternating fluid flow apparatus). Each time the main supply conduit 102 is pressurized, each valve 100 assumes either an open free flowing state or a closed non-flowing state. If half of the valves 100 are open and half of the valves 100 are closed, then the total usage of the spray heads is one half. This provides a higher pressure and thus better spray distance. Each time the pressure is removed and restored, the valves 100 change state. Thus, the valves 100 that were previously closed become open and vice versa. By simply pressurizing the main supply conduit 102 twice rather than once, all spray heads are activated with high pressure and adequate distribution is attained.

In most cases, an electronic controller actuates circuit supply valve 103. The electronic controller is simply reprogrammed to actuate the electronically controlled supply valve 103 twice as often. The energy required to actuate the alternating valves 100 is supplied by the main supply conduit 102 fluid pressure, thus no additional power source, plumbing or wiring is required. What follows is a description of the valve 100 and its operation followed by a very detailed description of an exemplary embodiment of the valve 100.

Several alternate embodiments of the valve 100 are also described that comprise improvements to the utility and reliability of the valve 100 as will be described later.

FIGS. 1-5 depict the fluid flow apparatus or valve 100 of the present invention. FIG. 1 depicts a side view of the valve 100 which has a fluid inlet end 2 and a fluid outlet end 3. The valve 100 includes a housing 1 which is further depicted with respect to FIG. 3A. The housing 1 includes a mounting cavity 14 which is utilized to mount a compressible valve 6 and a valve seat cavity 15 configured to receive a valve seat 12. In an alternative embodiment, the valve seat 12 is integrally molded as part of the housing 1.

Figure 3A:
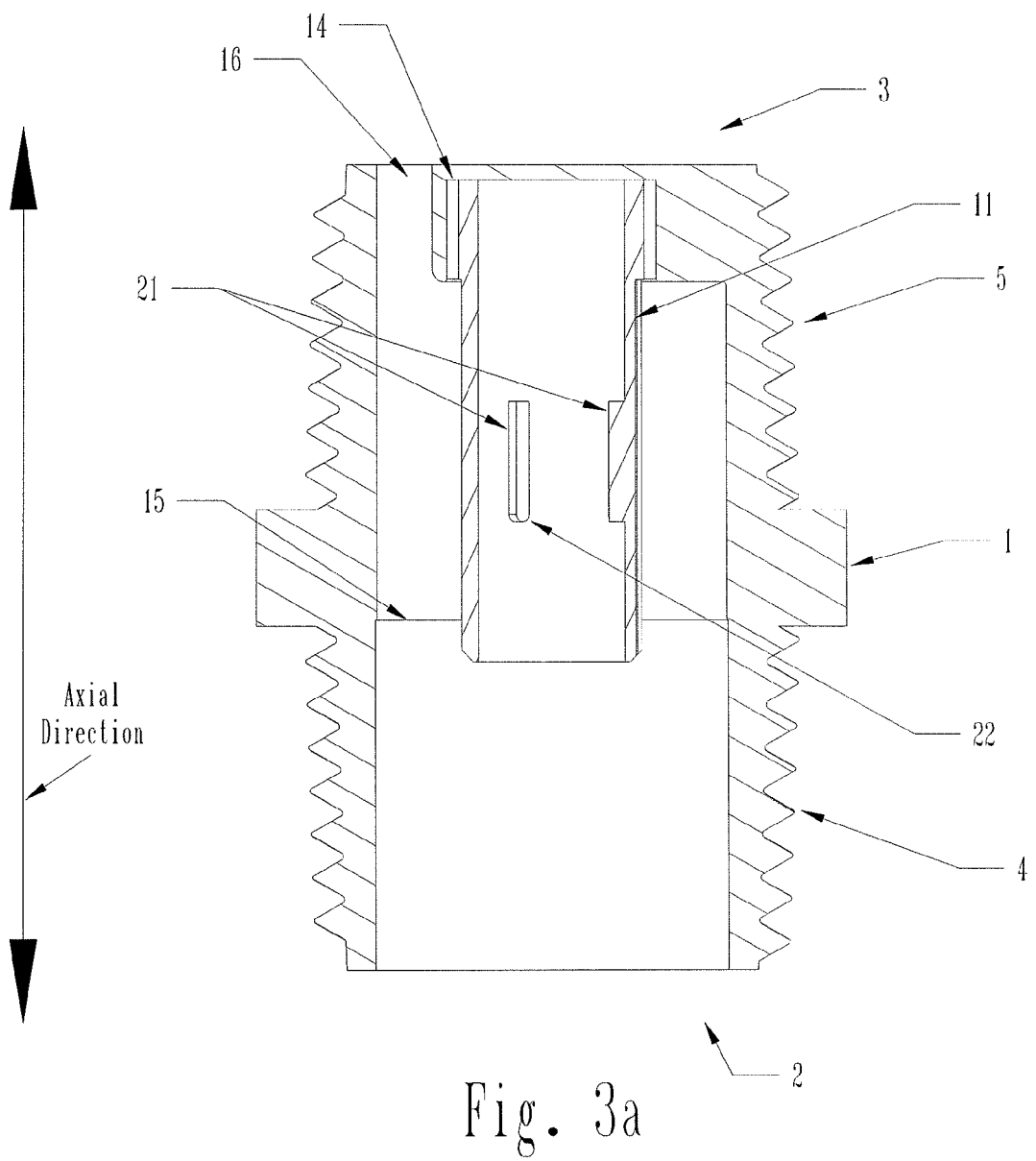
FIG. 3a: Is a section view as defined in FIG. 2 through the preferred embodiment with most parts removed to show the internal configuration of the main housing and switch housing.
Figure 3B:
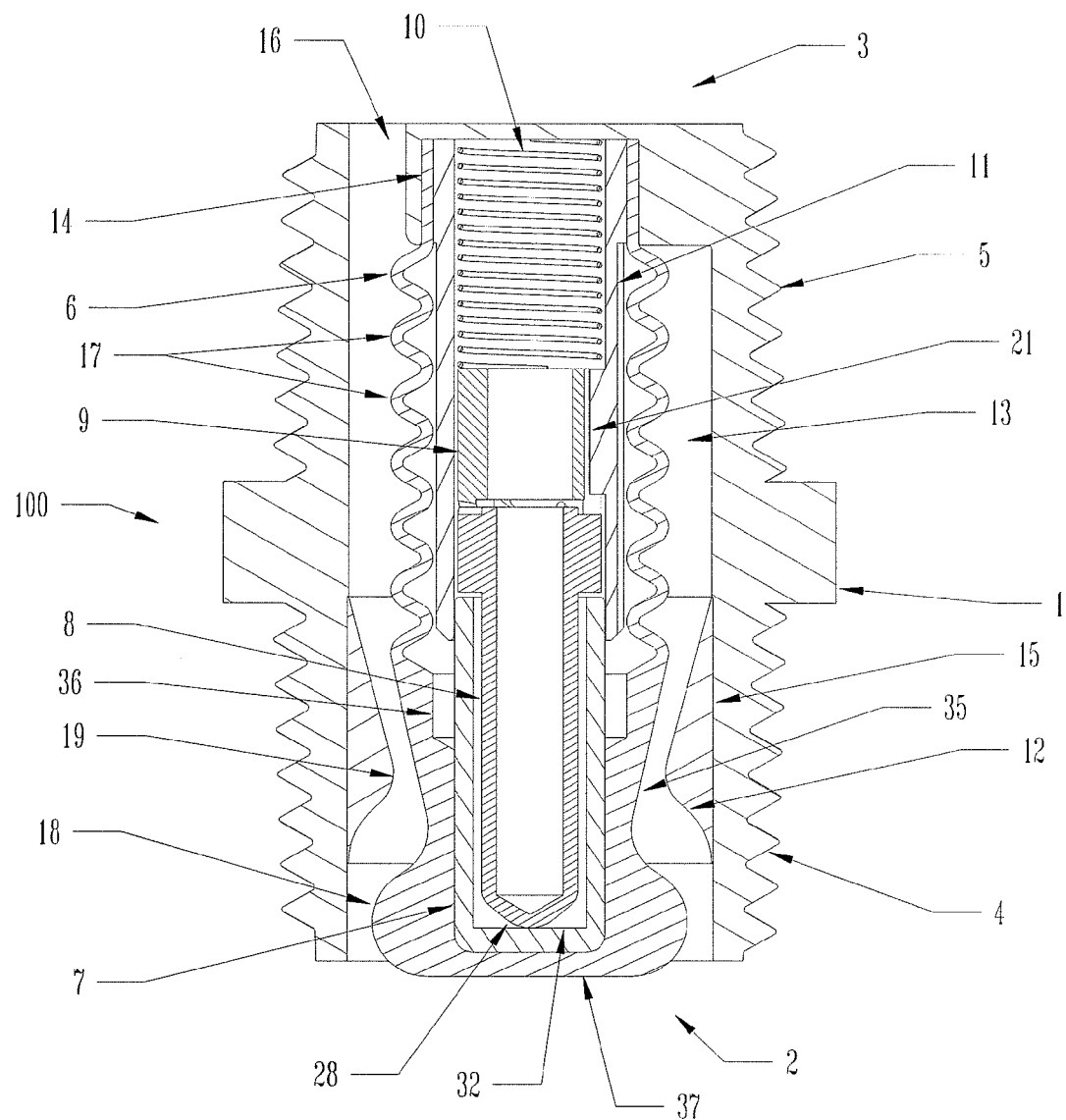
FIG. 3b: Is a section view as defined in FIG. 2 through the preferred embodiment showing the internal configuration in the first free state.

Referring to FIGS. 5 and 3b, the valve includes valve seat 12, a sequencing mechanism 20, and a compressible valve 6 all assembled into housing 1. Compressible valve 6 has an outer valve surface 35 that is configured to form a circumferential seal against valve seat 12 when the valve is in a closed state. In a preferred embodiment outer valve surface 35 includes a distal sealing surface or bulb 18 for sealing against valve seat 12. The outer valve surface 35 also includes undulations 17 that allow compressible valve 6 to compress and expand in an axial direction responsive to the fluid pressure supplied to the inlet. The axial direction is defined by the common axis that connects fluid inlet 2 and fluid outlet 3.

Sequencing mechanism 20 is positioned between a distal end 37 of compressible valve 6 and fluid outlet end 3. In a preferred embodiment, sequencing mechanism 20 is contained within a cavity or chamber defined by an inside surface 36 of compressible valve 6. This allows for a very compact design of apparatus 100 and protects sequencing mechanism 20 from getting jammed due to the introduction of particulates from fluid passing through apparatus 100. In one embodiment, the chamber is sealed by housing 1 proximate to the outlet end 3. In this embodiment a proximal end of compressible valve 6 seals to housing 1 proximate to outlet end 3.

Because compressible valve 6 protects and seals sequencing mechanism 20 from particles, compressible valve 6 provides a dual function of protecting sequencing mechanism 20 and providing bulb 18 for engaging valve seat 12 when apparatus 100 is in the closed state. Compressible valve 6 is configured to compress axially to allow bulb 18 to provide an open and closed state for valve 100. In the open state a spacing or annular fluid gap is provided between bulb 18 and valve seat 12. In the closed state bulb 18 provides a circumferential seal to valve seat 12.

Figure 6:
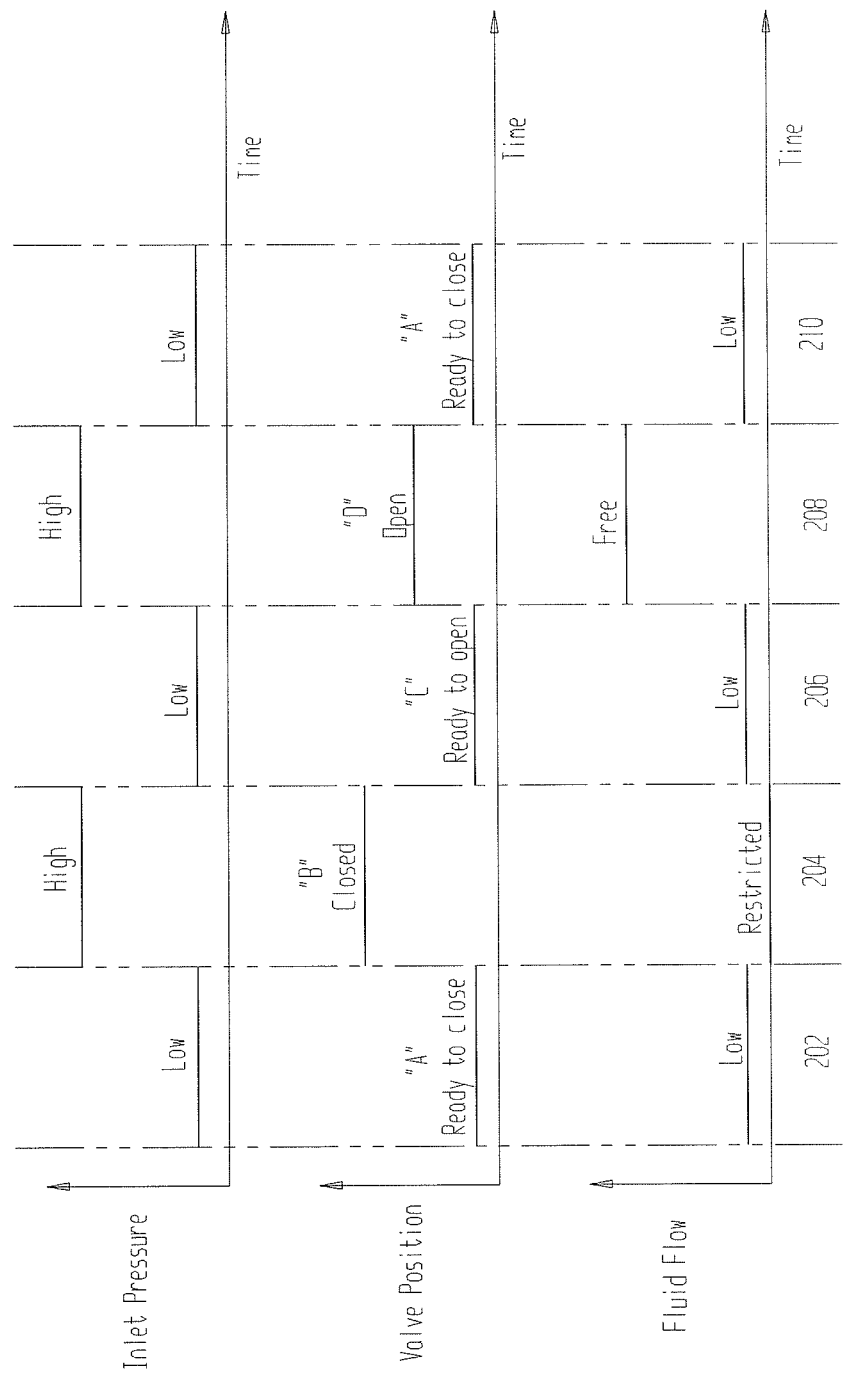
FIG. 6 is a state timing diagram for the use of fluid flow apparatus.

FIG. 6 in combination with FIGS. 3-4 depict operation of valve 100. FIG. 6 is a steady state timing diagram depicting fluid pressure applied to inlet 2 (top graph), the state of valve 100 (middle graph), and fluid flow between inlet and outlet (bottom graph) versus time (horizontal axis). This Figure depicts how sequencing mechanism 20 operates. Sequencing mechanism 20 comprises four states. The states are defined as A) un-pressurized (free state) and ready to close; B) closed; C) un-pressurized (free state) and ready to open and D) open.

Figure 4A:
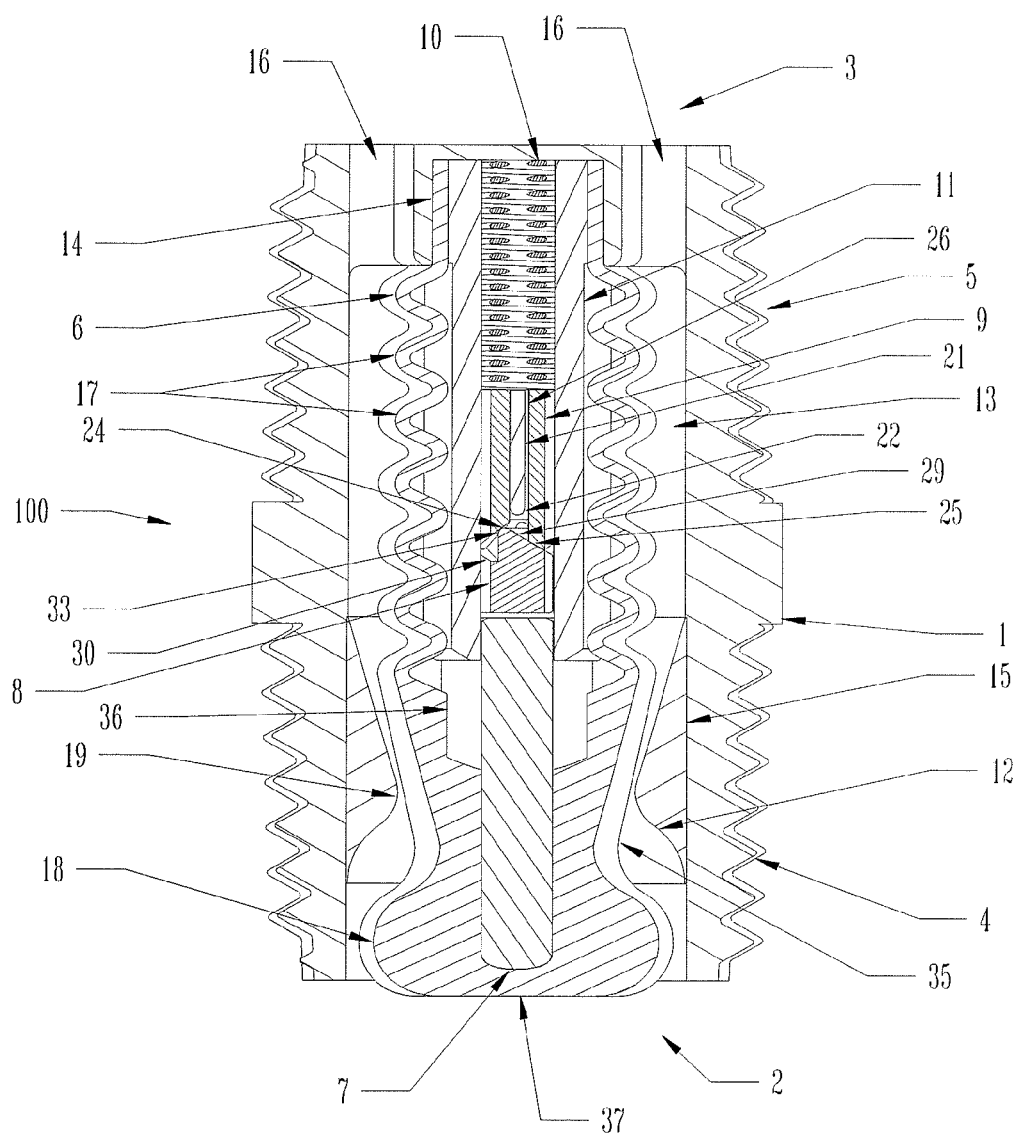
FIG. 4a: Is a section as defined in FIG. 2 through the preferred embodiment showing the sequencing mechanism details in the first free state.

According to time period 202 the fluid pressure applied to the inlet 2 (top graph) is low. The valve is in the ready to close state (middle graph). Fluid flow through the valve is low (bottom graph). FIG. 3b and FIG. 4a depict the valve in this state.

Figure 3C:
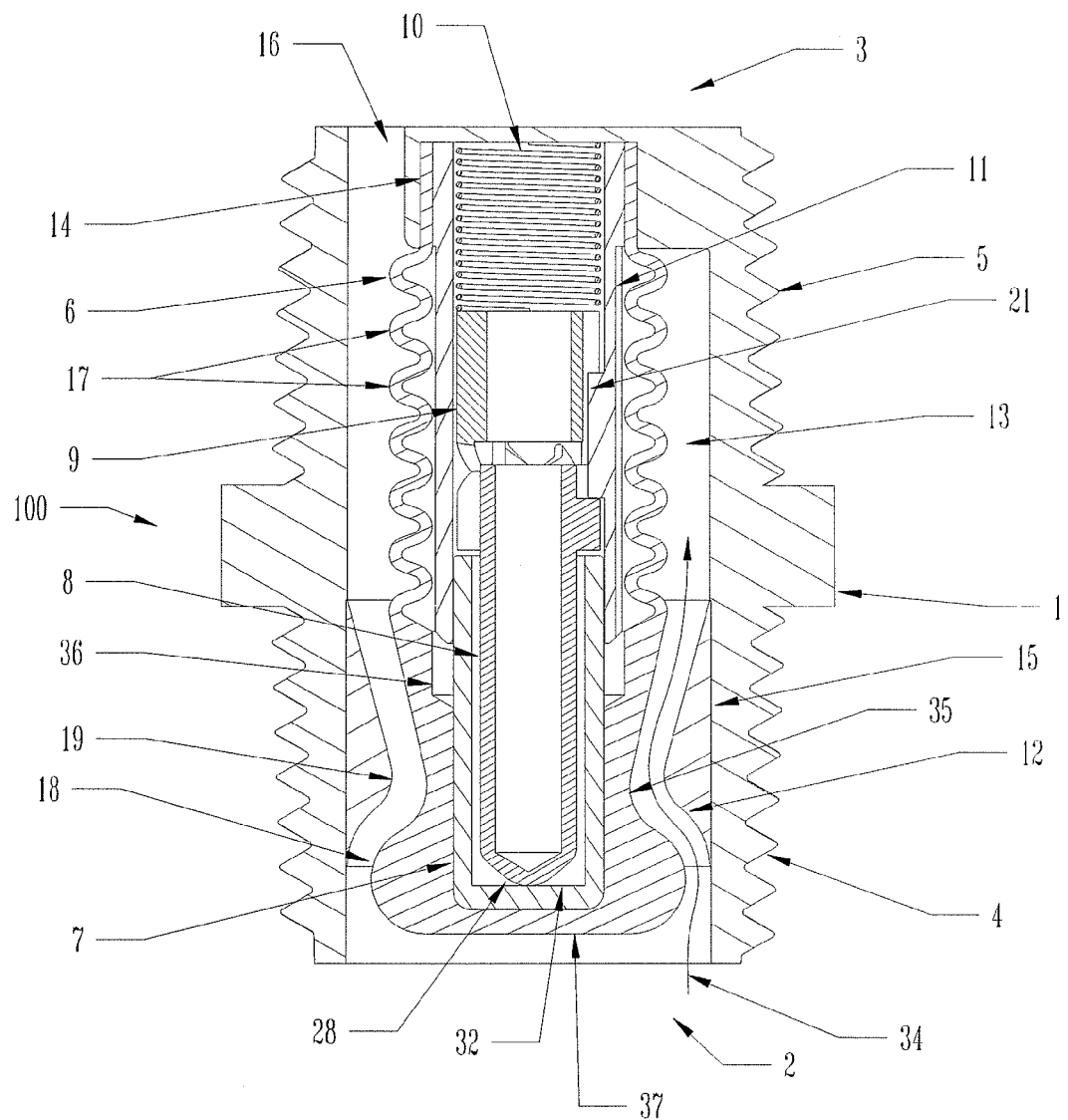
FIG. 3c: Is a section view as defined in FIG. 2 through the preferred embodiment showing the internal configuration in the fourth open state.
Figure 3D:
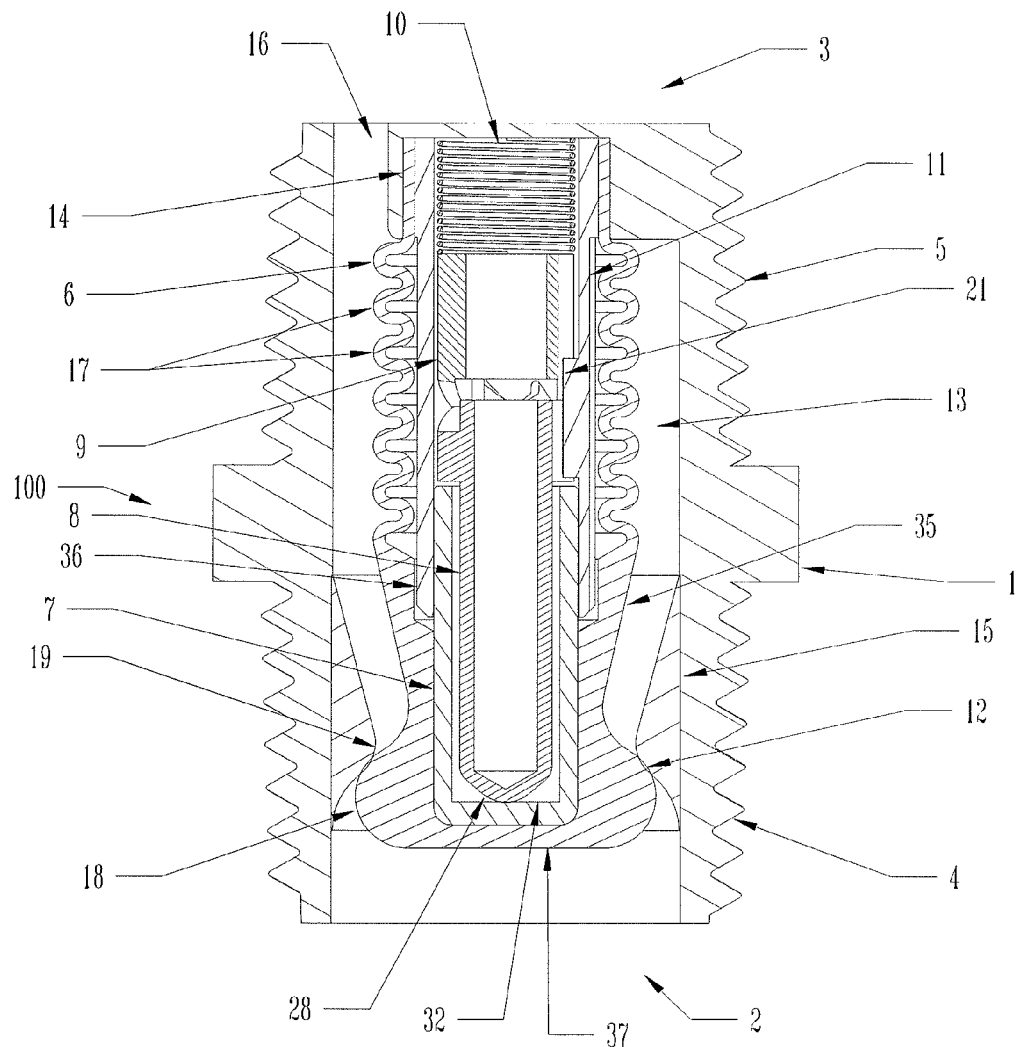
FIG. 3d: Is a section view as defined in FIG. 2 through the preferred embodiment showing the internal configuration in the second closed state.
Figure 4B:
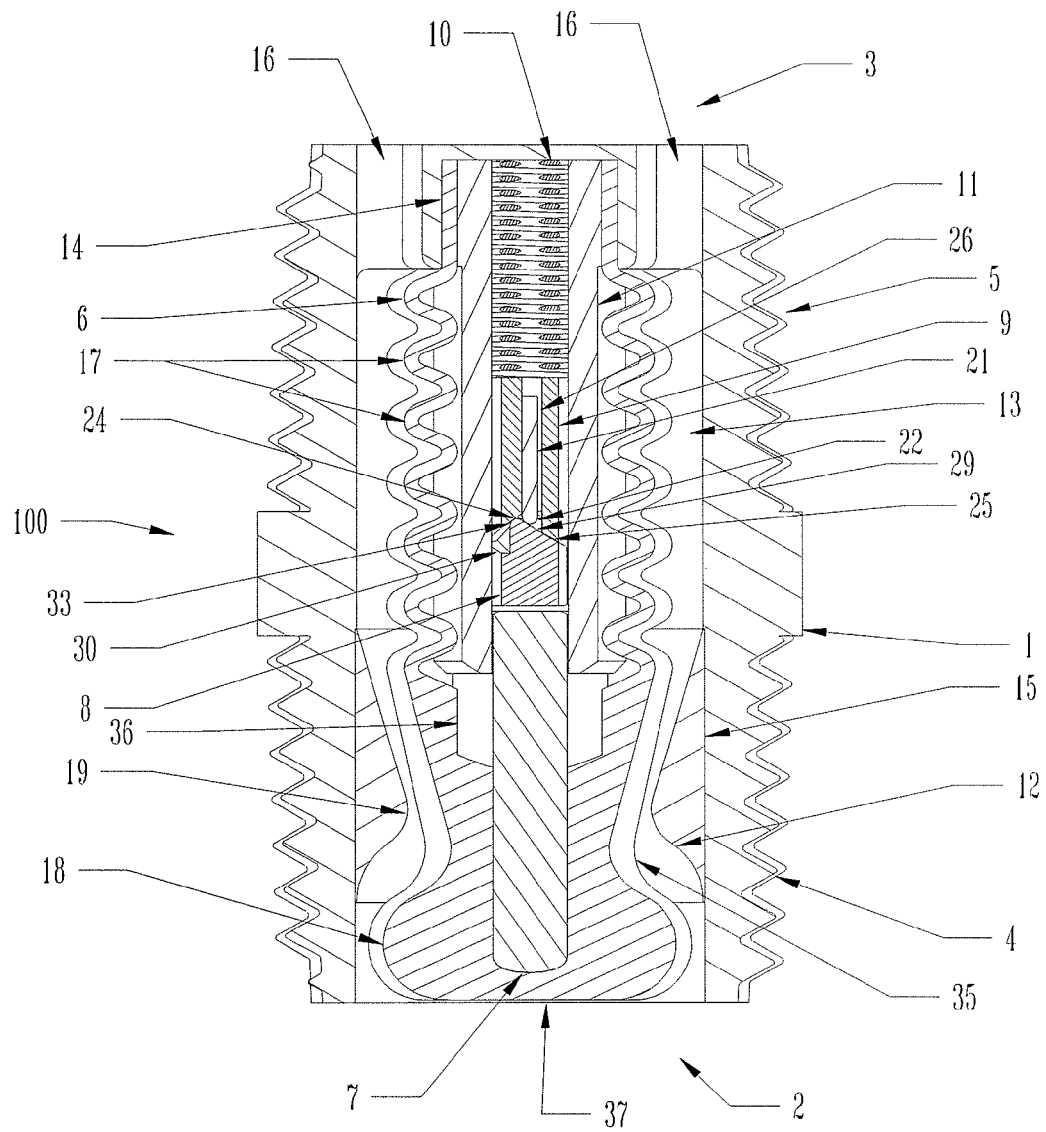
FIG. 4b: Is a section as defined in FIG. 2 through the preferred embodiment showing the sequencing mechanism details while moving from the first free state to the second closed state.

According to time period 204, the fluid pressure applied to the inlet 2 is high. The valve is in the closed state, and fluid flow through valve 100 is restricted. FIGS. 3d and 4b depict the valve 100 in this closed state. Since sequencing mechanism is in the second or closed state, bulb 18 now is allowed to move and to circumferentially seal against valve seat 12 according to FIG. 3d. This restricts or blocks fluid passage between fluid inlet 2 and outlet 3.

Figure 4C:
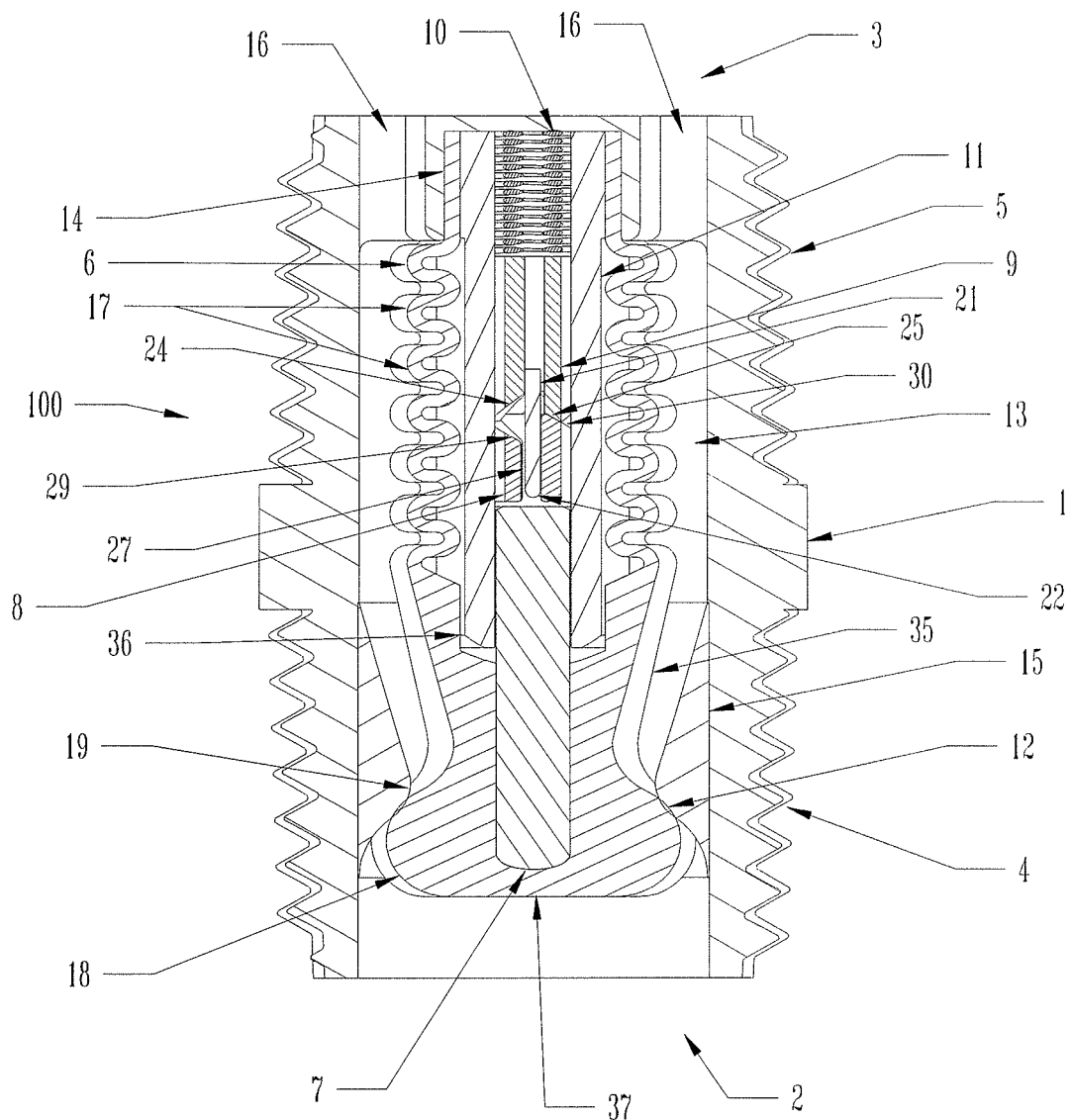
FIG. 4c: Is a section as defined in FIG. 2 through the preferred embodiment showing the sequencing mechanism details in the second closed state.
Figure 4D:
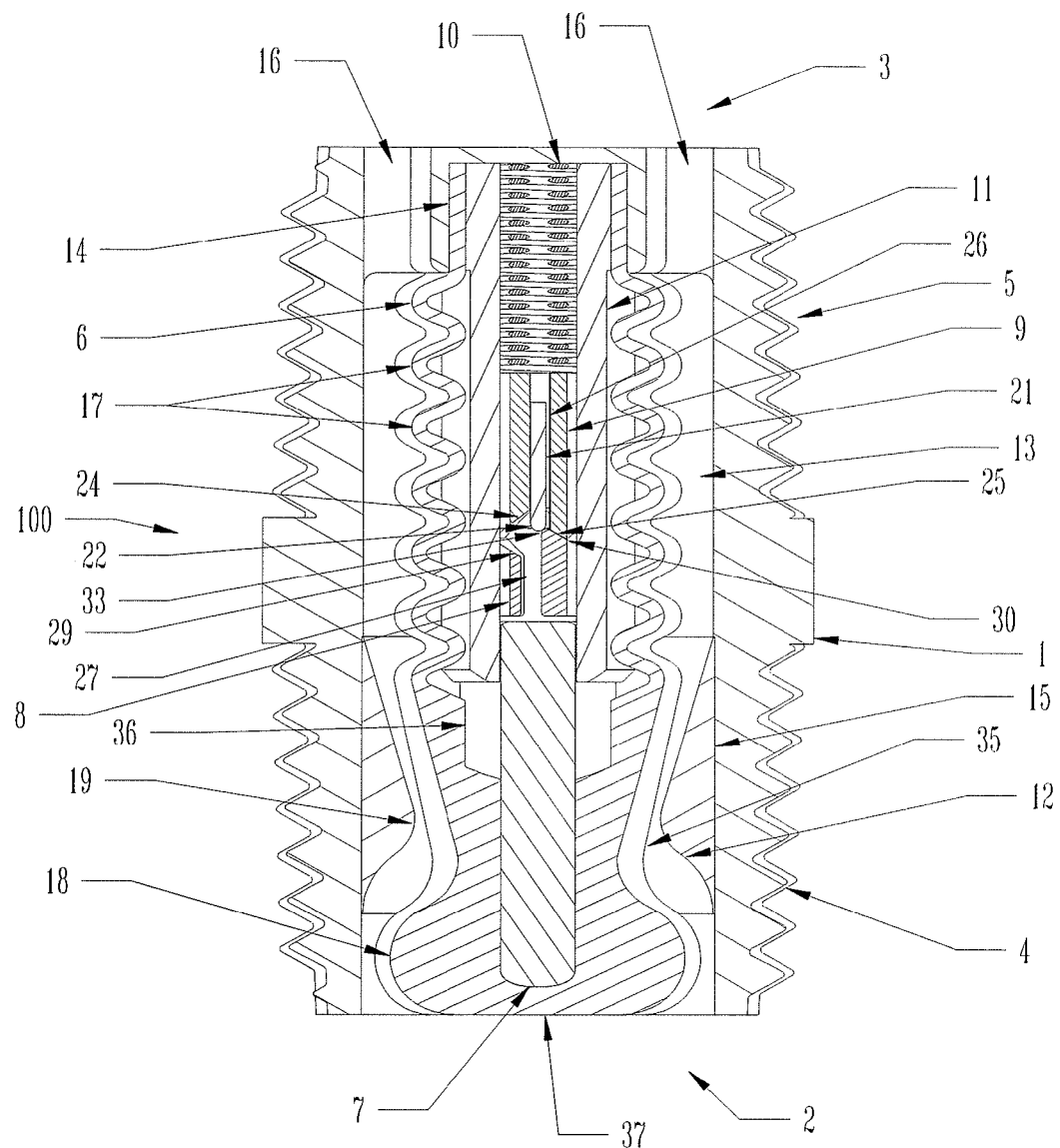
FIG. 4d: Is a section as defined in FIG. 2 through the preferred embodiment showing the sequencing mechanism details while moving from the second closed state to the third free state.

According to time period 206, high fluid pressure is no longer applied to inlet 2. This allows the valve and sequencing mechanism to move to the third, ready to open state. FIG. 4c depicts the valve 100 in this third state. Fluid flow through the valve is low.

According to a time period 208, the fluid pressure applied to the inlet 2 is once again high. The valve is in the open state, and fluid flow through valve 100 is free. Sequencing mechanism 20 is maintaining an open condition of valve 100 whereby a spacing or annular fluid gap is maintained between bulb 18 and valve seat 12. Further, the flow area along annular flow path 34 is substantially constant and the fluid is allowed to move in a substantially axial path to minimize pressure loss.

According to time period 210, high fluid pressure is no longer applied to inlet 2. Because sequencing mechanism is in the first or ready to close state, a fluid gap is maintained between bulb 18 and valve seat 12 so that fluid may flow through valve 100. Thus, valve 100 has the same state during time periods 202 and 210.

According to FIG. 6 sequencing mechanism 20 changes state in response to repeated pressure cycles. Sequencing mechanism 20 is configured to sequence fluid flow apparatus 100 between open and closed states in response to repeated pressure cycles or cycled pressure applied to inlet 2. During a closed or second state sequencing mechanism 20 is configured to allow outer surface or bulb 18 to seal against valve seat 12. During an open or fourth state sequencing mechanism 20 is configured to maintain a fluid gap or spacing between bulb 18 of compressible valve 6 and valve seat 12.

The timing diagram above is a state diagram in that it does not show transient factors. For example, in a transition from no flow to flowing states the fluid flow will tend to vary rapidly over time but this is not shown for illustrative simplicity. Now we turn to a more detailed description of the structure and operation of fluid flow apparatus 100 that includes additional details of the sequencing apparatus 20.

Referring to FIGS. 1 and 5, the preferred embodiment includes a substantially tubular main housing 1 comprising an input end 2 and an output end 3. In a preferred embodiment, input end 2 includes input thread 4 for installation into the supply plumbing. Alternatively, the main housing 1 may be integrally formed as part of an existing structure. Output end 3 includes output thread 5 for installation of the output plumbing. Referring to FIG. 3a, additional features of the main housing can be examined. Main housing 1 further comprises a main passage 13, a mounting cavity 14, a valve seat cavity 15, and at least one output passage 16. The purpose of each of these will be clarified in the following descriptions.

Referring now to FIG. 3b, a compressible valve 6 is fixedly installed and sealed in mounting cavity 14 thus forming a closed air vessel within compressible valve 6. Because the compressible valve 6 is a closed air vessel, application of an increasing uniform external pressure will tend to collapse the compressible valve 6, thus reducing the internal volume and increasing the internal pressure within valve 6. The compressible valve 6 is made from a semi-rigid material and further comprises undulations 17 and valve bulb 18. Because the compressible valve 6 is supported against collapse except for the undulations 17, application of an increasing uniform external pressure will collapse only the undulations 17 thus causing the valve bulb 18 to move axially away from the input end 2 and towards the output end 3.

A substantially tubular seal guide 7 is fixedly attached to the compressible valve 6 and comprises a closed end and seal guide bearing surface 32 proximate to the valve bulb 18. The seal guide 7 is slidably mounted in the switch housing 11 such that the collapsing of the compressible valve 6 is constrained to substantially axial movement. The distance traveled by the valve bulb 18 away from the input end 2 and towards the output end 3 is governed by a sequencing mechanism 20 well known to those skilled in the art of retractable pen design.

Referring to FIG. 5 and FIG. 3b, sequencing mechanism 20 comprises a substantially tubular switch housing 11, a spinner 9, a switch 8, and a compression spring 10. Switch housing 11 further comprises at least one elongate protrusion 21 from the inner surface with rounded first end 22 and substantially aligned with the tubular axis as shown in FIG. 3a. Switch housing 11 also comprises at least one vent slot 23 on the outer surface and substantially aligned with the tubular axis to allow the air pressure to equalize in each undulation 17 cavity and the remaining volume within the compressible seal 6 as shown in FIG. 5. Substantially tubular spinner 9 comprises at least one elongate groove 26 and at least one first helical spinner surface 24 that intersects the elongate groove 26 and at least one second helical spinner surface 25. Spinner is slidably mounted in switch housing 11 with elongate groove 26 engaged upon elongate protrusion 21 such that rotation of the spinner 9 about the tubular axis is constrained at all axial positions. Substantially tubular switch 8 is slidably mounted in switch housing 11 and comprises at least one switch slot 27 sized to engage elongate protrusion 21 when axially positioned coincident with elongate protrusion 21. When the switch 8 is axially positioned such that the switch slot 27 does not engage elongate protrusion 21, the switch is free to rotate about the tubular axis. Switch further comprises rounded end 28 such that the friction of rotation while bearing upon seal guide bearing surface 22 is minimized as shown in FIG. 3*b*. Referring again to FIG. 5, switch 8 further comprises at least one first helical switch surface 29 which intersects switch slot 27 and at least one second helical switch surface 30 which terminates into a substantially axial wall 31. First helical switch surface 29 and second helical switch surface 30 comprise a switch rounded bearing surface 33. Compression spring 10 is slidably installed in switch housing 11 and provides a light and continuous bias upon the spinner 9 away from the output end 3 of the main housing 1. The compression spring 10 bias further causes spinner 9 to be biased against switch 8 which is in turn biased against seal guide bearing surface 22 thus biasing valve bulb 18 toward the input end 2 as shown in FIG. 3*b*.

The net force acting upon the valve bulb 18 is determined by a force balance between the fluid pressure applied to the outside of the compressible valve 6, the internal pressure trapped within the compressible valve 6, the natural restoring force of the flexible undulations 17 and the force exerted by compression spring 10. In the absence of sufficient external pressure to overcome the aforementioned restoring forces, the valve bulb will be axially positioned in the free state shown in FIG. 3*b*, FIG. 4*a* and FIG. 4*e*.

Fixedly attached within valve seat cavity 15 is a valve seat 12 that has a throat diameter 19 smaller than the diameter of the valve bulb 18. Therefore, when compressible valve 6 moves toward the output end 3, the valve bulb 18 contacts valve seat 12 around a circular perimeter and the flow of fluid from the input end 2 towards the output end 3 is restricted. This is referred to as the closed position and is shown in FIG. 3*d* and FIG. 4*c*. When the increased external pressure is removed, the compressible valve will return to its free state.

Figure 4E:
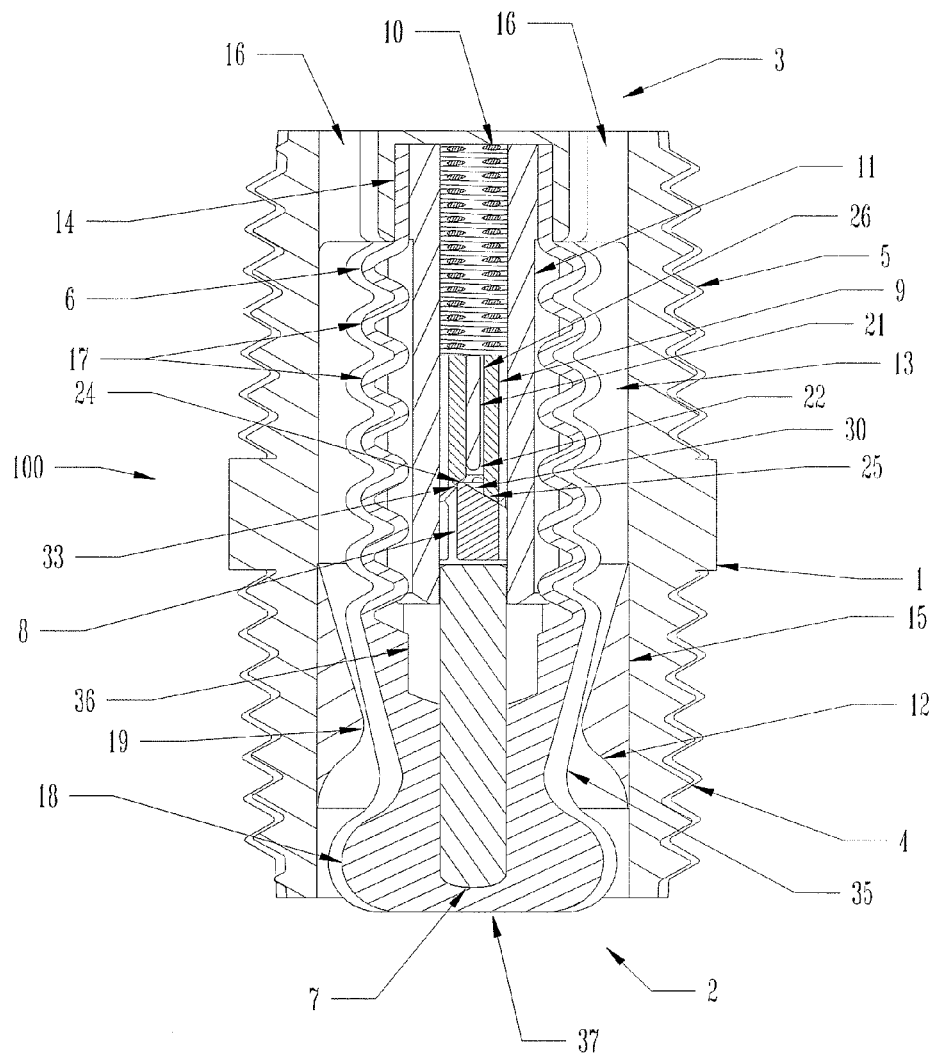
FIG. 4e: Is a section as defined in FIG. 2 through the preferred embodiment showing the sequencing mechanism details in the third free state.

In the absence of sufficient external pressure, the sequencing mechanism 20 will either be in a first free state as shown in FIG. 4*a* or in the third free state as shown in FIG. 4*e*. The sequencing of the mechanism described here assumes that the sequencing mechanism 20 starts from first free state as shown in FIG. 4*a*. When sufficient external pressure is applied to overcome the restoring forces, the valve bulb 18 of compressible valve 6 will begin to move away from the input end 2 and towards the output end 3. Motion of the valve bulb will push the switch 8 and spinner 9 and compress compression spring 10. Purely axial motion of the sequencing mechanism will continue until first helical switch surface 29 makes contact with rounded first end 22 of elongate protrusion 21 as shown in FIG. 4*b*. As switch 8 continues to move toward the output end 3, the first helical switch surface 29 bearing against the rounded first end 22 of elongate protrusion 21 causes the switch 8 to follow a helical path. The rotation of switch 8 compared to the non-rotating spinner 9 causes the switch rounded bearing surface 33 to bear against the first helical spinner surface 24 thus pushing the spinner towards the output end 3. If the external pressure is sufficient to overcome the restoring forces, the sequencing mechanism 20 will continue to move axially away from the input end 2 and the switch slot 27 will engage elongate protrusion 21 as shown in FIG. 4*c*. The axial motion will stop when valve bulb 18 contacts valve seat 12. In this position, the flow of fluid from the input end 2 to the output end 3 is restricted and the valve is in the second "closed" state as shown in FIG. 4*c* and FIG. 3*d*.

When the external fluid pressure is sufficiently reduced, the net restoring forces will cause compressible valve 6 to begin to move away from the output end 3 and towards the input end 2. Bias from compression spring 10 acting upon spinner 9 forces second helical spinner surface 25 to bear against first helical switch surface 29 and second helical switch surface 30. This bias force would tend to rotate switch 8 if not for switch slot 27 being engaged upon elongate protrusion 21. When the compressible valve 6 has moved to the position shown in FIG. 4*d*, switch slot 27 disengages elongate protrusion 21 and switch 8 rotates as helical spinner surface 25 slides along first helical switch surface 29 and second helical switch surface 30. The rotation of switch 8 is limited when rounded bearing surface 33 contacts first helical spinner surface 24. When the fluid pressure is sufficiently reduced, the compressible valve 6 and sequencing mechanism 20 will come to rest at a third free state as shown in FIG. 4*e*.

Figure 4F:
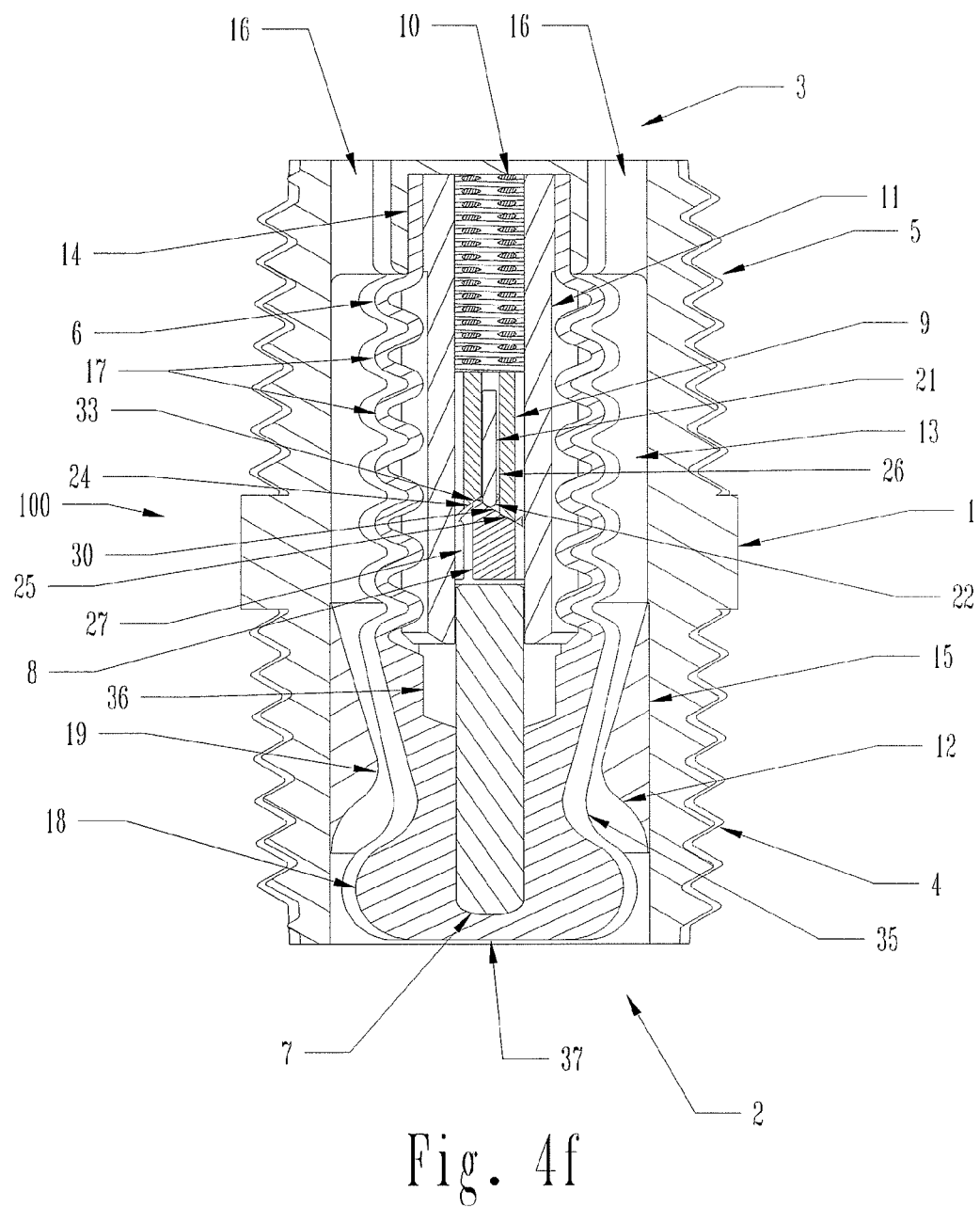
FIG. 4f: Is a section as defined in FIG. 2 through the preferred embodiment showing the sequencing mechanism details while moving from third free state to the fourth open state.
Figure 4G:
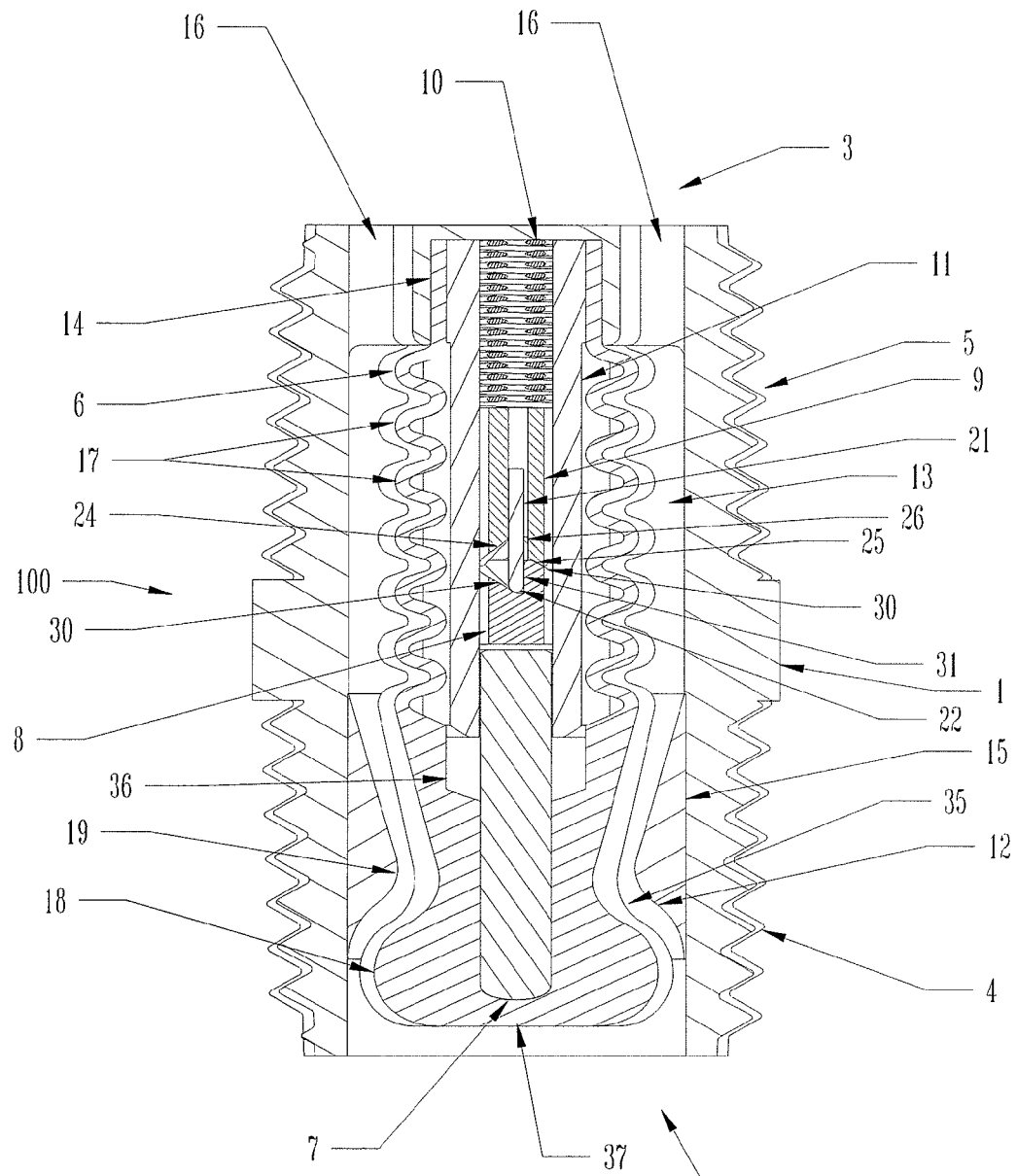
FIG. 4g: Is a section as defined in FIG. 2 through the preferred embodiment showing the sequencing mechanism details in the fourth open state.
Figure 4H:
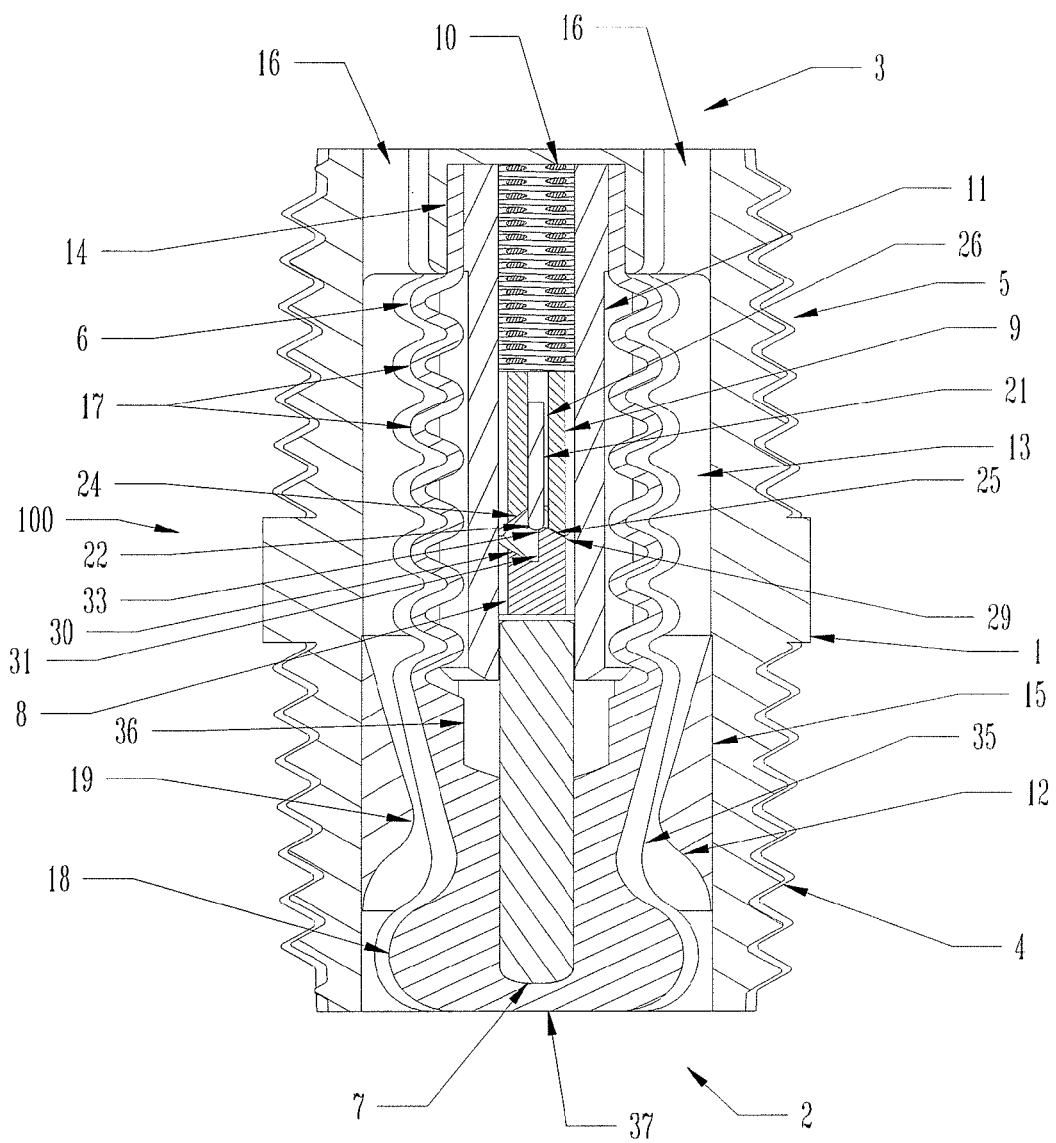
FIG. 4h: Is a section as defined in FIG. 2 through the preferred embodiment showing the sequencing mechanism details while moving from the fourth open state to the first free state.

When sufficient external pressure is applied to overcome the restoring forces for a second time, the valve bulb 18 of compressible valve 6 will begin to move away from the input end 2 and towards the output end 3 as before. Purely axial motion of the sequencing mechanism will continue until second helical switch surface 30 makes contact with rounded first end 22 of elongate protrusion 21 as shown in FIG. 4*f*. As switch 8 continues to move toward the output end 3, the second helical switch surface 30 bearing against the rounded first end 22 of elongate protrusion 21 causes the switch 8 to follow a helical path. The rotation of switch 8 compared to the non-rotating spinner 9 causes the switch rounded bearing surface 33 to bear against the first helical spinner surface 24 thus pushing the spinner towards the output end 3. If the external pressure is sufficient to overcome the restoring forces, the switch 8 will continue to follow the helical path of second helical switch surface 30 until the axial wall 31 engages elongate protrusion 21 as shown in FIG. 4*g*. In this fourth "open" state the valve bulb 18 is favorably positioned within such that fluid can flow substantially un-restricted from the input end 2 through the throat diameter 19, main passage 13, and output passage 16 to the output end 3. This open state flow path 34 is best illustrated in FIG. 3*c*.

When the external fluid pressure is sufficiently reduced, the net restoring forces will cause compressible valve 6 to begin to move away from the output end 3 and towards the input end 2 as before. Bias from compression spring 10 acting upon spinner 9 forces second helical spinner surface 25 to bear against first helical switch surface 29 and second helical switch surface 30. This bias force would tend to rotate switch 8 if not for axial wall 31 being engaged upon elongate protrusion 21. When the compressible valve 6 has moved to the position shown in FIG. 4*h*, axial wall 31 disengages elongate protrusion 21 and switch 8 rotates as helical spinner surface 25 slides along first helical switch surface 29 and second helical switch surface 30. The rotation of switch 8 is limited when rounded bearing surface 33 contacts first helical spinner surface 24. When the fluid pressure is sufficiently reduced, the compressible valve 6 and sequencing mechanism 20 will come to rest at the first free state as shown in FIG. 4*a*.

The above described sequence thus repeats indefinitely for each application and removal of external pressure with the pressurized valve state alternating between a closed state and an open state.

An important feature of the present invention is the fact that the motion of compressible valve 6 does not rely upon a pressure differential between the input end 2 and the output end 3. The closed air vessel formed by compressible valve 6 provides a pressure reference for the actuation force. As such, the valve can be designed for the minimum possible pressure loss between the input end 2 and output end 3 thus maximizing the pressure available for spray velocity. The preferred embodiment results in the most compact unit and provides a good compromise between physical size and pressure loss through the valve in the free flow state.

FIGS. 8-13 depict a first alternate embodiment of fluid flow apparatus 100 of the present invention. FIGS. 15-17 depict a second alternate embodiment discussed later. Starting with the first alternate embodiment, FIG. 8 depicts a side view of the fluid flow apparatus 100 which has a fluid inlet end 2 and a fluid outlet end 3. The fluid flow apparatus 100 includes a housing 1 which is further depicted with respect to FIG. 9a. The housing 1 includes a mounting cavity 14 which is utilized to mount a compressible valve 6 and a valve seat 12.

Sequencing mechanism 20 is positioned between a distal end 37 of compressible valve 6 and fluid outlet end 3. In alternate embodiments, the chamber is sealed by mount 112 proximate to the outlet end 3.

Figure 14:
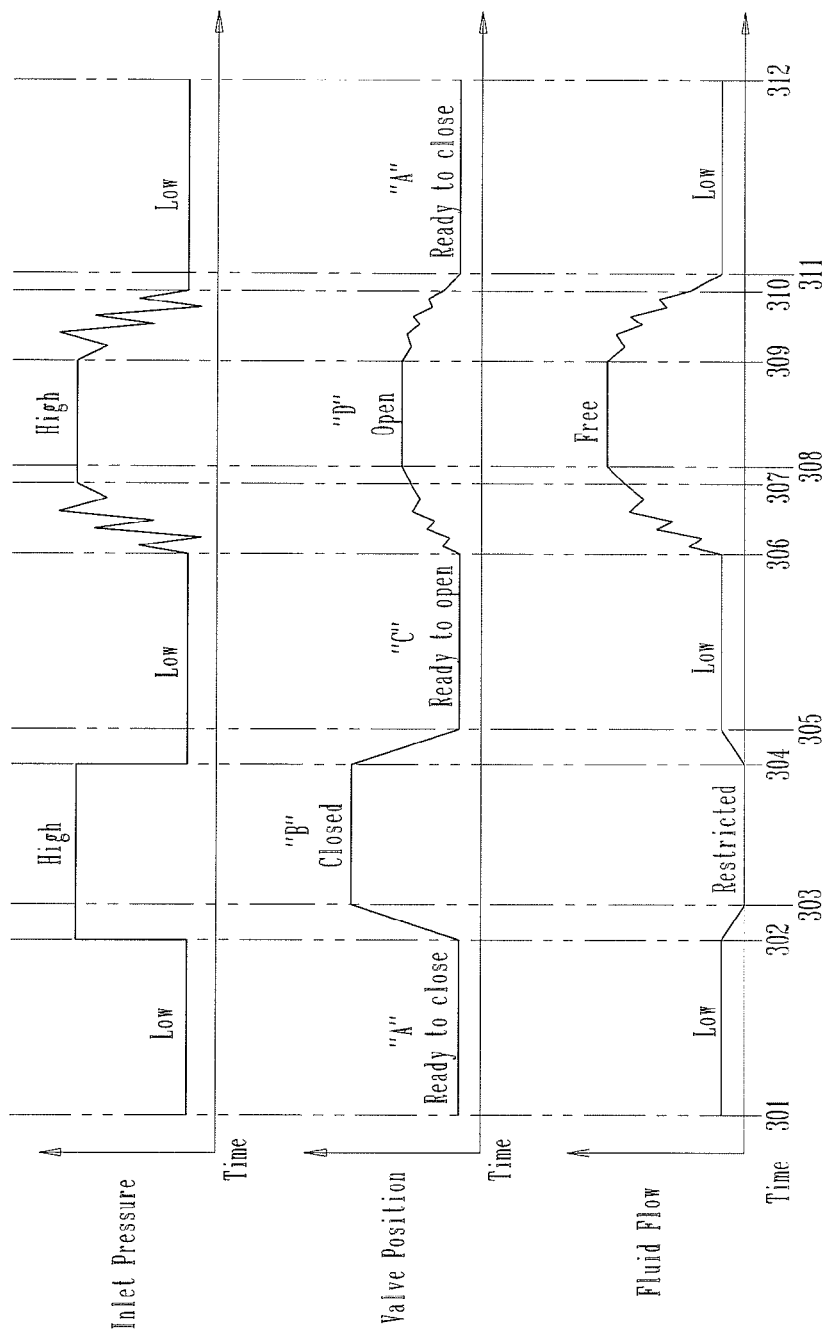
FIG. 14 is a state timing diagram for the use of the first alternate embodiment of the fluid flow apparatus.

FIG. 14 in combination with FIGS. 10-12 depict operation the first alternate embodiment of fluid flow apparatus 100. FIG. 14 is a timing diagram depicting fluid pressure applied to inlet 2 (top graph), the state of fluid flow apparatus 100 (middle graph), and fluid flow between inlet 2 and outlet 3 (bottom graph) versus time (horizontal axis). This Figure depicts how sequencing mechanism 20 operates in an alternate embodiment that includes pressure fluctuations during change of state. Sequencing mechanism 20 comprises four states. The states are defined as A) un-pressurized (free state) and ready to close; B) closed; C) un-pressurized (free state) and ready to open and D) open.

Figure 11A:
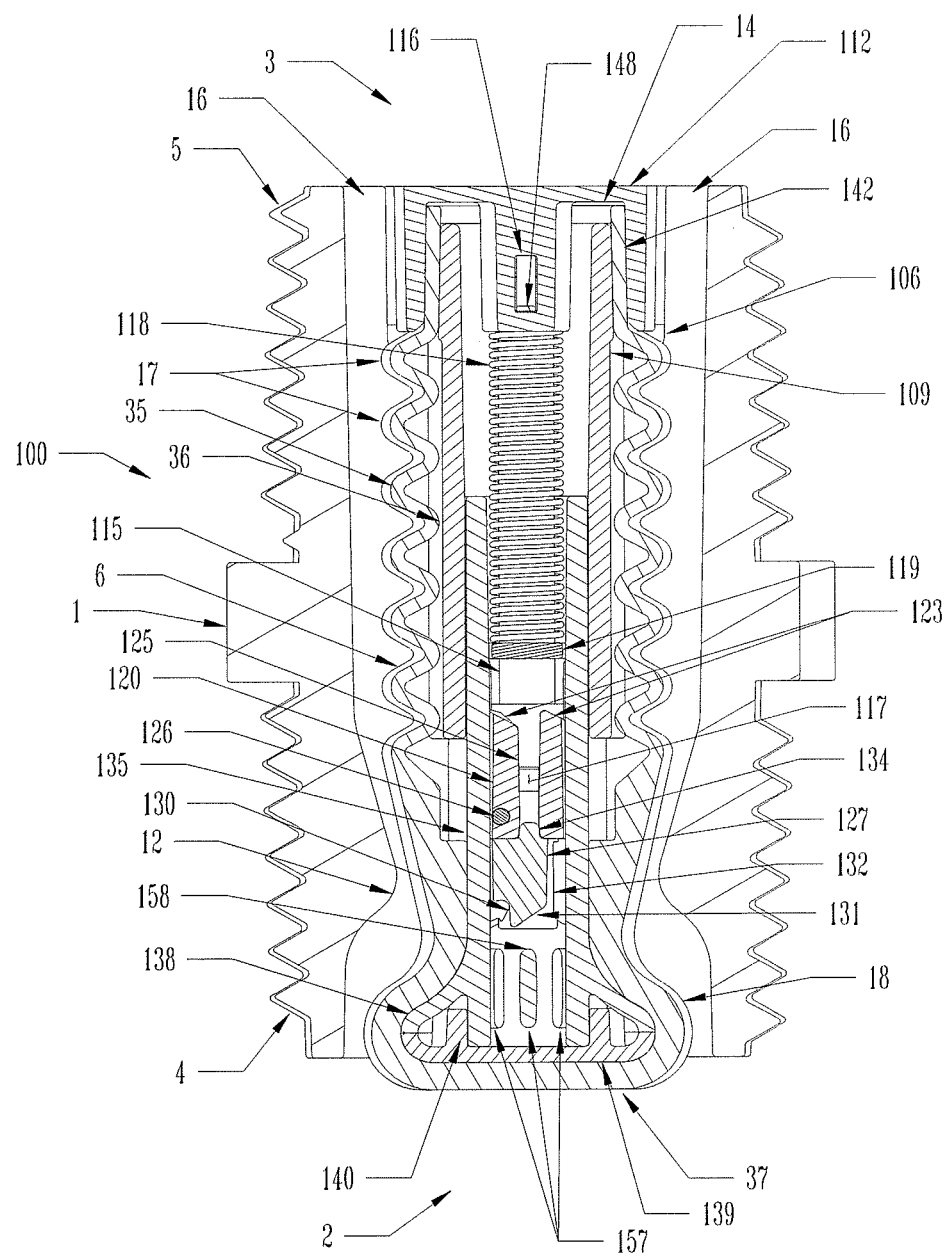
FIG. 11a: Is a section as defined in FIG. 9 through the first alternate embodiment showing the lower elongate protrusion of the sequencing mechanism in the first free state.
Figure 12A:
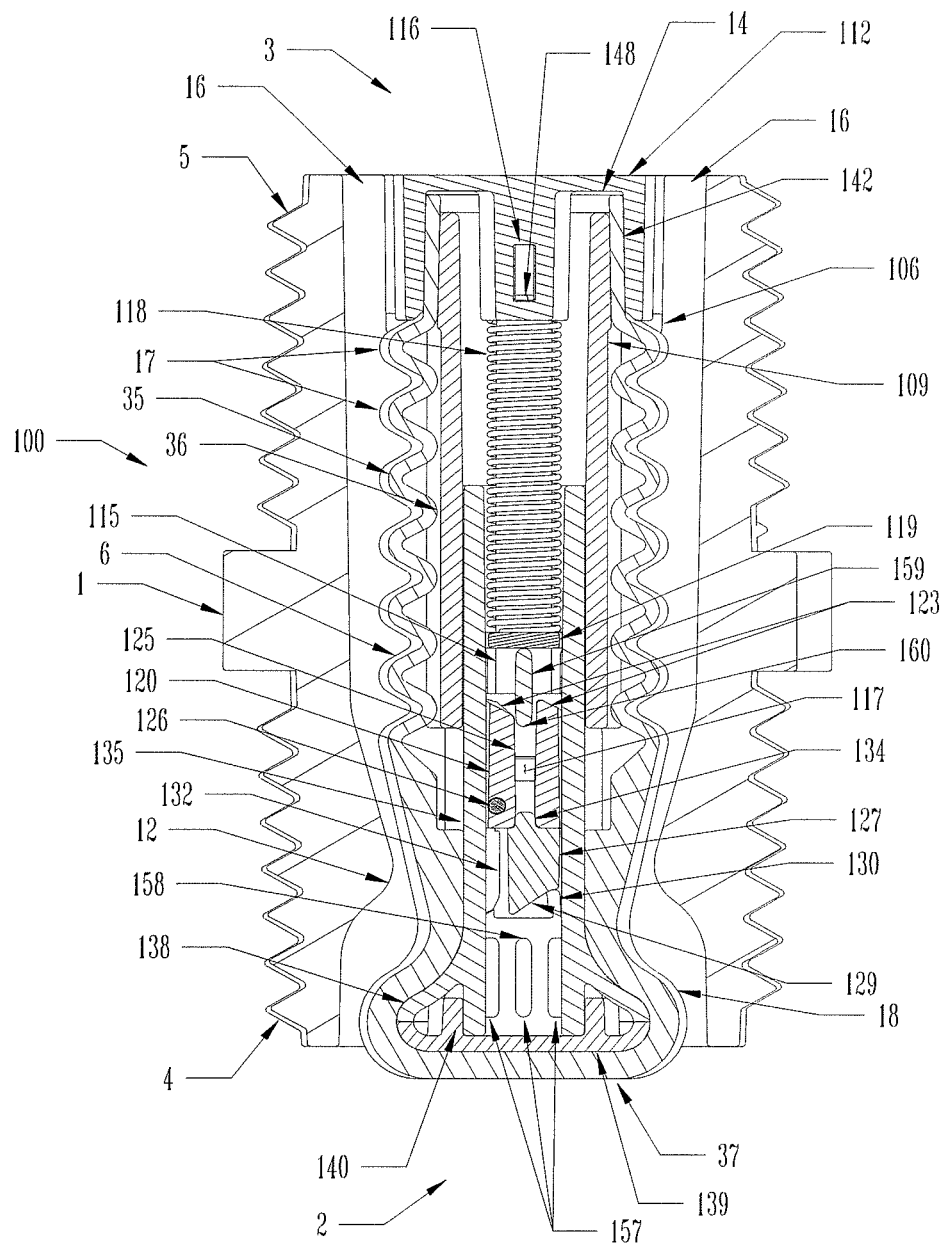
FIG. 12a: Is a section as defined in FIG. 9 through the first alternate embodiment showing the upper elongate protrusion of the sequencing mechanism in the first free state.

During the time period 301 through 302, the fluid pressure applied to the inlet 2 (top graph) is low. The fluid flow apparatus 100 is in the ready to close state (middle graph). Fluid flow through the fluid flow apparatus 100 is low (bottom graph). FIGS. 11a and 12a depict the fluid flow apparatus 100 in this state.

Figure 10A:
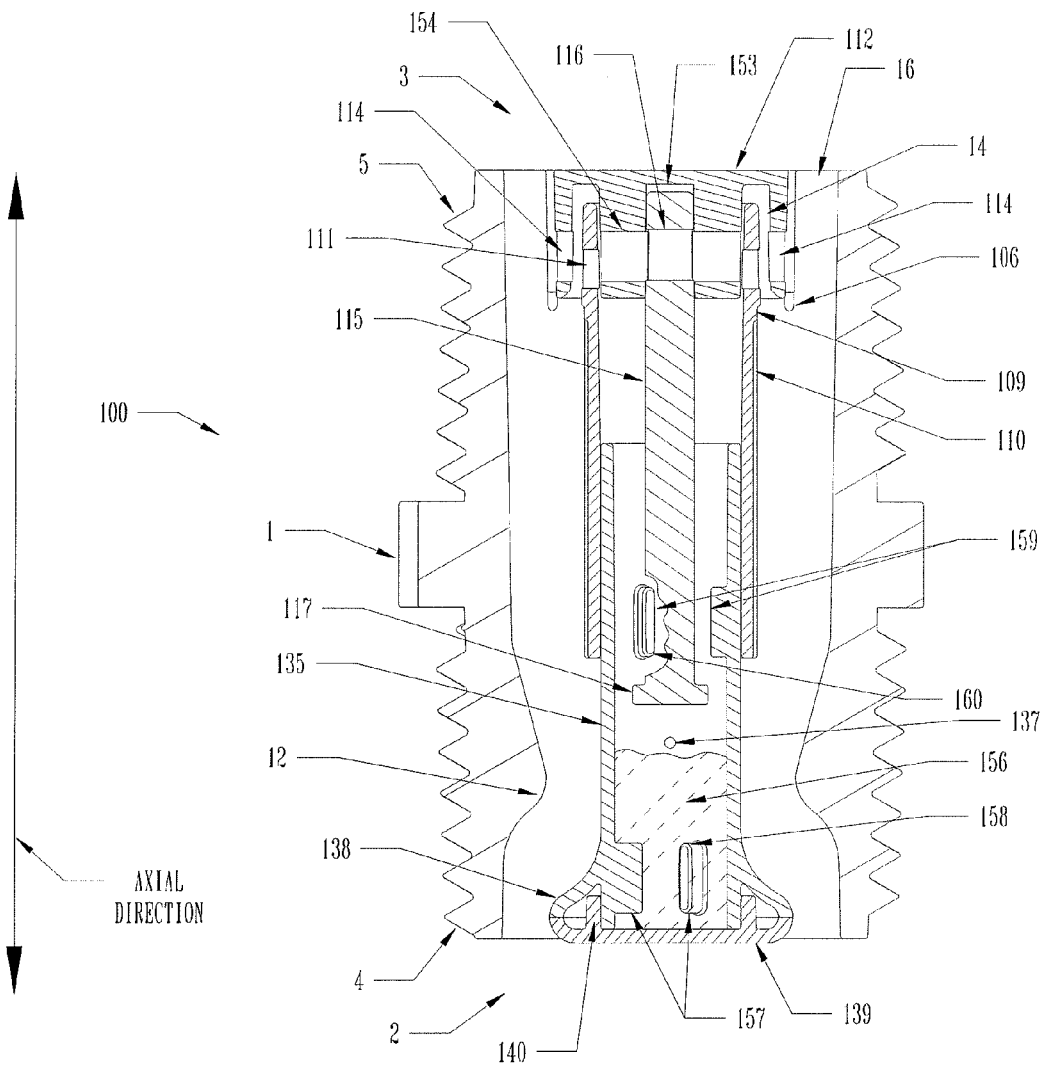
FIG. 10a: Is a section view as defined in FIG. 9 through the first alternate embodiment with most parts removed to show the internal configuration of the switch housing.
Figure 10B:
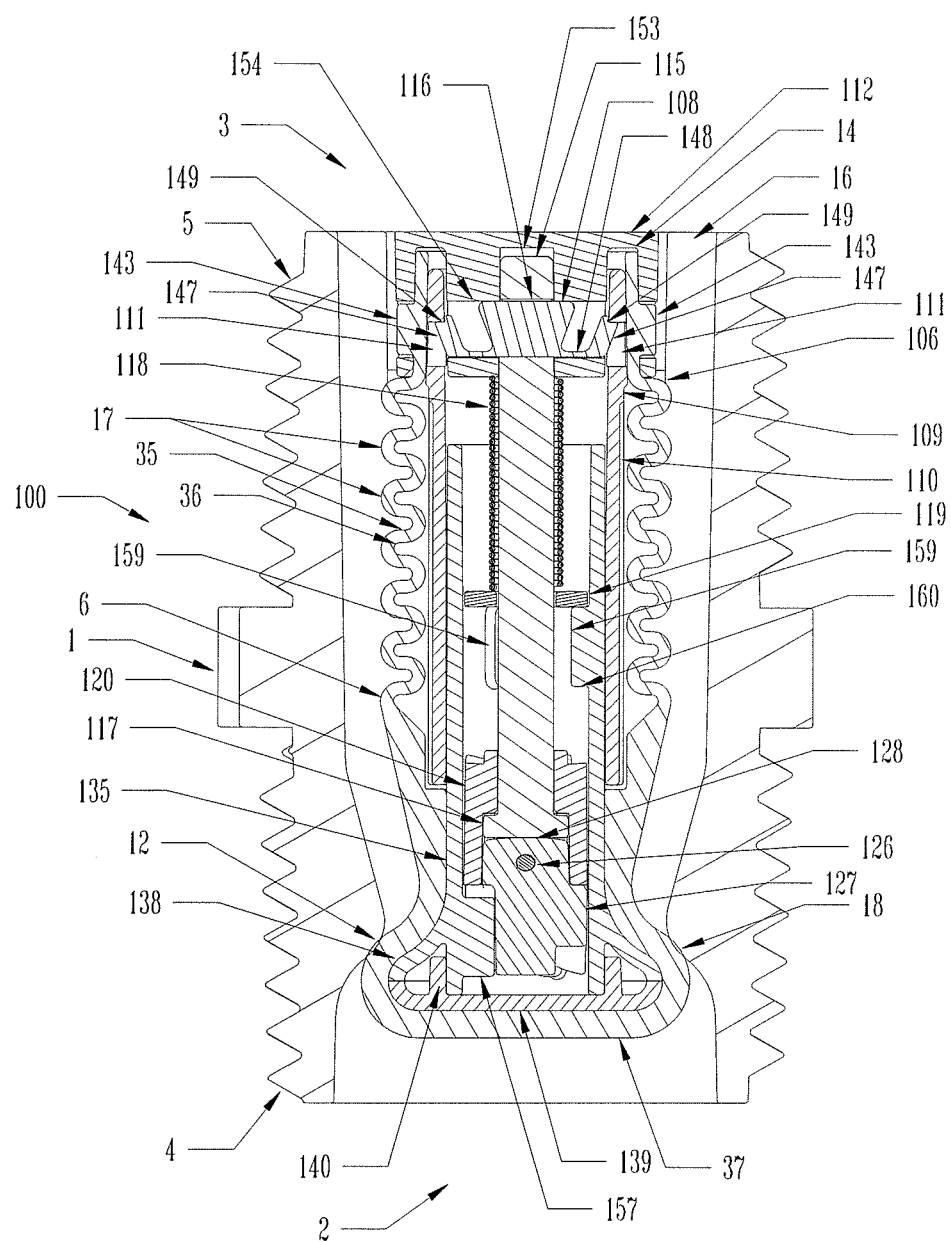
FIG. 10b: Is a section view as defined in FIG. 9 through the first alternate embodiment showing the internal configuration in the second closed state.
Figure 11B:
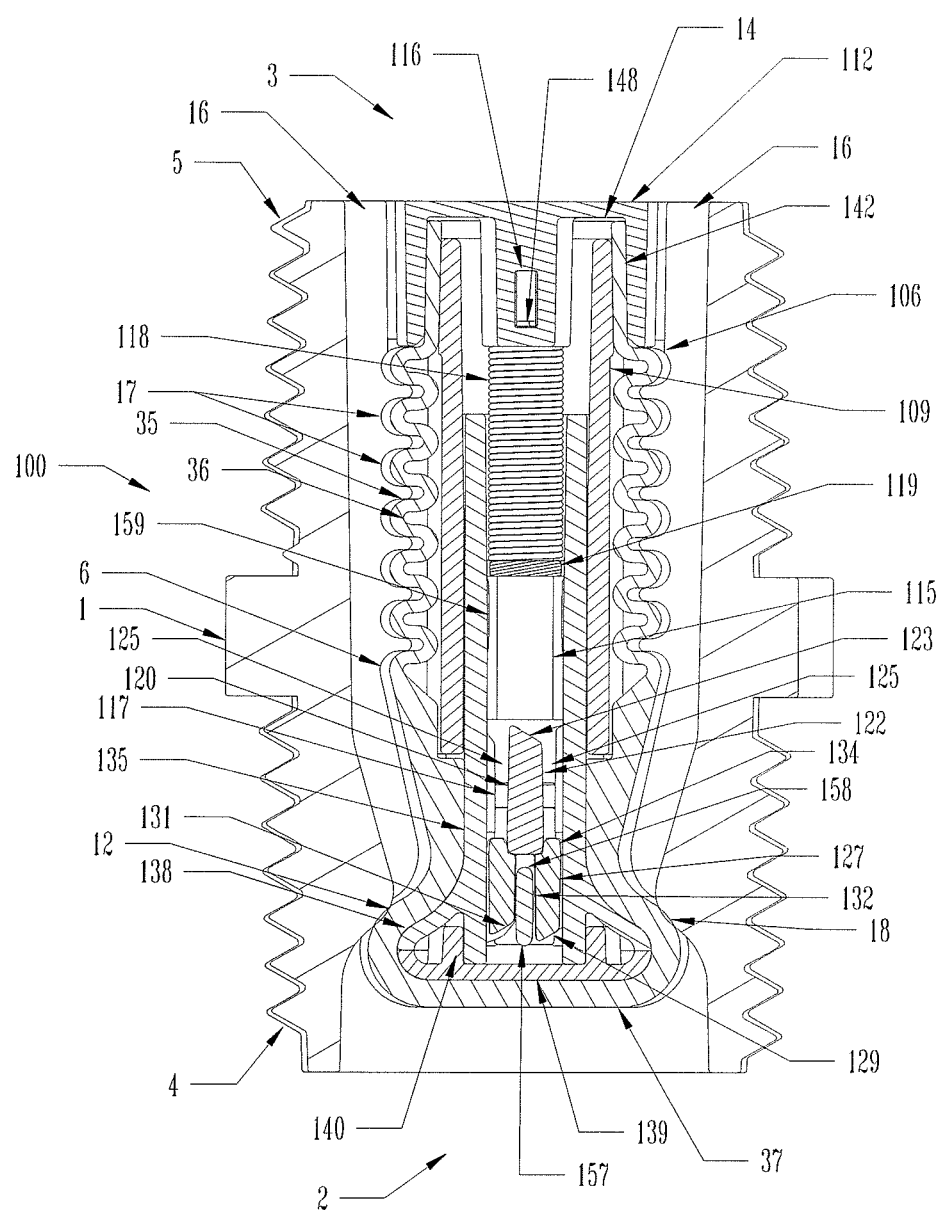
FIG. 11b: Is a section as defined in FIG. 9 through the first alternate embodiment showing the lower elongate protrusion of the sequencing mechanism in the second closed state.
Figure 12B:
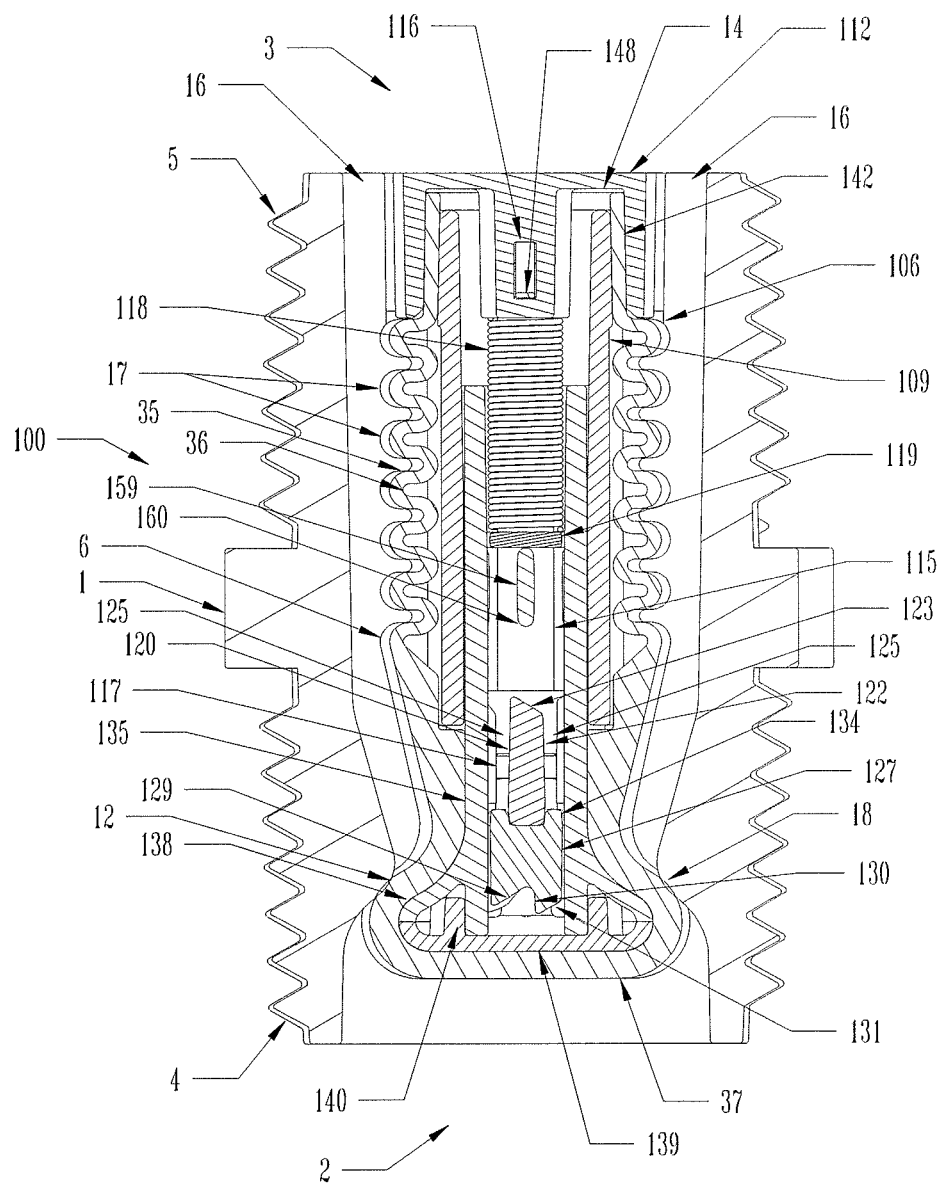
FIG. 12b: Is a section as defined in FIG. 9 through the first alternate embodiment showing the upper elongate protrusion of the sequencing mechanism in the second closed state.

At time 302, the fluid pressure applied to the inlet 2 is rapidly increased. Because the fluid flow apparatus 100 comprises a viscous damping means (described in detail below), the fluid flow apparatus 100 moves from the ready to close state to the closed state during the time period depicted as 302 through 303. At time 303, the fluid flow apparatus 100 is in the closed state, and fluid flow through fluid flow apparatus 100 is restricted. FIGS. 10b, 11b and 12b depict the fluid flow apparatus 100 in this closed state. Since sequencing mechanism 20 is in the second or closed state, bulb 18 now is allowed to move and to circumferentially seal against valve seat 12 according to FIG. 10b. This restricts or blocks fluid passage between fluid inlet 2 and outlet 3.

Figure 11C:
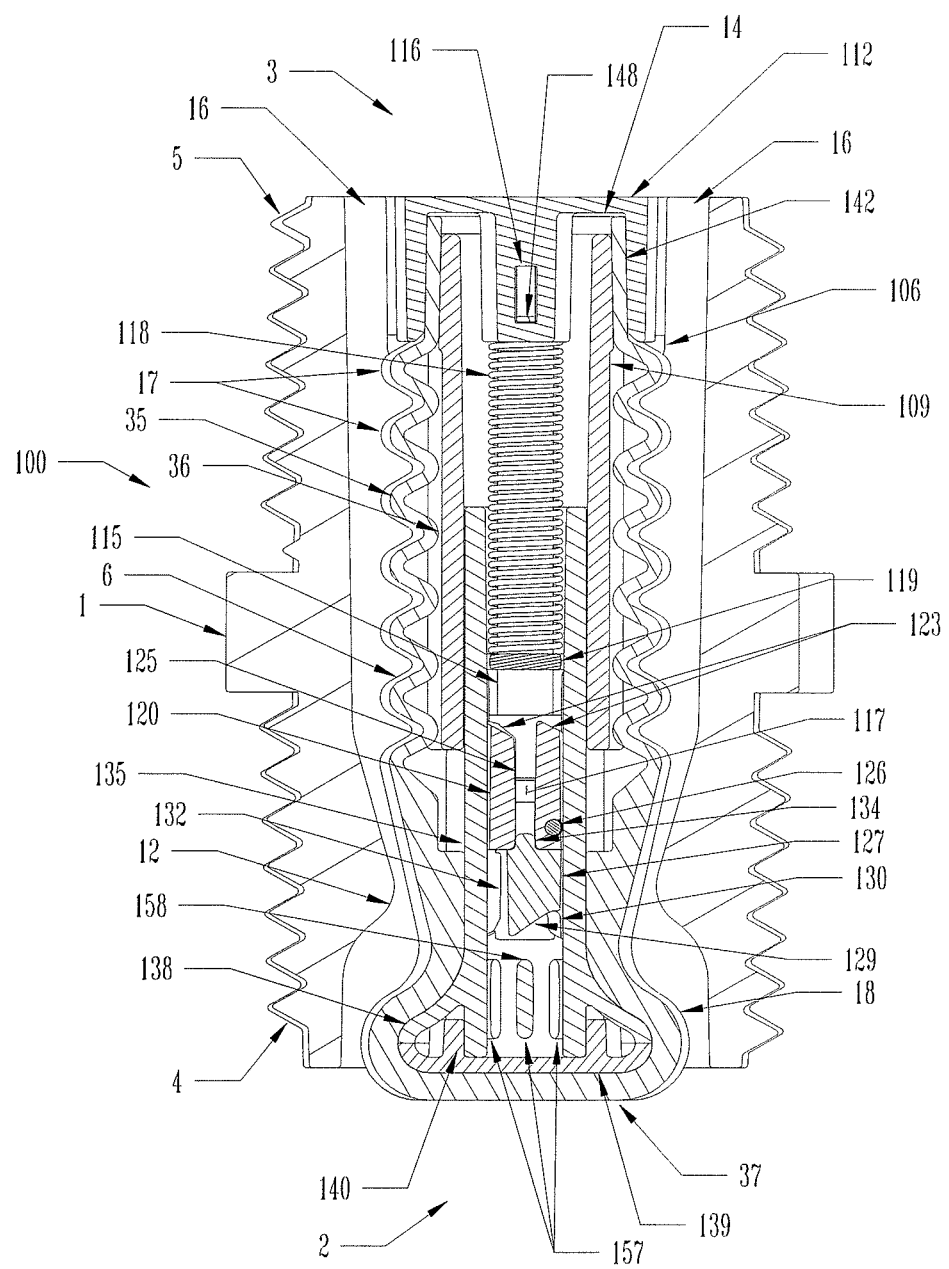
FIG. 11c: Is a section as defined in FIG. 9 through the first alternate embodiment showing the lower elongate protrusion of the sequencing mechanism in the third free state.
Figure 12C:
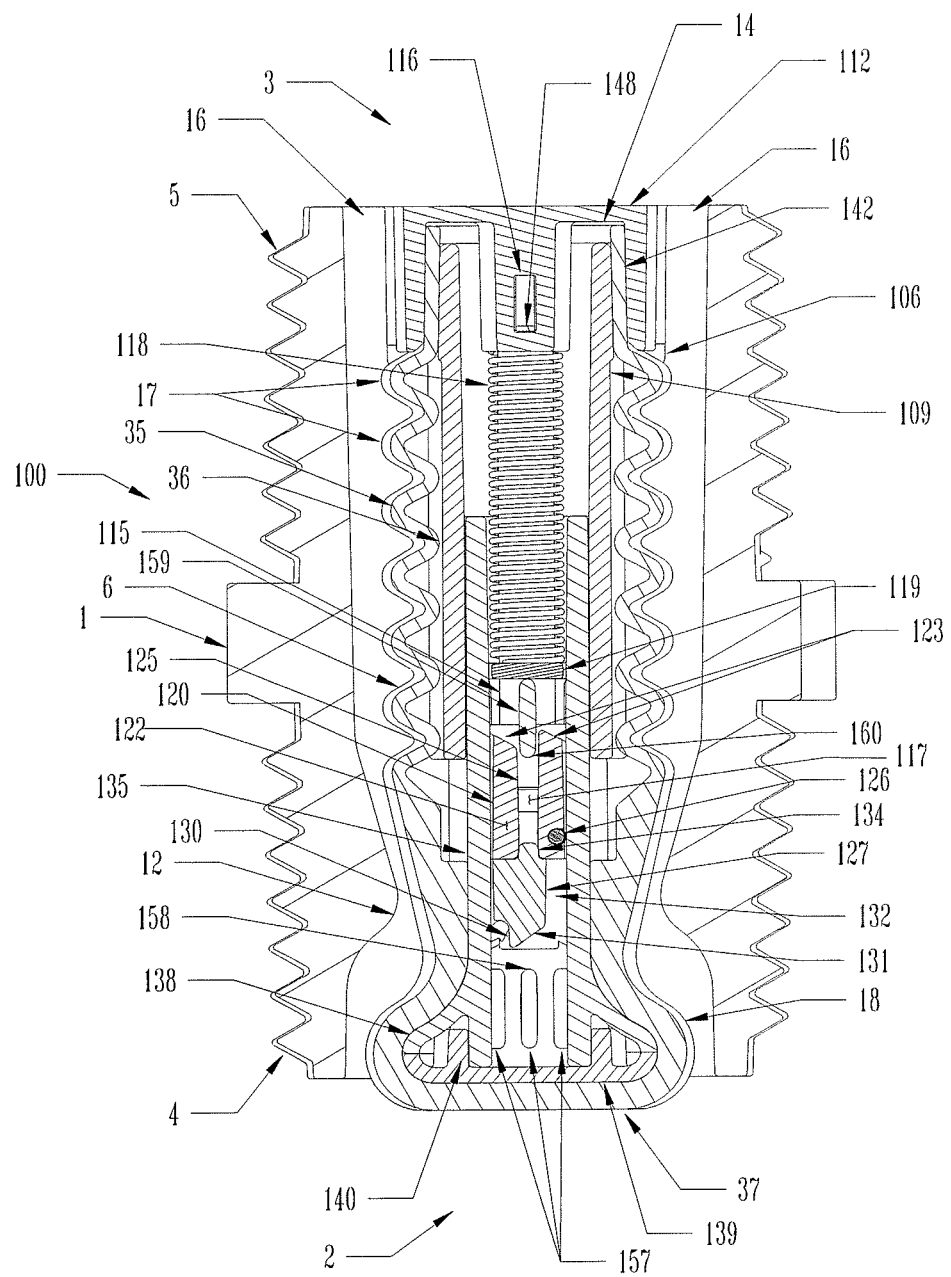
FIG. 12c: Is a section as defined in FIG. 9 through the first alternate embodiment showing the upper elongate protrusion of the sequencing mechanism in the third free state.

At time 304, high fluid pressure is no longer applied to inlet 2. Because the fluid flow apparatus 100 comprises the viscous damping means, the fluid flow apparatus 100 moves from the closed state to the ready to open state during the time period depicted as 304 through 305. At time 305, the fluid flow apparatus 100 and sequencing mechanism 20 is in the third, ready to open state. FIGS. 11c and 12c depict the fluid flow apparatus 100 in this third state. Fluid flow through the fluid flow apparatus 100 is low.

During the period between time 306 and time 307, the fluid pressure applied to the inlet 2 rises in an unsteady manner. Upon examination of FIG. 14, it can be seen that the fluid pressure may intermittently exceed the steady "high" value and may also drop below the steady "low" value. The viscous damping means prevents the valve 6 from moving rapidly in response to such pressure variations and the time average motion of the valve 6 responds to the time average pressure applied to the inlet 2. At time 307, the pressure remains high and the fluid flow apparatus 100 completes the movement to the fourth open state at time 308. In the open state, fluid flow through fluid flow apparatus 100 is free. Sequencing mechanism 20 is maintaining an open condition of fluid flow apparatus 100 whereby a spacing or annular fluid gap is maintained between bulb 18 and valve seat 12. Further, the flow area along annular flow path 34 is substantially constant and the fluid is allowed to move in a substantially axial path to minimize pressure loss.

During the period between time 309 and time 310, the fluid pressure applied to the inlet 2 falls in an unsteady manner. Upon examination of FIG. 14, it can be seen that the fluid pressure may intermittently exceed the steady "high" value and may also drop below the steady "low" value. The viscous damping means prevents the valve 6 from moving rapidly in response to such pressure variations and the time average motion of the valve 6 responds to the time average pressure applied to the inlet 2. At time 310, the pressure remains low and the fluid flow apparatus 100 completes the movement to the first ready to close state at time 311. Because sequencing mechanism is in the first or ready to close state, a fluid gap is maintained between bulb 18 and valve seat 12 so that fluid may flow through fluid flow apparatus 100. Thus, fluid flow apparatus 100 has the same state during time periods 311-312 and 301-302.

According to FIG. 14, the sequencing mechanism 20 changes state in response to continuous changes in external pressure applied at input end 2 and does not change state if the external pressure variations are of sufficiently short duration due to viscous damping means.

Now we turn to a more detailed description of the structure and operation of the first alternate embodiment of fluid flow apparatus 100 that includes additional details of the sequencing mechanism 20.

Referring to FIGS. 8 and 13, the first alternate embodiment includes a substantially tubular main housing 1 comprising an input end 2 and an output end 3. Input end 2 includes input thread 4 for installation into the supply plumbing. Output end 3 includes output thread 5 for installation of the output plumbing. Referring also to FIG. 10a, significant features of the main structure can be examined. Main housing 1 further comprises valve seat 12 and mount grooves 106 for insertion of mount arms 113 of mount 112. Valve guide 109 is disposed within valve mount cavity 14 as will be described later. Valve guide 109 further comprises venting slots 110 to allow fluid to travel in the axial direction between undulations 17 of valve 6 thus preventing fluid entrapment. Sequencing assembly housing 135 is slidably disposed within valve guide 109. Sequencing assembly housing 135 further comprises upper elongate protrusions 159 and lower elongate protrusions 157 for operation of the sequencing mechanism 20 as will be described later. Sequencing assembly cap 139 is fixedly attached to sequencing assembly housing 135 using tubular protrusion 140. Fluid flow apparatus 100 is required to be operated with respect to elevation view 8 to maintain gravitational pull towards input end 2. Said gravitational pull retains viscous damping fluid 156 proximate the input end 2 within sequencing assembly housing 135. If viscous damping fluid 156 is distributed anywhere else within the valve 6 due to lack of consistent gravitational pull, said viscous damping fluid 156, will return to the position shown in FIG. 10a either directly or via venting slots 110 and viscous fluid drain hole 137 once consistent gravitational pull is restored.

Figure 10C:
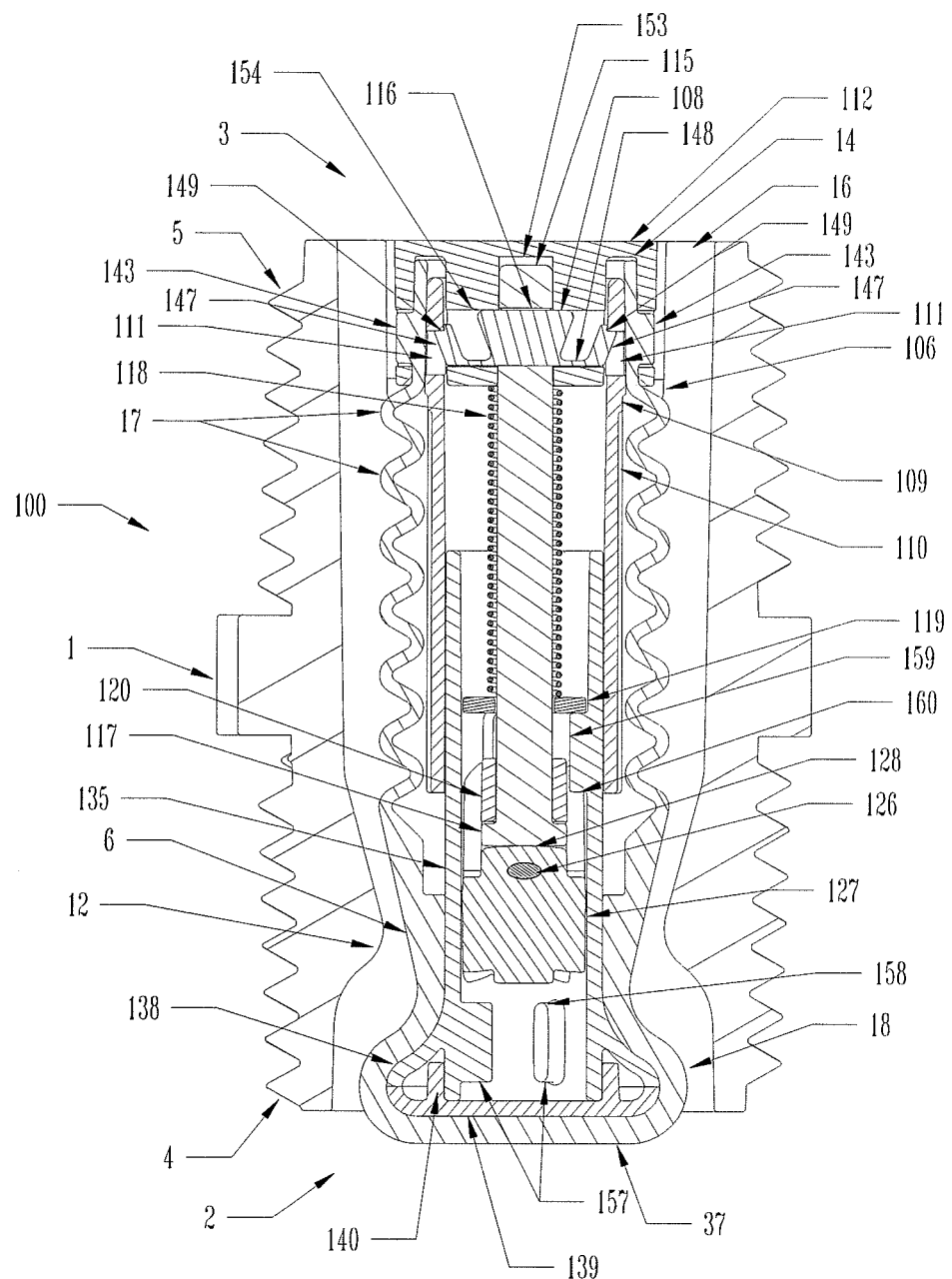
FIG. 10c: Is a section view as defined in FIG. 9 through the first alternate embodiment showing the internal configuration in the third free state.

Referring now also to FIG. 10b, important features will be disclosed in the context of assembly of fluid flow apparatus 100. Valve 6 is made of flexible material such that enlarged lower end 138 of sequencing assembly housing 135 and sequencing assembly cap 139 can be inserted into valve 6 and fixedly attached proximate to valve distal end 37. Lower sequencing member 127 is slidably inserted into sequencing assembly housing 135. Upper sequencing member 120 is slidably mounted onto main pin 115 proximate to enlarged main pin head 117 and together they are slidably inserted into sequencing assembly housing 135. Upper aligning protrusions 122 are aligned to engage lower aligning protrusions 134 which further aligns upper assembly pin bore 124 with lower assembly pin bore 133. When said bores are aligned, sequencing assembly pin 126 can be inserted through pin insertion hole 136. Because sequencing assembly pin 126 is substantially the same length as the inside diameter of sequencing assembly housing 135, sequencing assembly pin 126 is retained for all instances of sequencing mechanism 20 except when sequencing assembly pin 126 is aligned with pin insertion hole 136. Because upper sequencing member 120 is restricted against moving toward input end 2 by main pin head 117 and lower sequencing member 127 is restricted against moving toward output end 3 by main pin head 117 the combined assembly is constrained to only rotate around main pin head 117 and cannot move axially with respect to main pin 115. For minimum rotational friction, lower sequencing member 127 further comprises domed upper surface 128, such that contact with main pin head 117 occurs at the rotational axis. Assembly of fluid flow apparatus 100 continues by slidably inserting spring seat 119 and compression spring 118 onto main pin 115. Valve guide 109 is slidably inserted into valve 6 and around sequencing assembly housing 135. With valve 6 in its natural length state as shown in FIG. 10c, valve guide 109 can be disposed substantially within valve 6 such that main pin slot 116 is accessible. With valve 6 inserted through main housing 1 such that main pin slot 116 is positioned above output end 3 of main housing 1, pin mounting cavity 153 of mount 112 is slidably assembled onto main pin 115 and pin retention slot 154 is aligned with main pin slot 16. Clip 108 is slidably inserted into pin retention slot 154. Clip 108 thereby axially positions main pin 115 within mount 112. Next, as long as valve guide 109 is not positioned within valve mount cavity 14, valve mounting sleeve 142 can be deformed to allow valve retention protrusions 143 to be inserted into valve retention slots 114 of mount 112. Clip 108 further comprises clip latch arms 147 extending from flexible segment 148 and further comprising latch arm notches 149. As valve guide 109 is moved toward the output end 3 of fluid flow apparatus 100, flexible segments 148 allow clip latch arms 147 to be deformed radially inward by valve guide 109 until valve guide 109 is positioned to allow clip latch arms 147 to move radially outward into valve guide mount slots 111 thus engaging latch arm notches 149 in valve guide mount slots 111 preventing valve guide 109 from moving away from the output end of fluid flow apparatus 100 and maintaining clip 108 in a centered position. Assembly is completed by fixedly attaching mount arms 113 within mount grooves 106 of main housing 1. At the completion of the foregoing sequence, fluid flow apparatus 100 is fully assembled as shown in FIGS. 10b through 12d and the functions of the various elements have been described that allow said assembly. At the completion of said assembly sequence valve mounting sleeve 142 is sealed and retained within mount 112 thus forming a closed air vessel within valve 6. Further, main pin 115 is fixed within pin mounting cavity 153 by clip 108 and upper sequencing member 120 and lower sequencing member 127 are constrained to rotate together around main pin head 17. Finally, valve 6 and sequencing assembly housing 135 are constrained to purely axial motion due to engagement of valve guide 109.

After mount 112 is fixedly attached to main housing 1 there exist at least one output passage 16.

Referring now to FIG. 10b, a compressible valve 6 is fixedly installed and sealed in valve mount cavity 14 thus forming a closed air vessel within compressible valve 6. Because the compressible valve 6 is a closed air vessel, application of an increasing uniform external pressure will tend to collapse the compressible valve 6, thus reducing the internal volume and increasing the internal pressure within valve 6. The compressible valve 6 is made from a flexible material and further comprises undulations 17 and valve bulb 18. Because the compressible valve 6 is supported against collapse except for the undulations 17, application of an increasing uniform external pressure will collapse only the undulations 17 thus causing the valve bulb 18 to move axially away from the input end 2 and towards the output end 3.

A substantially tubular sequencing assembly housing 135 is fixedly attached to the compressible valve 6 and is closed on the distal end by sequencing assembly cap 139. The sequencing assembly housing 135 is slidably mounted in the valve guide 109 such that the collapsing of the compressible valve 6 is constrained to substantially axial movement. The distance traveled by the valve bulb 18 away from the input end 2 and towards the output end 3 is governed by a sequencing mechanism 20 as follows.

Referring to FIG. 13 and FIG. 10a, sequencing mechanism 20 comprises a substantially tubular sequencing assembly housing 135 further comprising lower elongate protrusions 157 comprising upper rounded surfaces 158 and upper elongate protrusions 159 comprising lower rounded surfaces 160. Axial movements of valve 6 result in equivalent axial movement of sequencing assembly housing 135 and said rounded surfaces. Upper rounded surfaces 158 are positioned to contact upper cam surfaces 123 and lower rounded surfaces are positioned to contact first lower cam surfaces 129 and second lower cam surfaces 131.

Referring now to FIG. 11a, sequencing mechanism 20 begins in a first, ready to close, position. Lower elongate protrusions 157 and upper rounded surfaces 158 are aligned with second lower cam surfaces 131. As sufficient external pressure is applied to move valve member 6 towards output end 3, upper rounded surfaces 158 contact second lower cam surfaces 131. Continued axial movement of sequencing assembly housing 135 causes lower sequencing member 127 to rotate around main pin head 117 as defined by second lower cam surfaces 131. Referring also to FIG. 11b, when lower sequencing member has rotated through sufficient angle to align lower elongate protrusion 157 with lower elongate slot 132, sequencing assembly housing 135 and valve member 6 are free to continue moving axially until valve bulb 18 contacts valve seat 12. Thus, fluid flow apparatus 100 restricts the flow of fluid entering input end 2 from passing to output end 3 and the valve is in the second, closed, state as shown in FIGS. 11b and 12b. Because upper sequencing member 120 is constrained to rotate with lower sequencing member 127, upper sequencing member 120 has been positioned as shown in FIG. 12b. Spring seat 119 is engaged by upper elongate protrusions 157 and constrained to move axially upward with sequencing assembly housing 135. Axial movement of spring seat 119 reduces the length of compression spring 118 further bearing on mount 112 thus increasing the bias of compression spring 118 tending to urge the sequencing assembly housing 135 and valve member 6 toward input end 2. Therefore, there are three restoring forces trying to return the fluid flow apparatus 100 to the free state: The gas pressure within the closed air vessel due the reduction of the internal volume, the natural restoring force of the deformed undulations 17, and the compression spring 118.

Referring now to FIG. 12c, removal of sufficient pressure from input end 2, allows the restoring forces to move the sequencing assembly housing 135 and valve member 6 toward input end 2. As sequencing assembly housing 135 moves, lower elongate protrusion 157 no longer occupies lower elongate slot 132 and lower rounded surface 160 contacts upper cam surface 123. As the axial motion of sequencing assembly housing 135 continues toward input end 2, upper sequencing member 120 is forced to rotate around main pin head 117 as defined by upper cam surfaces 123. As the axial movement of sequencing assembly housing 135 continues, upper elongate protrusion 159 enters upper elongate slot 125 thus completing the angular positioning of upper sequencing member 120. The fluid flow apparatus 100 is now in the third, ready to open, state as shown in FIGS. 10c, 11c and 12c.

Figure 10D:
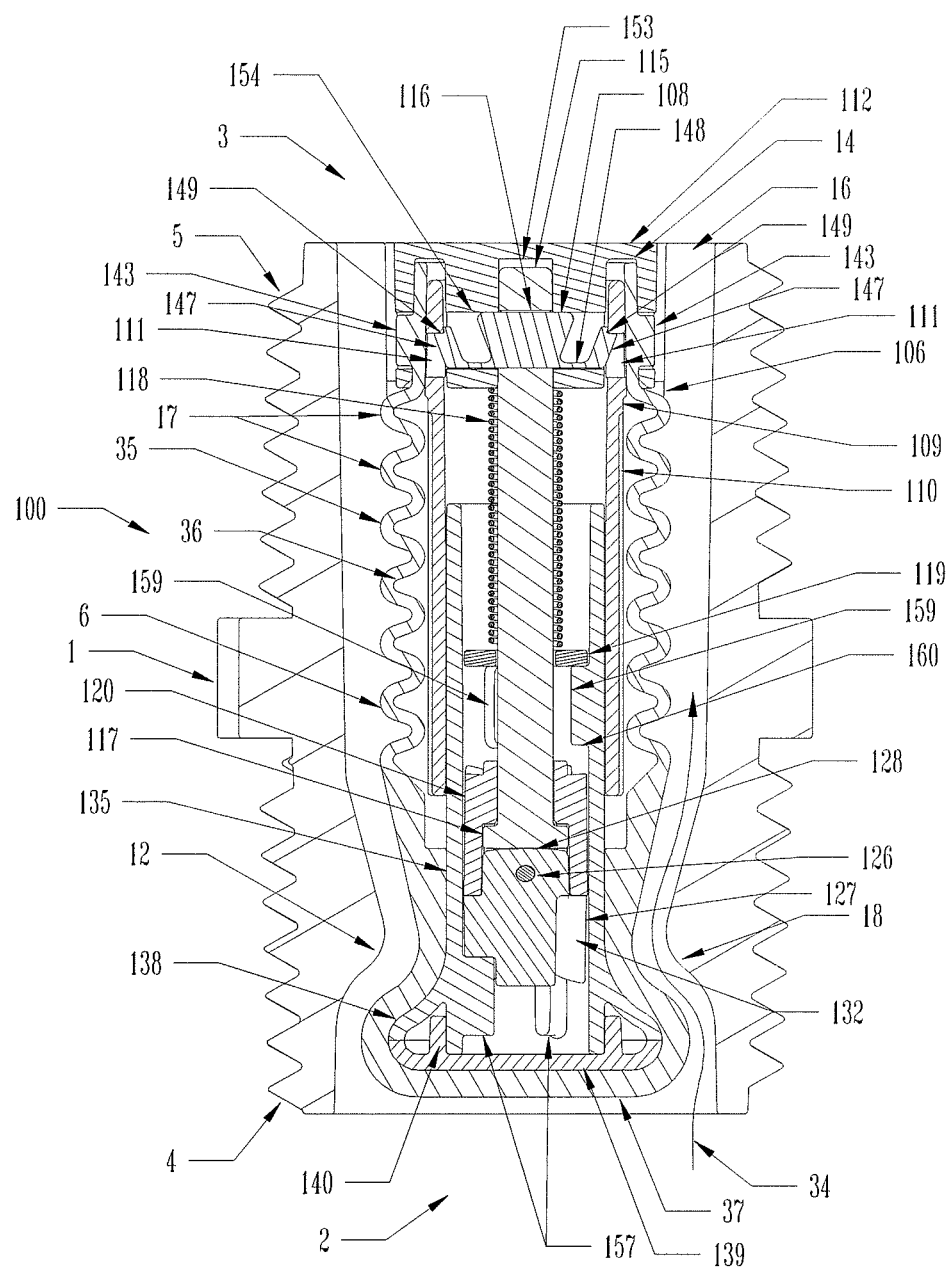
FIG. 10d: Is a section view as defined in FIG. 9 through the first alternate embodiment showing the internal configuration in the fourth open state.
Figure 11D:
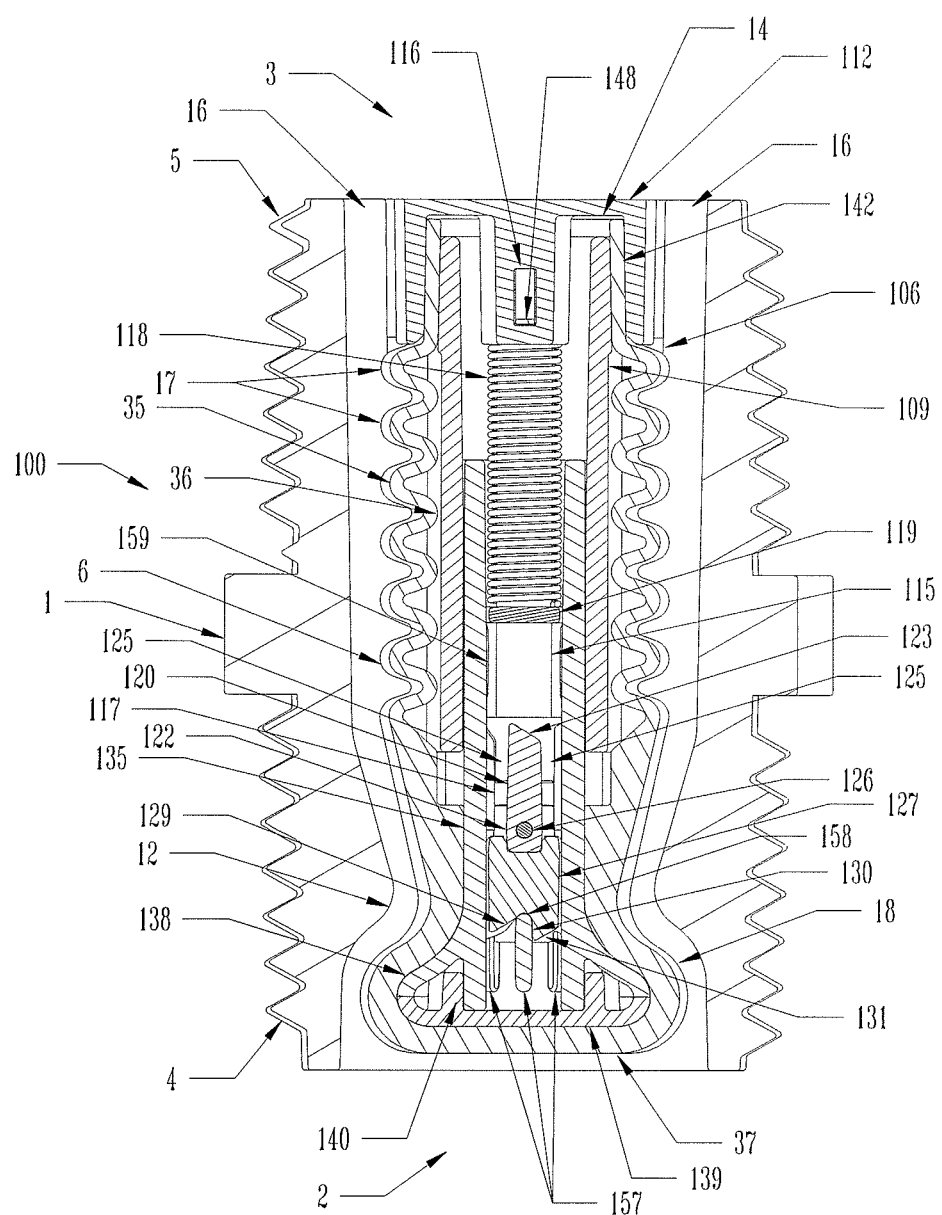
FIG. 11d: Is a section as defined in FIG. 9 through the first alternate embodiment showing the lower elongate protrusion of the sequencing mechanism in the fourth open state.
Figure 12D:
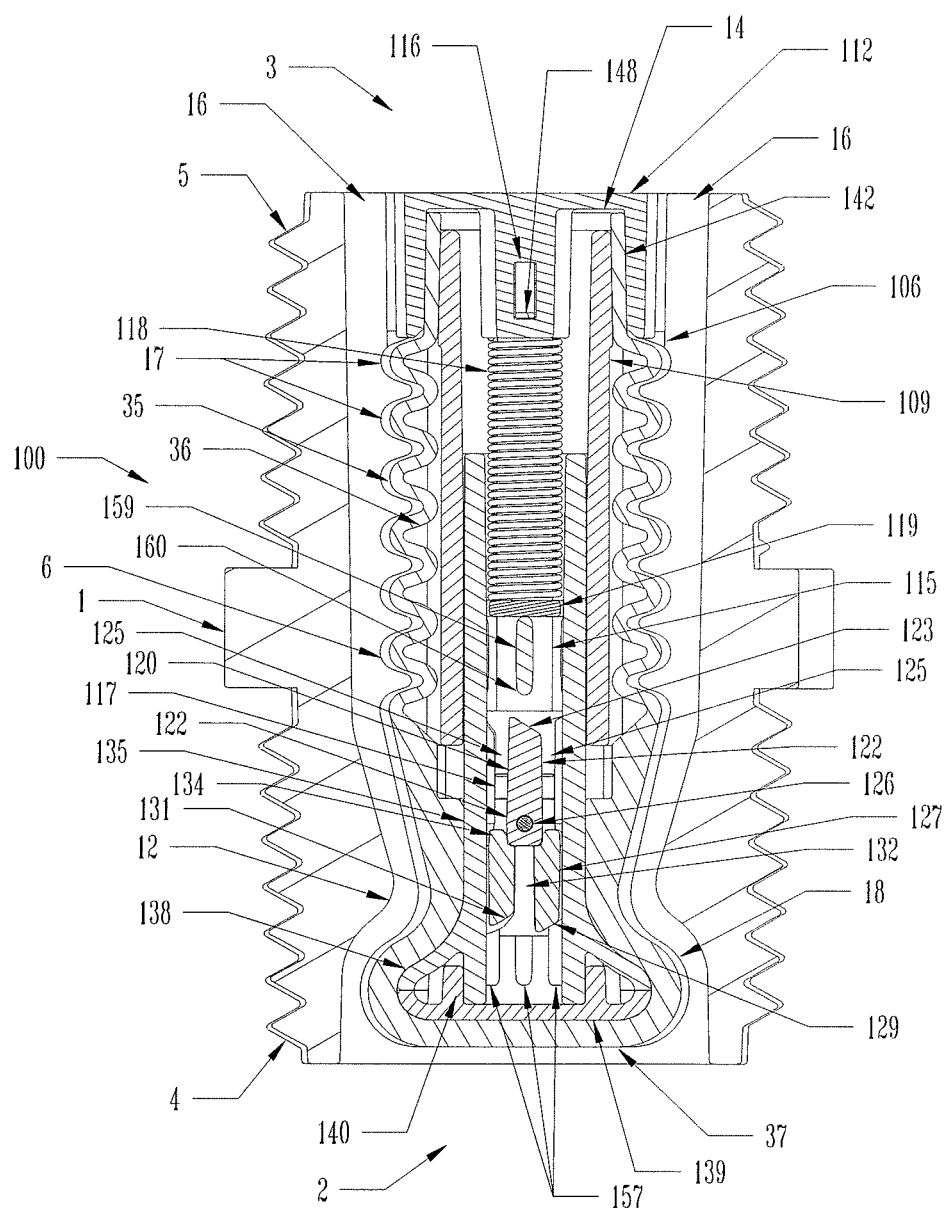
FIG. 12d: Is a section as defined in FIG. 9 through the first alternate embodiment showing the upper elongate protrusion of the sequencing mechanism in the fourth open state.

Referring now to FIGS. 11c and 12d, lower elongate protrusions 157 and upper rounded surfaces 158 are now aligned with first lower cam surfaces 129. As sufficient external pressure is applied to move valve member 6 towards output end 3, upper rounded surfaces 158 contact first lower cam surfaces 129. Continued axial movement of sequencing assembly housing 135 causes lower sequencing member 127 to rotate around main pin head 117 as defined by first lower cam surfaces 129 until lower elongate protrusion contacts axial wall 130 as shown in FIG. 11d. In this case, no further axial motion of sequencing assembly housing 135 and valve member 6 toward output end 3 is allowed and the valve is maintained in the fourth, open, state and an annular fluid gap is maintained between valve bulb 18 and valve seat 12 thus allowing substantially unrestricted fluid flow from input end 2 to output end 3 along annular flow path 34. The fourth, open, state is shown in FIGS. 10d, 11d and 12d.

Referring now to FIG. 12d, removal of sufficient pressure from input end 2 allows the restoring forces to move the sequencing assembly housing 135 and valve member 6 toward input end 2. As sequencing assembly housing 135 moves, lower elongate protrusion 157 no longer contacts axial wall 130 and lower rounded surface 160 contacts upper cam surface 123. As the axial motion of sequencing assembly housing 135 continues toward input end 2, upper sequencing member 120 is forced to rotate around main pin head 117 as defined by upper cam surfaces 23. Referring now to FIG. 12a, as the axial movement of sequencing assembly housing 135 continues, upper elongate protrusion 159 enters upper elongate slot 125 thus completing the angular positioning of upper sequencing member 120. The fluid flow apparatus 100 is now in the first, ready to close, state as shown in FIGS. 11a and 12a.

The above described sequence thus repeats indefinitely for each application and removal of external pressure with the pressurized valve state alternating between a closed state and an open state.

While the preceding description ignores the presence of viscous damping fluid 156 for clarity, the function of viscous damping fluid 156 will now be described. Because viscous damping fluid 156 fills the cavity created by sequencing assembly housing 135 and sequencing assembly cap 139, axial movement of sequencing assembly housing 135 away from input end 2 requires displacement of viscous damping fluid 156. Specifically, viscous damping fluid 156 is displaced from below lower sequencing member 127 to above upper sequencing member 120. This fluid movement must pass through the small annular gap provided between the outside diameter of lower sequencing member 127 and the inside diameter of sequencing assembly housing 135 and a similar annular gap between the outside diameter of upper sequencing member 120 and the inside diameter of sequencing assembly housing 135. Proper selection of said gap and the viscosity of viscous damping fluid 156 will prevent axial movement of sequencing assembly housing 135 unless a persistent net force toward output end 3 is applied. Thus, the motion of sequencing assembly housing 135 and valve member 6 is not responsive to rapid pressure fluctuations and requires persistent net force to complete the required degree of movement. Similarly, when the fluid flow apparatus 100 is in either the second, closed state or fourth, open state and sufficient external pressure is removed from the input end 2, displacement of viscous damping fluid 156 from above upper sequencing member 120 to below lower sequencing member 127 is required to prevent a vacuum from forming between lower sequencing member 127 and sequencing assembly cap 139. Said vacuum and viscous forces will prevent axial movement of sequencing assembly housing 135 unless a persistent net force toward input end 2 is applied. Thus, the motion of sequencing assembly housing 135 and valve member 6 is not responsive to rapid pressure fluctuations and requires persistent net force to complete the required degree of movement to change states.

It has been recognized that from time to time, the operator may have a need to reset the instant state of the fluid flow apparatus 100 while in a non-pressurized state such that the fluid flow apparatus 100 changes from the first, ready to close state to the third, ready to open state or vice-versa. The second alternate embodiment shown in FIGS. 15 through 17 provides for this capability. In the second alternate embodiment, main pin 115 no longer comprises main pin slot 116 and instead comprises pin diameter step 166, pin seal groove 167, and reset pin bore 173. Also in the second alternate embodiment, mount 112 no longer comprises pin retention slot 154 and instead comprises upward protrusion 164 further comprising pin mounting cavity step 165. The second alternate embodiment does not use clip 108 to retain valve guide 109 and instead uses guide retention protrusions 169 included as a new feature of valve member 6. Referring to the assembly sequence above, valve guide 109 deforms flexible material of valve member 6 radially outward into valve retention slots 114 until valve guide mount slots 111 allow guide retention protrusions 169 to move radially inward, thus restricting motion of valve guide 9.

Returning now to the operation of the second alternate embodiment, the sealed air vessel within valve member 6 is maintained by pin seal 168 retained within pin seal groove 167 as long as pin seal groove 167 is maintained between reset slot 163 and pin mounting cavity step 165. Thus, the function of compressible valve 6 is unchanged. In FIG. 11, main pin 115 is shown in the same axial position as in all previous views. This configuration axially positions main pin head 117 for normal operation of the sequencing mechanism 20 as previously described. In FIG. 11, main pin 115 is restricted from moving axially toward the output end 3 when pin diameter step 166 is in contact with pin mounting cavity step 165. Main pin 115 is restricted from moving axially toward the input end 3 when reset pin 162, installed in reset pin bore 173, is in contact with top surface 170.

Reset of the sequencing mechanism 20 is accomplished with a suitable hollow tubular tool that can engage reset pin 162. With the sequencing mechanism 20 in either the first, ready to close, position as shown in FIGS. 11a and 12a or in the third, ready to open, position as shown in FIGS. 11c and 12c, suitable tool engages and rotates reset pin 162 around main pin 115 axis to align with reset slot 163. Reset pin 163 is then axially displaced toward input end 2 using suitable tool to the full extent of reset slot 163. This axial motion of reset pin 162 and main pin 115 has the same effect as application of sufficient external pressure, namely the relative motion between sequencing assembly housing 135, lower sequencing member 127 and upper sequencing member 120, is identical thus causing sequencing mechanism 20 to change form the first to third state or the third to first state without application of external pressure. After the reset pin 162 has been fully disposed into reset slot 163, reset pin is again removed toward output end 3 using suitable tool and rotated approximately 90 degrees to engage top surface, 170. Thus the fluid flow apparatus 100 is restored to normal function as previously described with the instant state altered from the instant state prior to the reset sequence.

A third alternate embodiment includes improvements shown in FIGS. 19 through 23. Comparison of FIGS. 20a through 22d with FIGS. 10a through 12d will show that, except for the improvements mentioned below, the design and function of the sequencing mechanism 20 of the third alternate embodiment is substantially identical to the sequencing mechanism 20 of the second alternate embodiment. The third alternate embodiment provides for substantially improved performance in regard to the external pressure required for actuation, the damping effectiveness and resistance to pressure fluctuations, and improved manufacture capability. These improvements will now be discussed in detail.

The third alternate embodiment utilizes a modified design of the mount 112 described in the second alternate embodiment. Referring to FIGS. 20a through 20g, the mount 112 of the third alternate embodiment includes outer ring 282 that is slidably inserted into main housing 1 during assembly. This configuration is more easily manufactured than the mount arms 113 and mount grooves 106 previously described. The third alternate embodiment also eliminates pin retention slot 154 and provides a non-cylindrical pin mounting cavity 153. This allows main pin 115 to comprise anti-rotation feature 275 and be slidably mounted into mounting cavity 153. Thus, main pin 115 is prevented from rotating in mounting cavity 153. Preventing rotation of the main pin 115 is required to prevent said rotation from creating a torsional bias in compression spring 118 that can rotate the main pin 115 during state changes and cause unwanted rotation of the upper sequencing member 120 and lower sequencing member 127. The mount 112 of the third alternate embodiment also features an enlarged upward protrusion 164 that provides for increased internal volume for the closed air vessel. An increased internal volume reduces the compression ratio due to the collapse of the compressible valve 6 and reduces the internal pressure in the closed ("B") state. This reduces the amount of external pressure that must be applied to close the valve 100.

The third alternate embodiment also includes support rings 274 in each of the undulations 17 of compressible valve 6. Said support rings 274 prevent external pressure from causing undulations 17 to collapse radially and contact valve guide 109. This eliminates the presence of frictional drag during operation of valve 100 and reduces the external pressure that must be applied to close the valve 100.

Figure 20A:
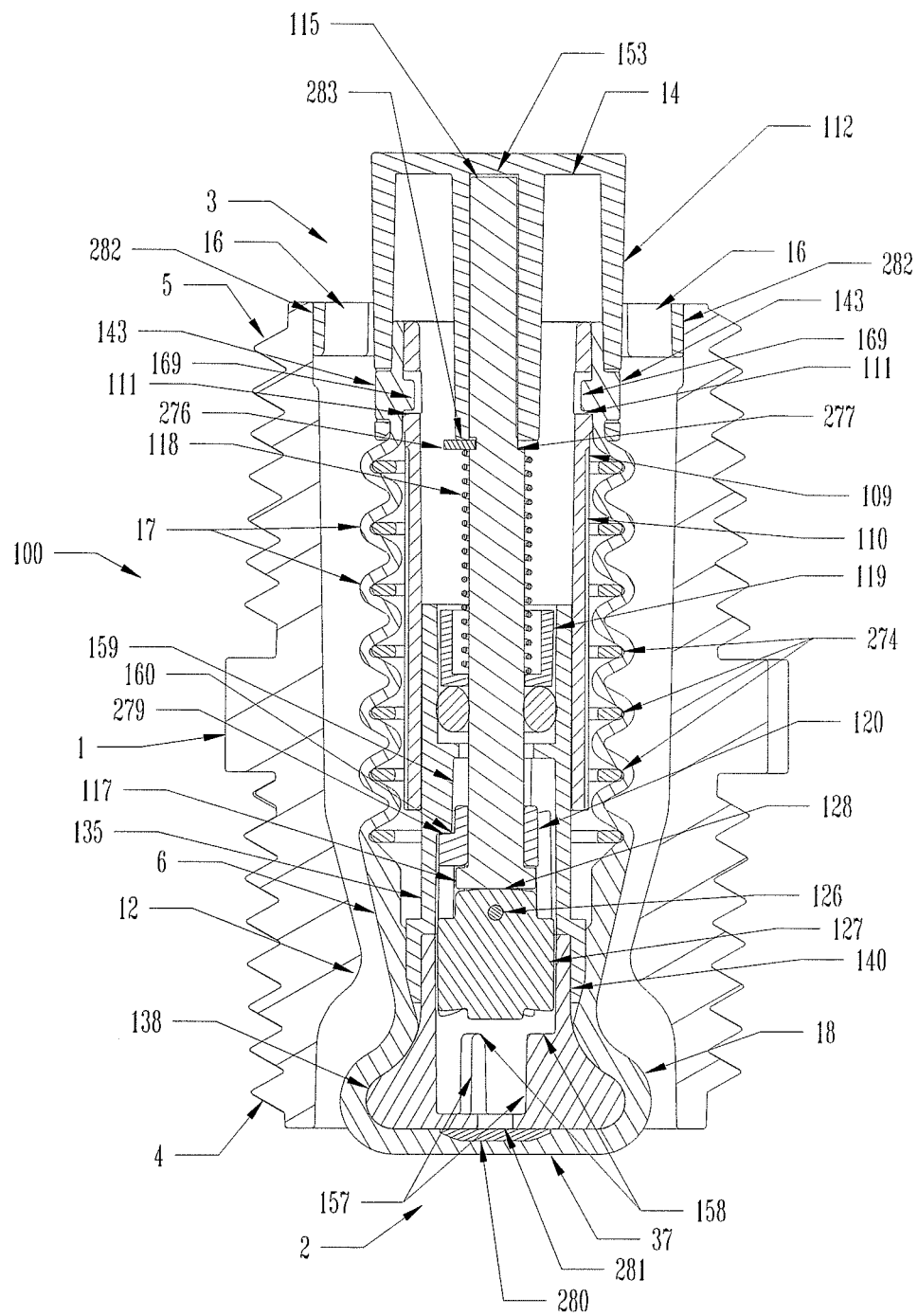
FIG. 20a: Is a section view as defined in FIG. 19 through the third alternate embodiment showing the sequencing mechanism details in the first free state.
Figure 20B:
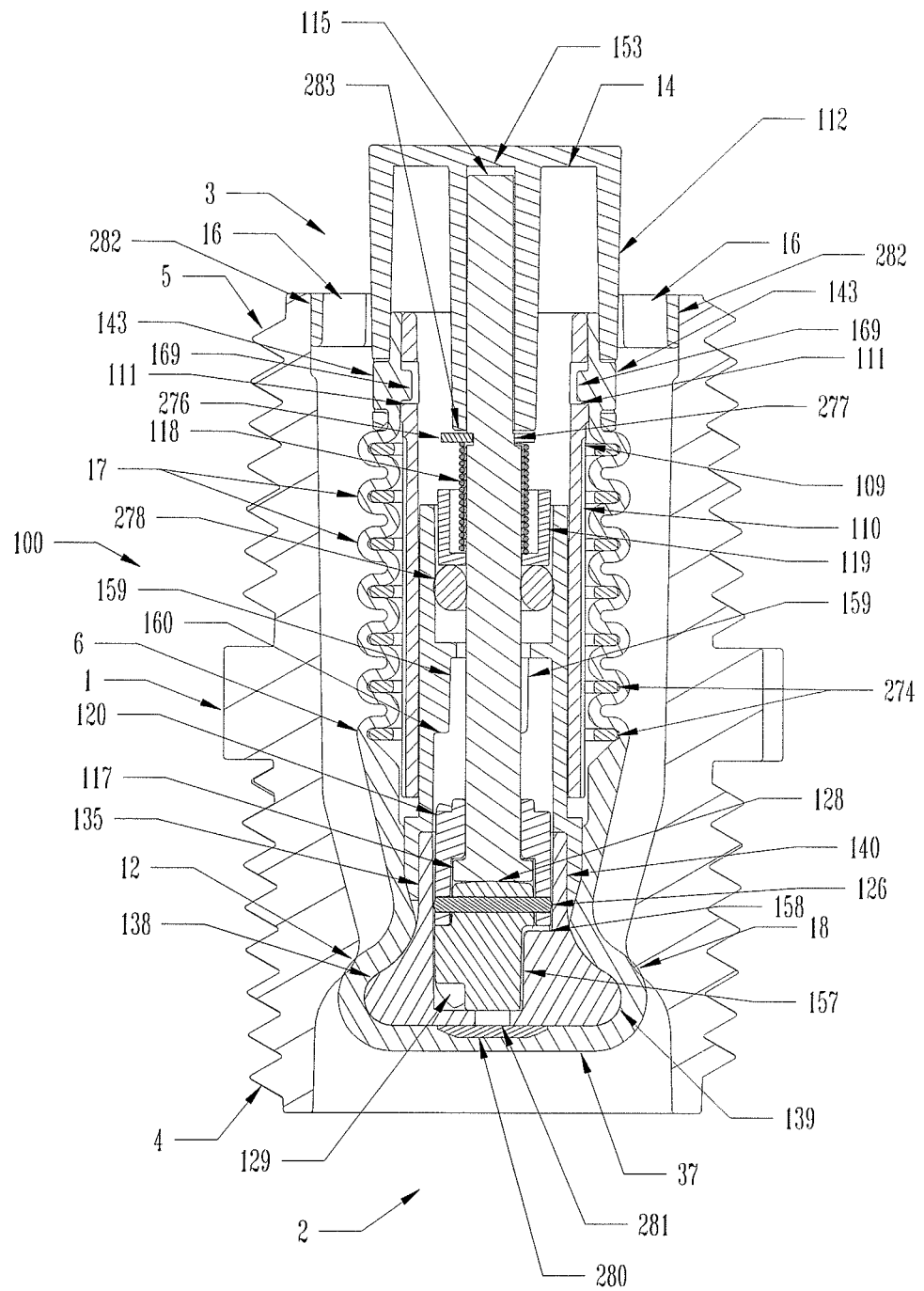
FIG. 20b: Is a section view as defined in FIG. 19 through the third alternate embodiment showing the sequencing mechanism details in the second closed state.
Figure 20C:
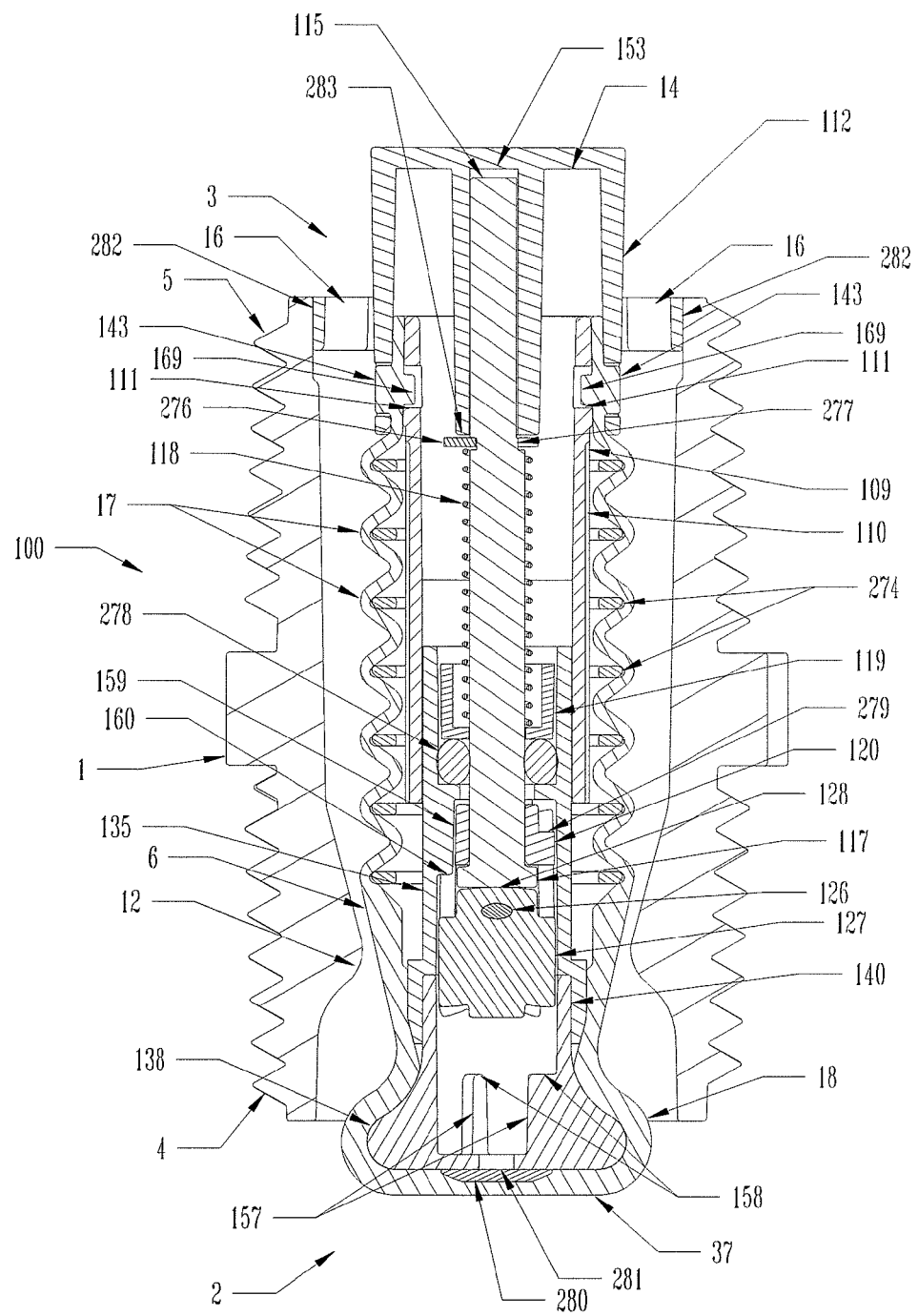
FIG. 20c: Is a section view as defined in FIG. 19 through the third alternate embodiment showing the sequencing mechanism details in the third free state.
Figure 20D:
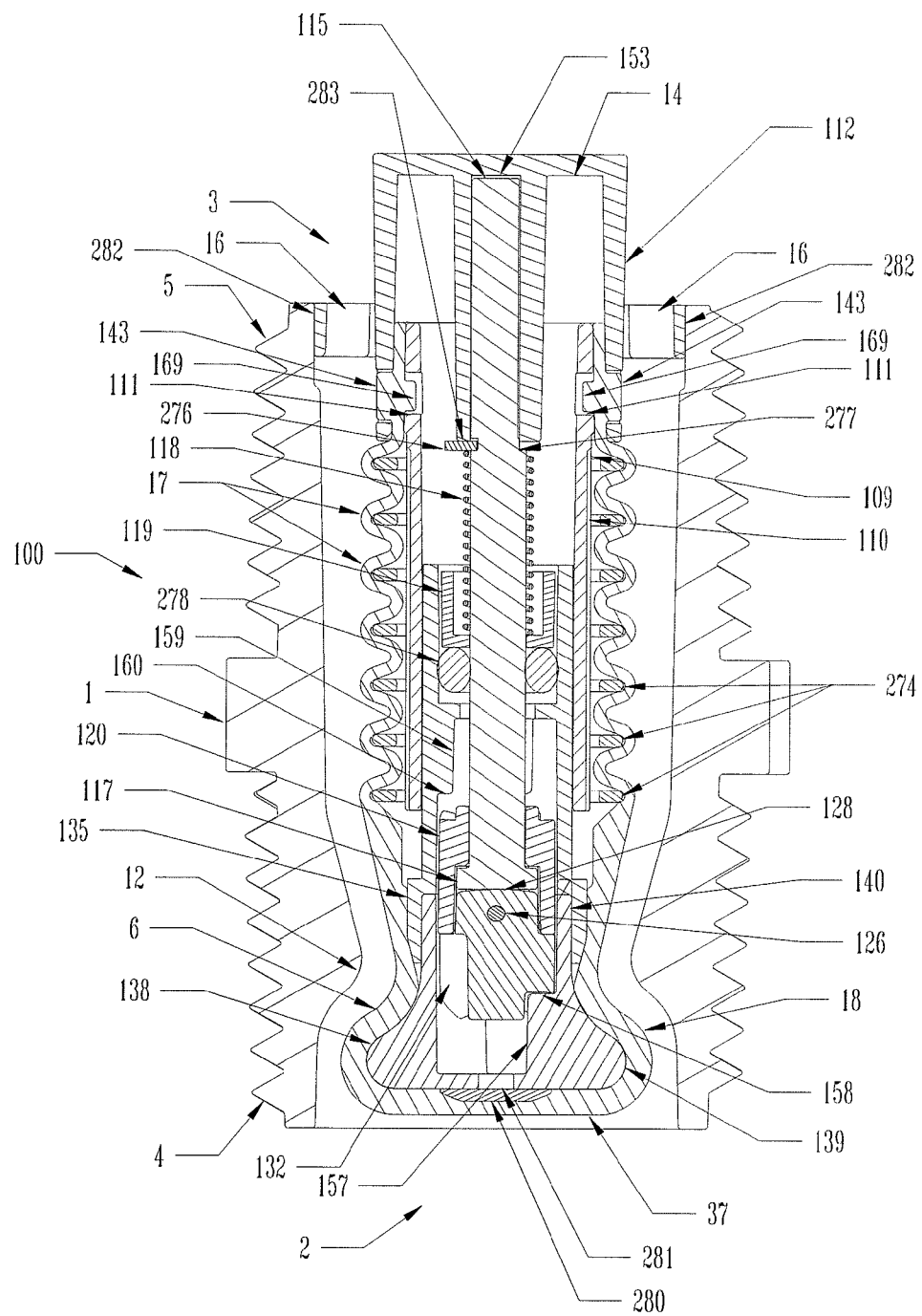
FIG. 20d: Is a section view as defined in FIG. 19 through the third alternate embodiment showing the sequencing mechanism details in the fourth open state.
Figure 20E:
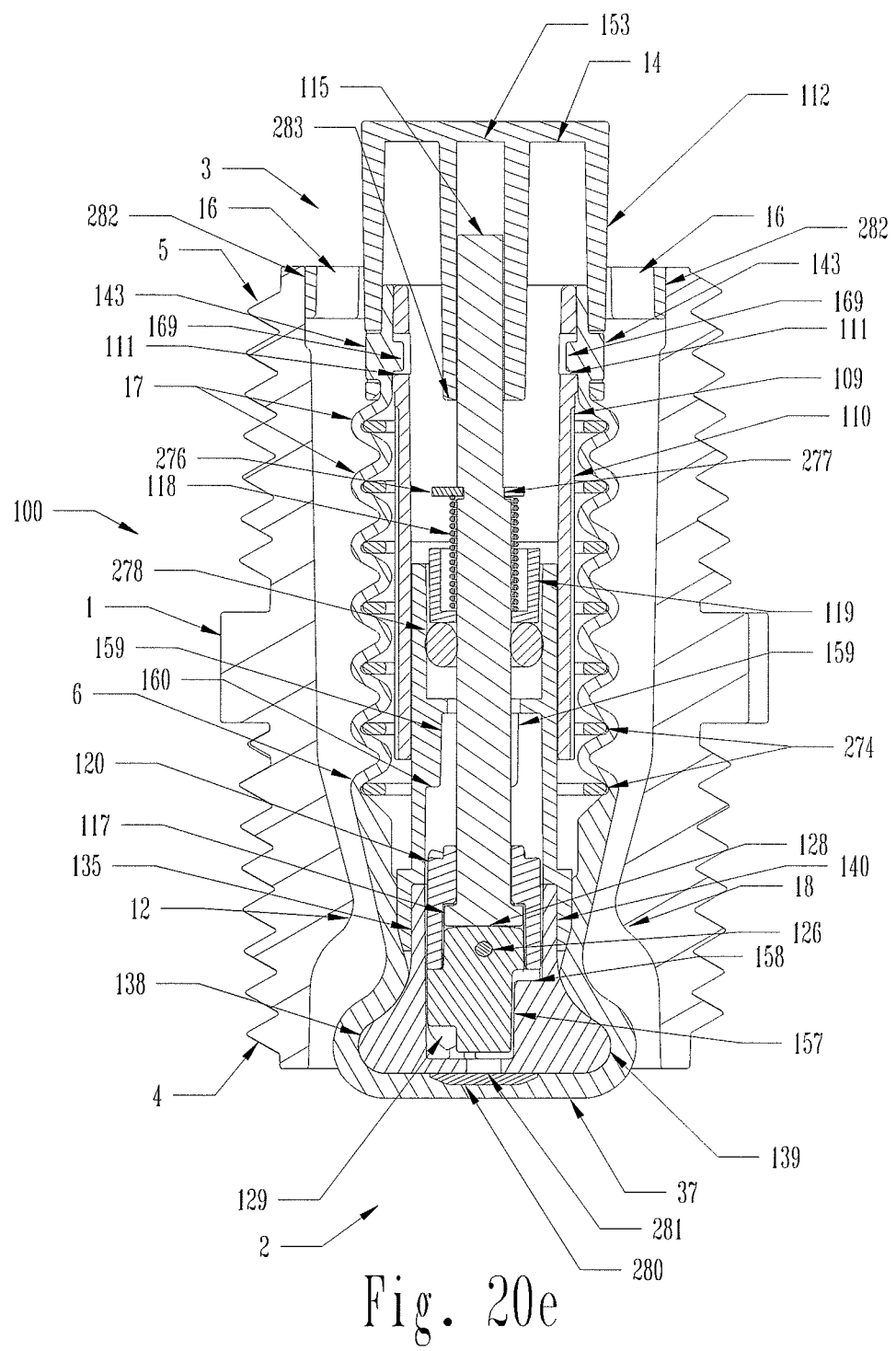
FIG. 20e: Is a section view as defined in FIG. 19 through the third alternate embodiment showing the sequencing mechanism details after a sudden reduction of external pressure from the second closed state.

Referring now to FIGS. 14, 20b and 20e improved resistance to fluctuations of the external pressure is achieved by allowing main pin 115 to slide freely in mounting cavity 153 during operation of valve 100. Specifically, during time period 304 to 305 on FIG. 14, when the external pressure suddenly drops, the third alternate embodiment allows the previously mentioned restoring forces resulting from the internal pressure and the collapsed undulations 17 to move the compressible valve 6 from the position shown in FIG. 20b to a position that provides for equilibrium of the axial forces acting upon compressible valve 6 (due to reduction of the internal pressure and relaxation of the undulations) as shown in FIG. 20e without affecting the restoring forces that are applied to main pin 115 and sequencing mechanism 20. In this improved design, the restoring force of the compression spring 118 is the only force ever applied to the main pin 115 urging the sequencing mechanism 20 to the free state ("A" or "C"). Therefore, the time period 304 to 305 is extended compared to the previously described second alternate embodiment considering the presence of viscous damping fluid 156.

Referring again to FIGS. 20b and 20e, the normal function of sequencing mechanism 20 and compression spring 118 with the main pin 115 slidably mounted in mounting cavity 153 is enabled by spring clip 276 and spring clip groove 277 in main pin 115. Spring clip 276 makes contact with the lower mount surface 283 limiting the movement of main pin 115 toward the output end 3 during periods of compression of valve 100. Spring clip also retains bias in compression spring 118 at all times urging the main pin 115 toward the free state ("A" or "C").

Referring now to FIGS. 20f and 20g, improved damping is provided by eliminating the ability of damping fluid 156 to migrate away from the sequencing mechanism 20 in the absence of gravitational forces. In the third alternate embodiment, pin insertion hole 136 and fluid drain hole 137 are eliminated from sequencing assembly housing 135. Instead, sequencing assembly housing 135 and sequencing assembly cap 139 form a closed fluid vessel with the inclusion of floating o-ring 278. In the third alternate embodiment, said closed fluid vessel is filled substantially with damping fluid 156 due to the exclusion of other fluids, including air, to the maximum extent possible as shown in FIG. 20f. This ensures that axial motion of main pin 115, upper sequencing member 120 and lower sequencing member 127 always requires displacement of damping fluid 156 thus providing the desired damping function. Because damping fluid, 156, is substantially incompressible, axial motion of main pin 115 into said closed fluid vessel due to operation of valve 100 displaces damping fluid away from the input end 2 of valve 100 and pushes floating o-ring 278 toward the output end 3 as shown in FIG. 20g. Floating o-ring 278 and spring seat 119 are slidably mounted in sequencing assembly housing 135 and are biased toward the input end 2 of valve 100 by compression spring 118. Therefore, when valve 100 returns to the free state as shown in FIG. 20f, floating o-ring 278 will slidably return to the original position shown in FIG. 20f. This o-ring 278 motion and compression spring 118 bias provides constant pressurization of the damping fluid 156 and improved resistance to cavitation (or formation of vacuum bubbles) further improving the damping effectiveness during operation of valve 100. The manufacture of the valve 100 assembly as described above is made possible by filling hole 281 and seal disk 280. During manufacture, the air is extracted from said closed fluid vessel formed by sequencing assembly housing 135 and sequencing assembly cap 139 and damping fluid 156 is injected through the same filling hole 281. Said closed fluid vessel is then sealed by fixedly attaching seal disk 280 over filling hole thus preventing pressurized damping fluid 156 from escaping during operation. It should be noted that in FIG. 20f, floating o-ring 278 is in contact with the upper elongate protrusions 159 such that compression spring 118 bias does not act upon floating o-ring 278, the damping fluid 156 pressure is zero and assembly of the seal disk 280 is possible.

Figure 21A:
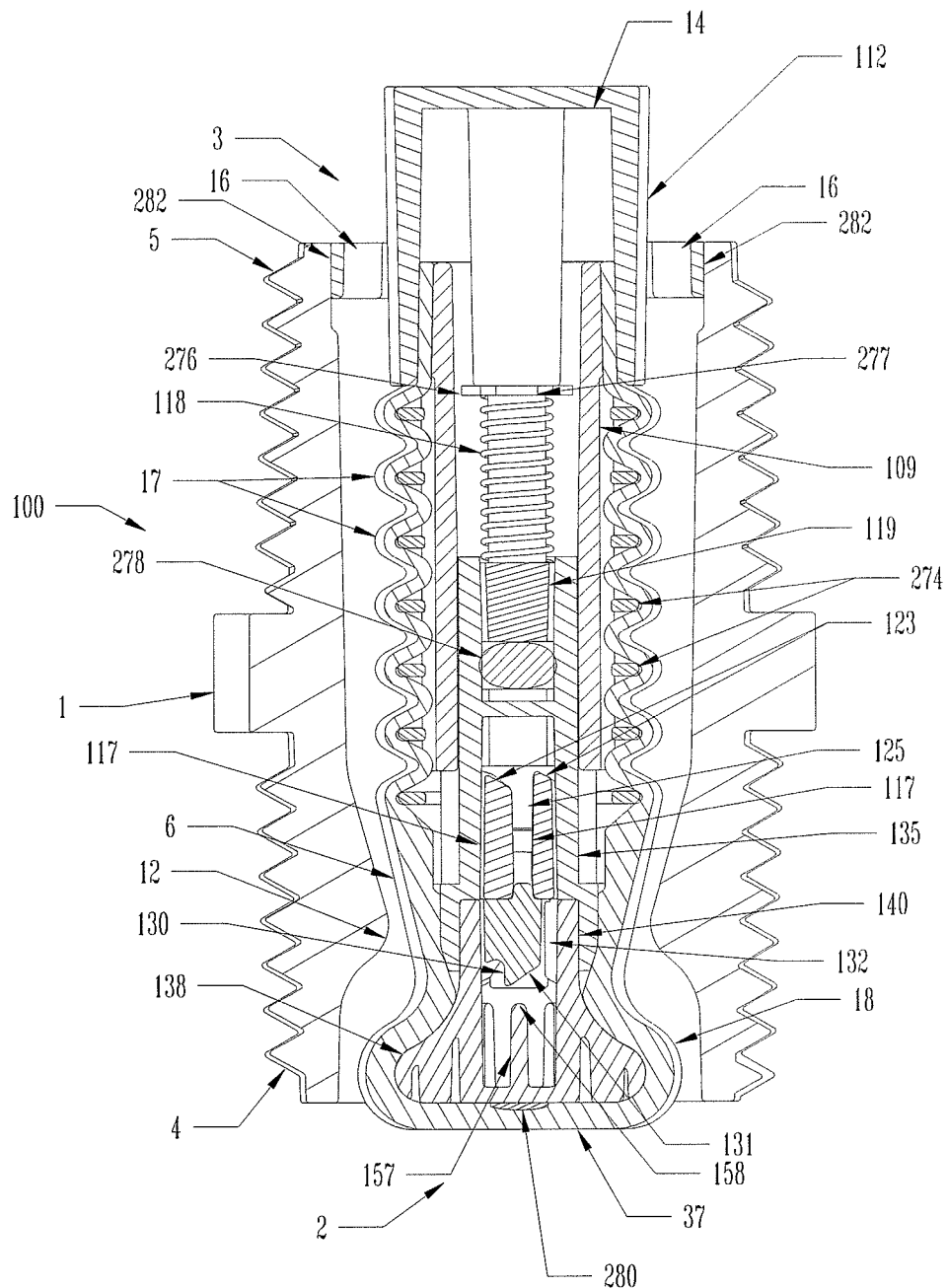
FIG. 21a: Is a section view as defined in FIG. 19 through the third alternate embodiment showing the lower elongate protrusion of the sequencing mechanism details in the first free state.
Figure 21B:
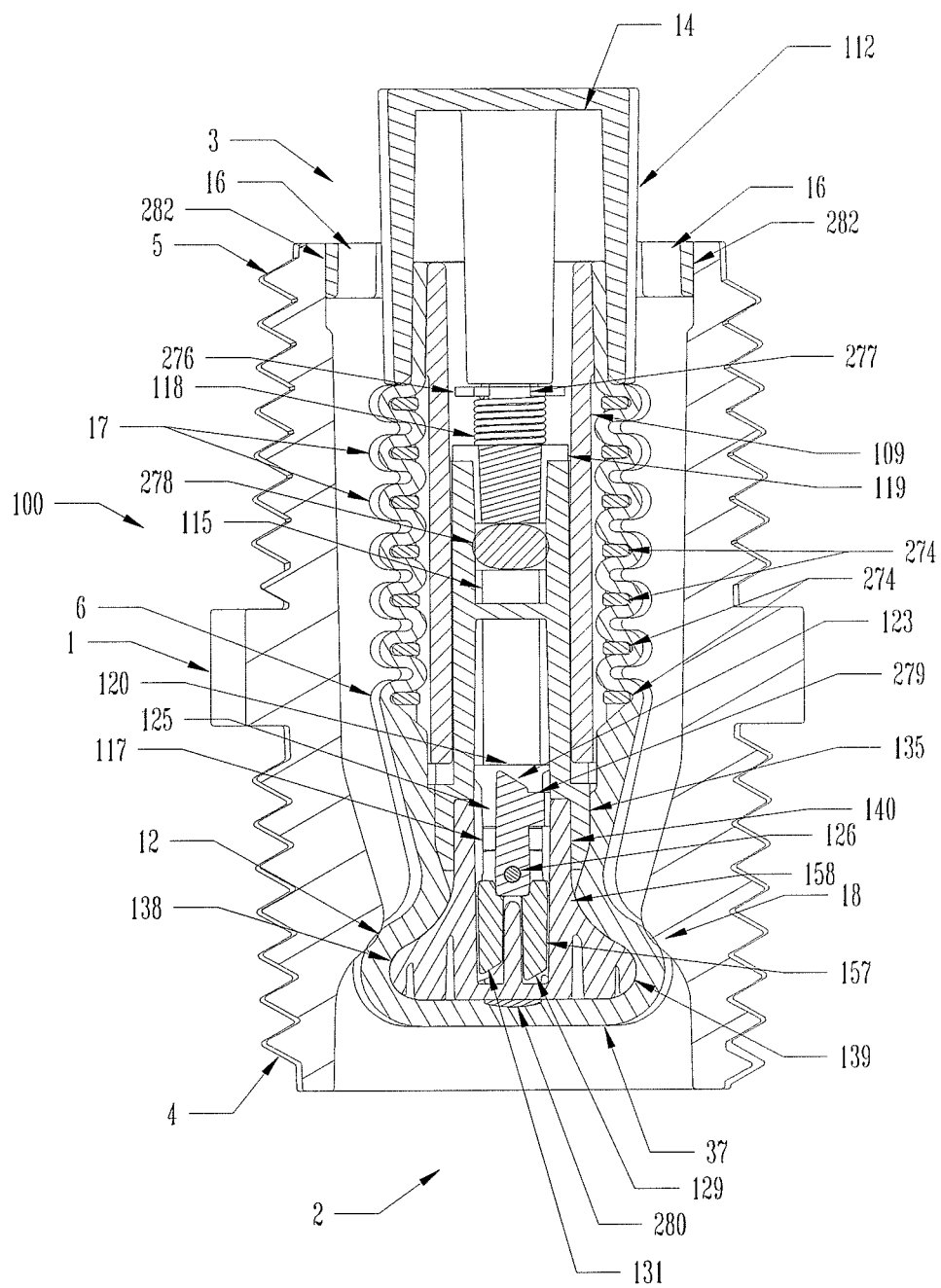
FIG. 21b: Is a section view as defined in FIG. 19 through the third alternate embodiment showing the lower elongate protrusion of the sequencing mechanism details in the second closed state.
Figure 21C:
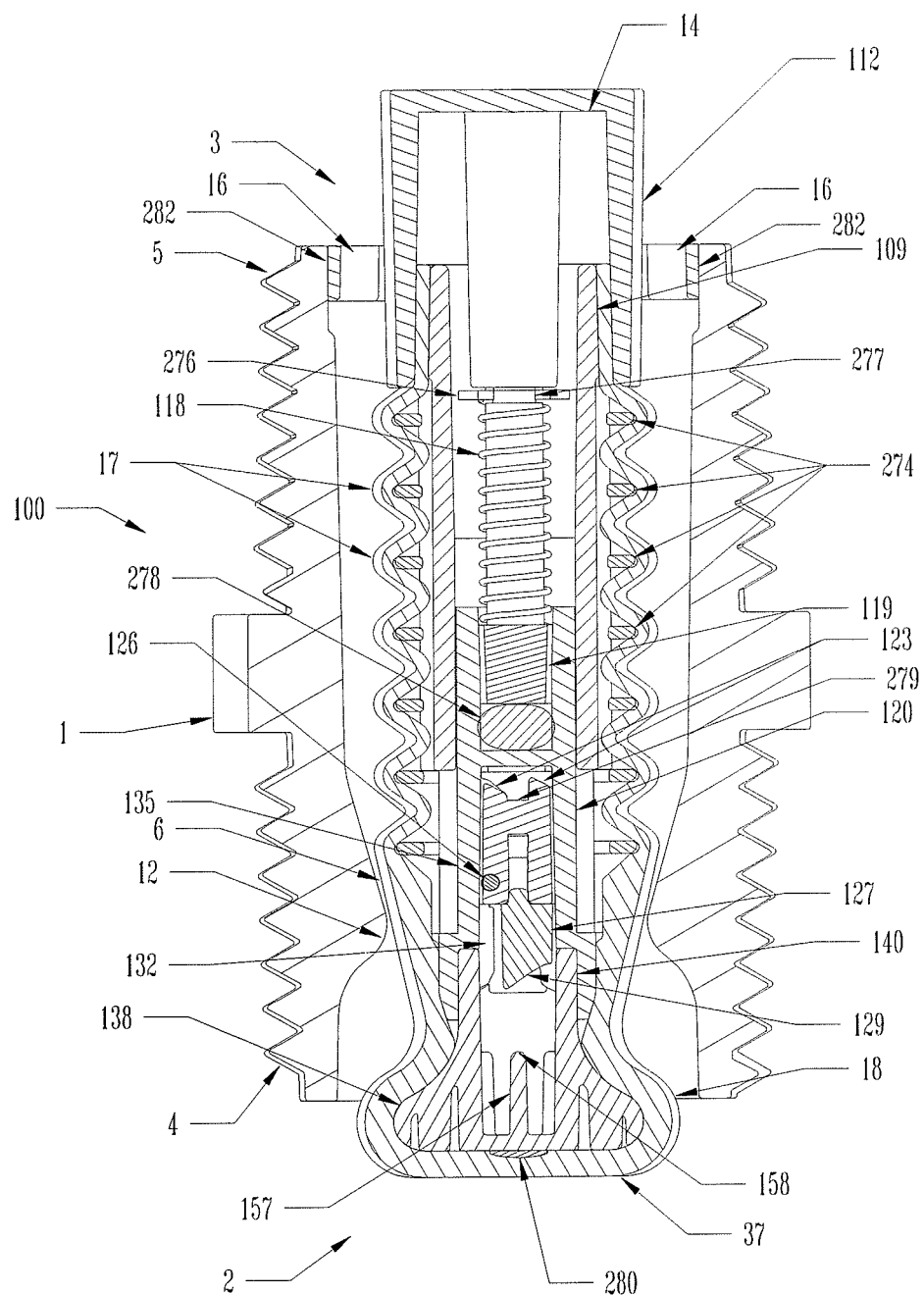
FIG. 21c: Is a section view as defined in FIG. 19 through the third alternate embodiment showing the lower elongate protrusion of the sequencing mechanism details in the third free state.
Figure 21D:
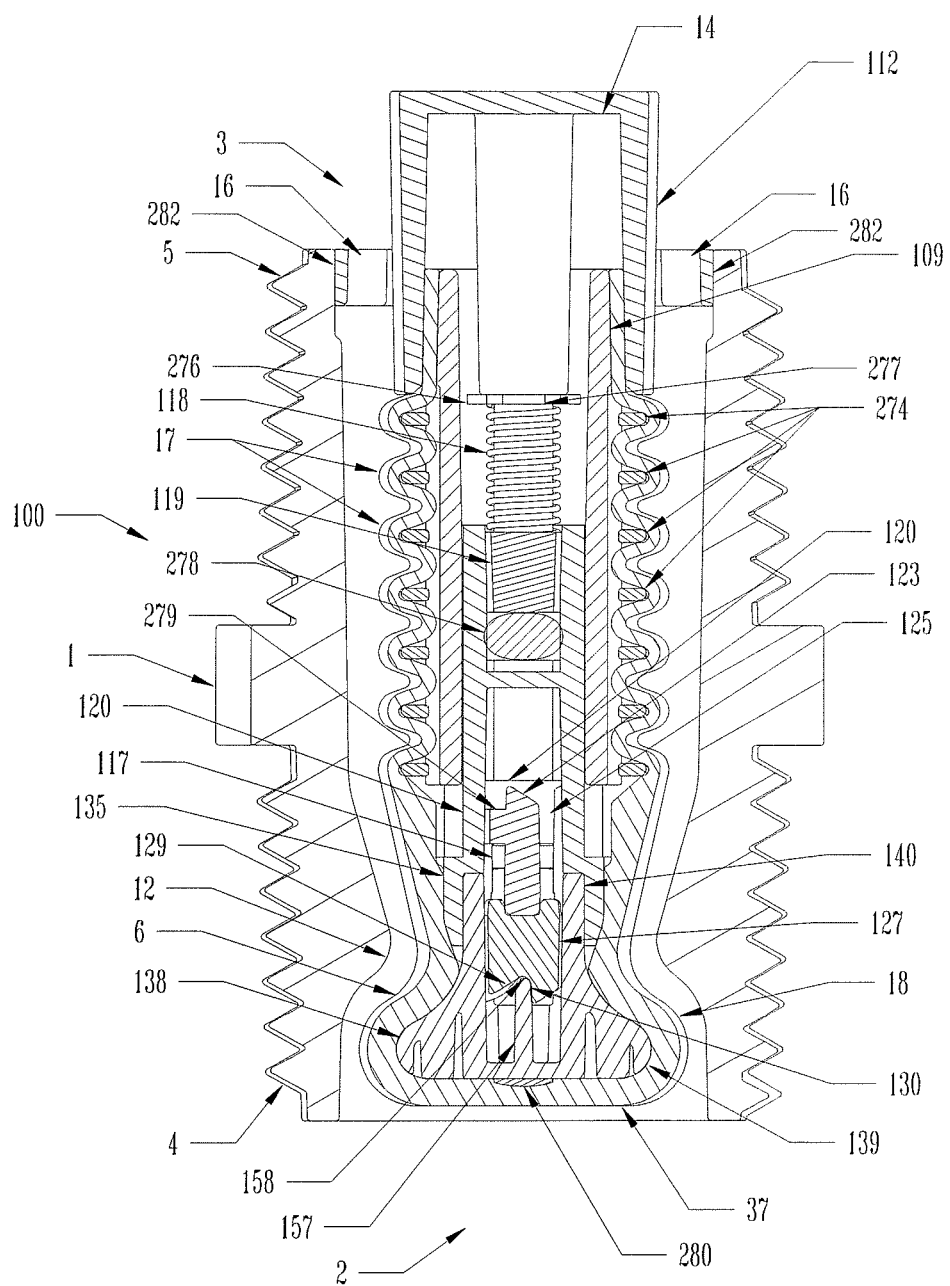
FIG. 21d: Is a section view as defined in FIG. 19 through the third alternate embodiment showing the lower elongate protrusion of the sequencing mechanism details in the fourth open state.
Figure 22A:
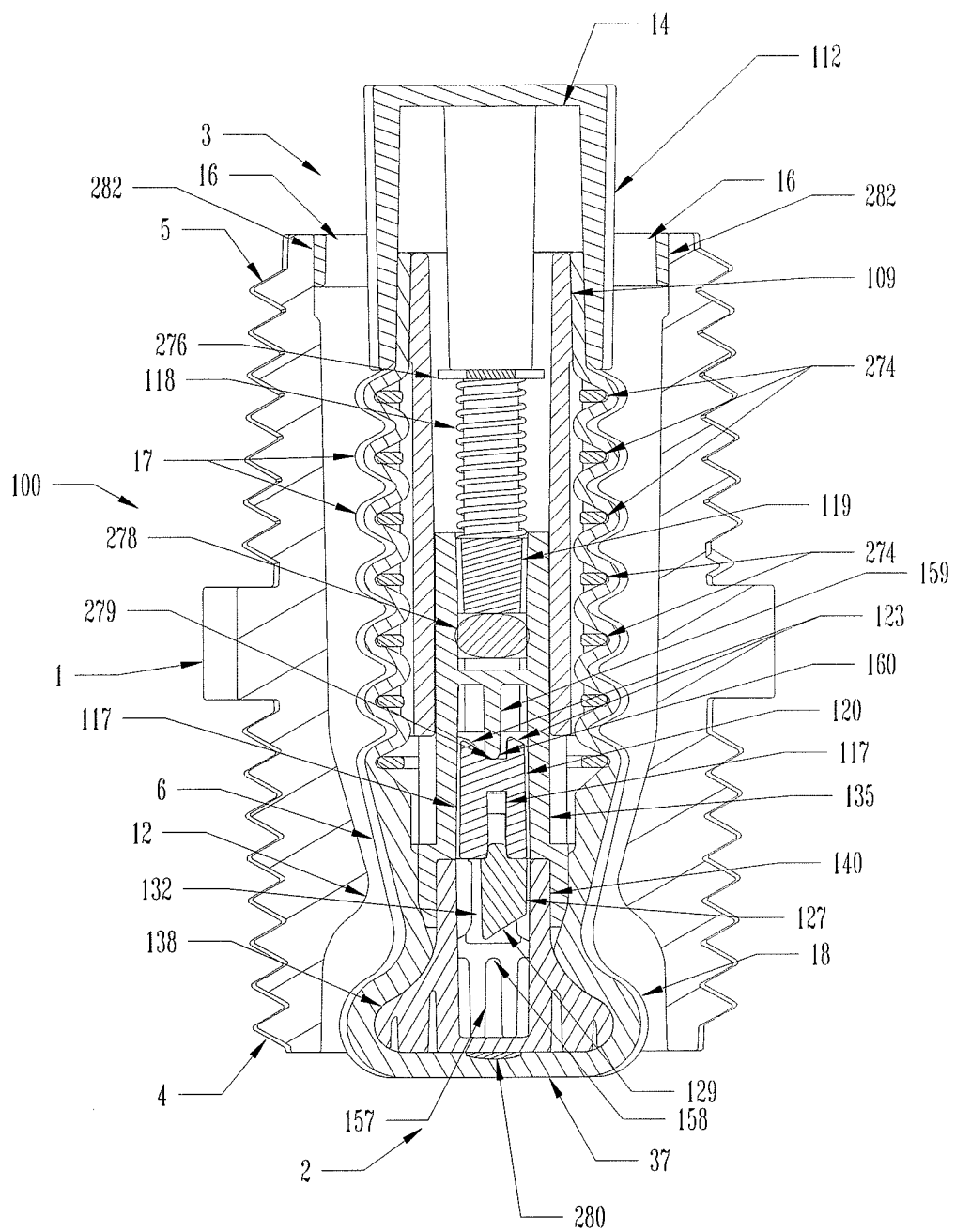
FIG. 22a: Is a section view as defined in FIG. 19 through the third alternate embodiment showing the upper elongate protrusion of the sequencing mechanism details in the first free state.
Figure 22B:
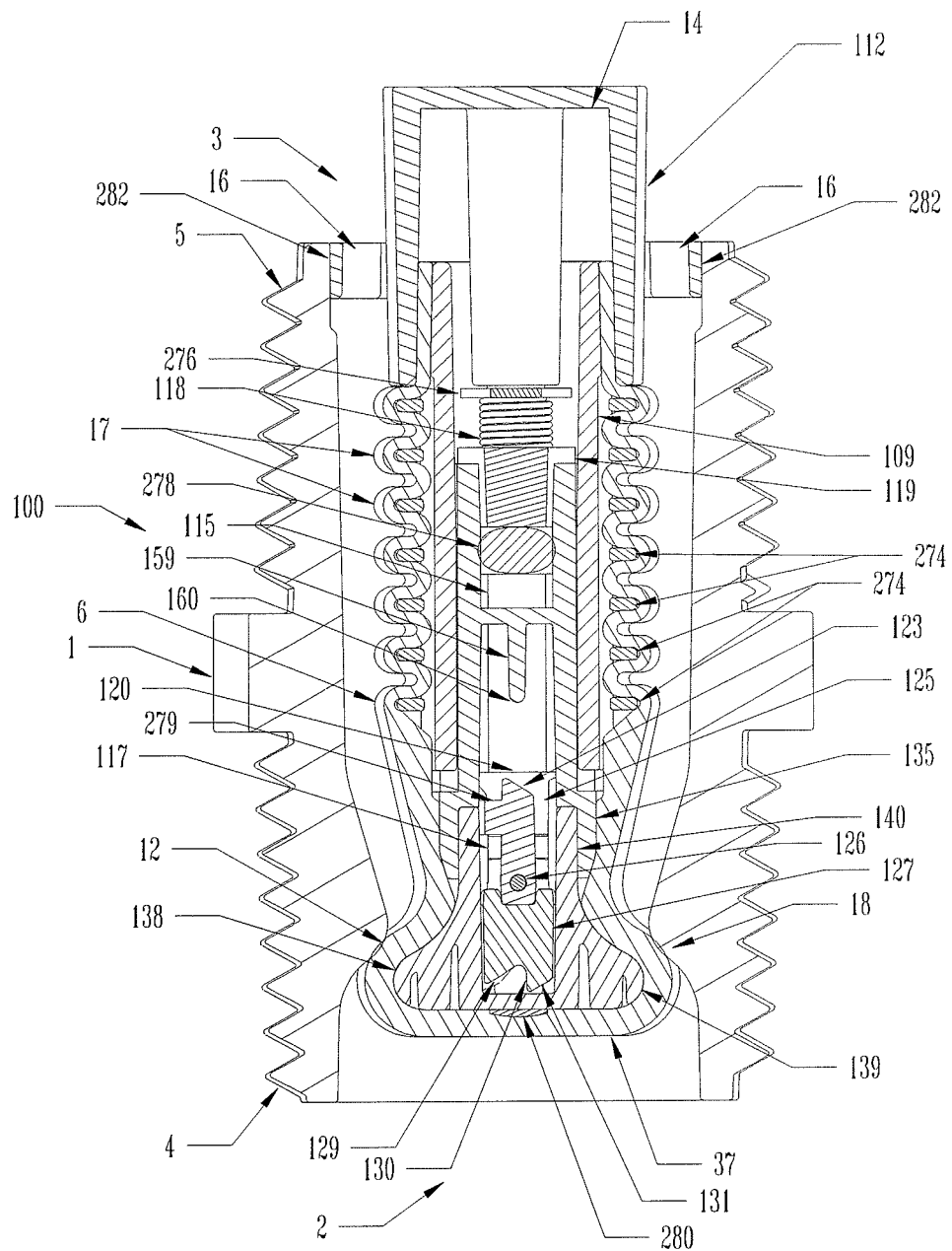
FIG. 22b: Is a section view as defined in FIG. 19 through the third alternate embodiment showing the upper elongate protrusion of the sequencing mechanism details in the second closed state.
Figure 22C:
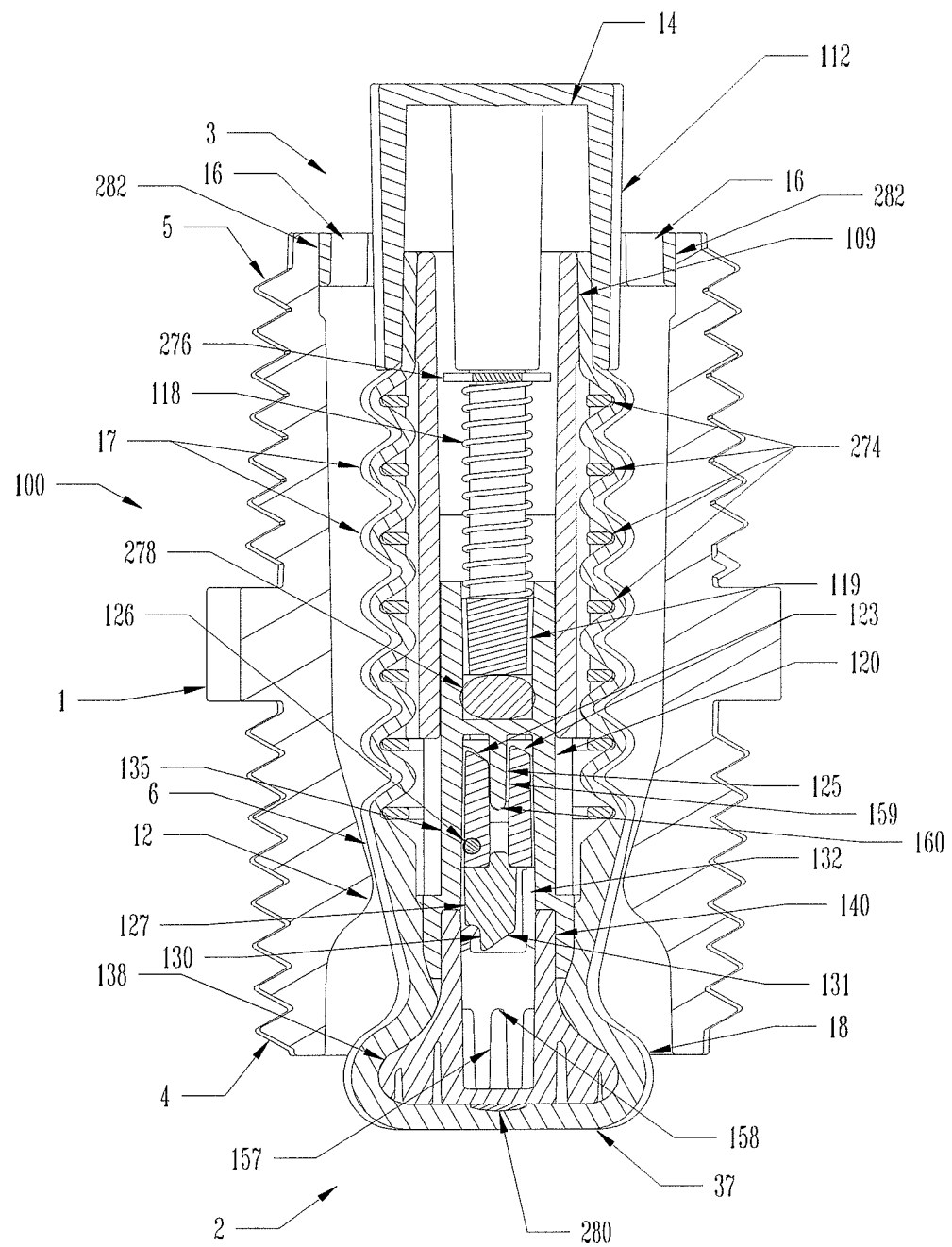
FIG. 22c: Is a section view as defined in FIG. 19 through the third alternate embodiment showing the upper elongate protrusion of the sequencing mechanism details in the third free state.
Figure 22D:
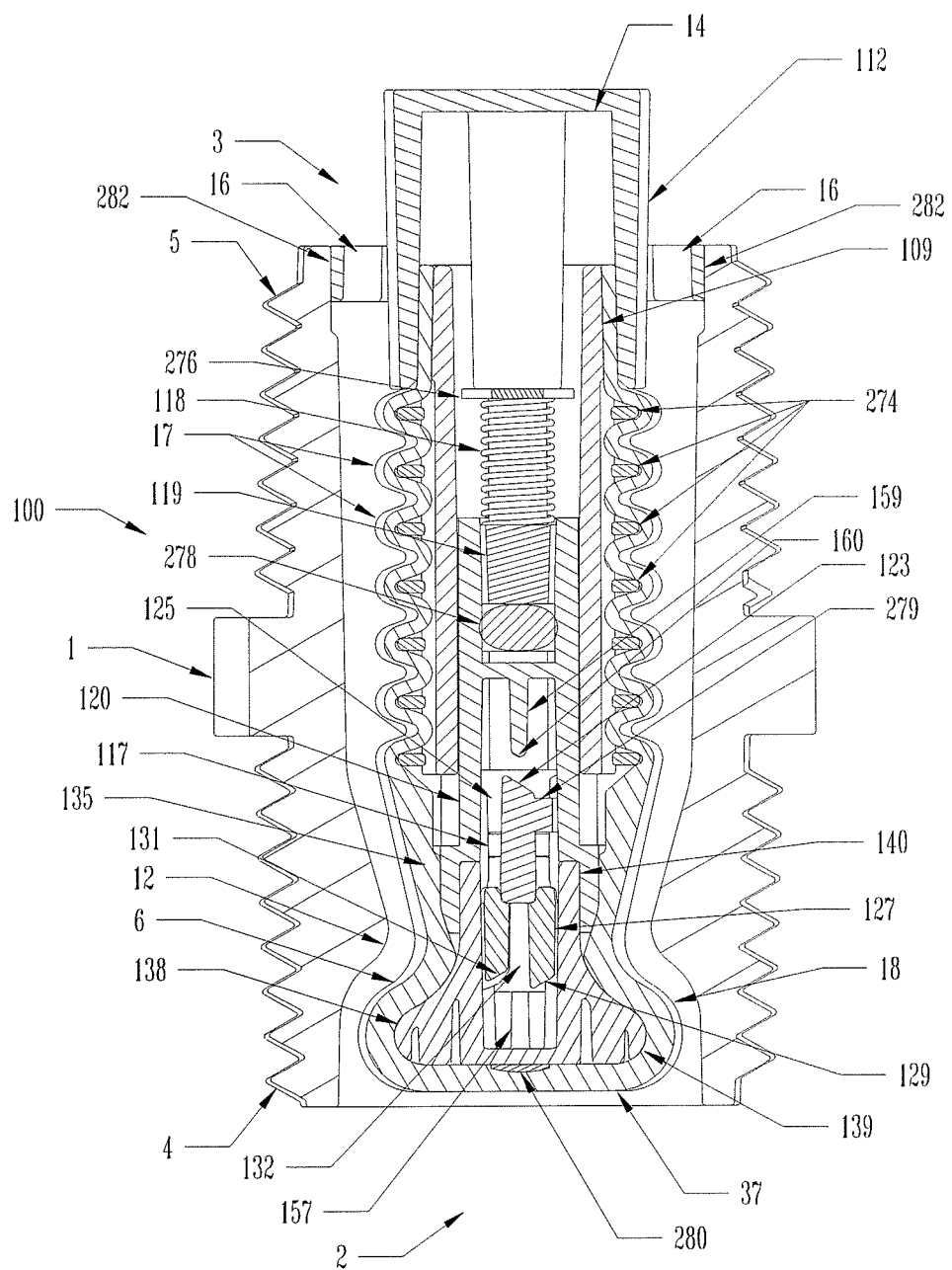
FIG. 22d: Is a section view as defined in FIG. 19 through the third alternate embodiment showing the upper elongate protrusion of the sequencing mechanism details in the fourth open state.
Figure 23:
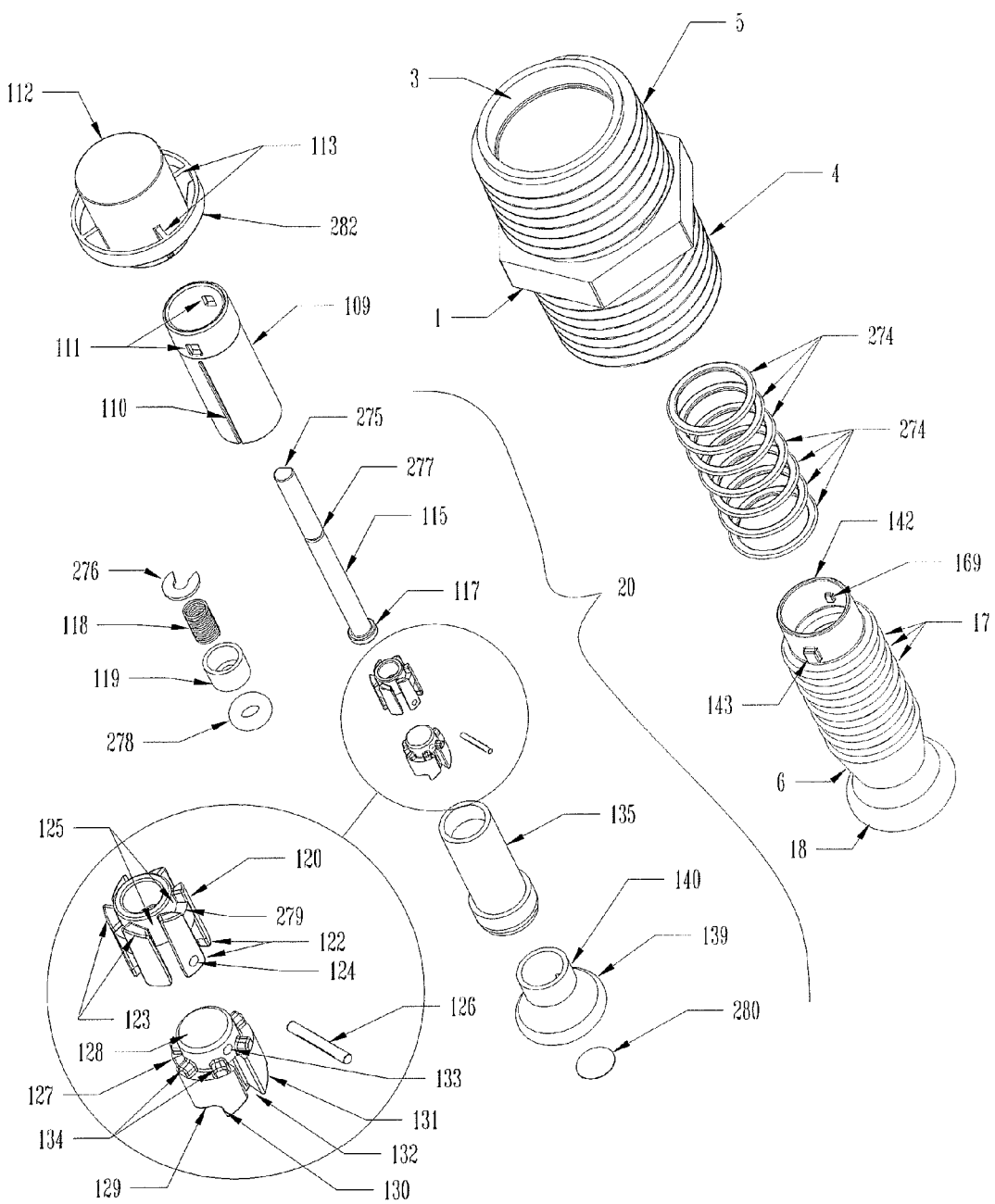
FIG. 23: Is an exploded view of the third alternate embodiment shown in FIGS. 18 through 22.

Referring now to FIG. 23, the third alternate embodiment includes an improved upper sequencing member 120 further comprising extension stop 279 in at least one of upper elongate slots 125. Said extension stop 279 restricts the motion of compressible valve 6 toward input end 2 when the valve 100 moves to the first free state ("A") as shown in FIGS. 20a, 21a, and 22a. Because extension stop 279 is not present in adjacent upper elongate slot 125, compressible valve 6 is allowed to move completely to the equilibrium position in the third free state ("C") as shown in FIGS. 20c, 21c and 22c. This difference in extension of compressible valve 6 between the first free state and the third free state allows the user to visually identify the instant state of valve 100 thus easing the process of segregating and setting the valves 100 prior to installation into the main supply conduit 102.

Another improvement of the third alternate embodiment allows for easier assembly of the sequencing mechanism 20. For the third alternate embodiment, lower elongate protrusions are relocated from the sequencing assembly housing 135 to the sequencing assembly cap 139 further comprising elongated cap tubular protrusion 140. This modification allows upper sequencing member 120, lower sequencing member 127, main pin 115 and sequencing assembly pin 126 to be assembled prior to installation into sequencing assembly housing 135 and eliminates the need for pin insertion hole 136. Said elongated tubular cap protrusion further provides improved surface area for adhesive bonding and sealing of sequencing assembly housing 135 to the sequencing assembly cap 139 thereby providing for said sealed fluid vessel.

The alternating switch means described above is commonly used in retractable ballpoint pens. As such, many alternate embodiments are well known to those skilled in the art. Similarly, many other alternate switching means have been developed for such devices as alternating electrical contact switches. Any alternating means can be applied to the present invention by those skilled in the art.

Most of the contemplated switching means can be configured for different patterns of alternation. For example, by modifying the configuration of the protrusions and sloped surfaces in the preferred embodiment, the valve can be designed to remain off for two successive pressure applications and open on the third pressure application. Thus rather than half the spray heads flowing per pressure application, only one third would flow. Therefore, more spray heads could be used on the same circuit while maintaining adequate pressure.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A fluid flow apparatus comprising:
a housing having an inlet end and an outlet end;
a flow control disposed within the housing;
a sequencing mechanism containing viscous fluid for dampening movement of the flow control, the sequencing mechanism configured to sequence the fluid flow apparatus from a current state to a different one of a plurality of states in response to removal and restoration of pressure at the inlet end, the plurality of states including:
a first state wherein the sequencing mechanism maintains the flow control in a substantially open position to allow fluid to flow through the apparatus between the inlet and outlet ends of the housing; and
a second state wherein the sequencing mechanism maintains the flow control in a substantially closed position to resist fluid flow between the inlet end and the outlet end of the valve housing;
wherein the flow control includes undulations configured to provide for expansion and contraction of the flow control in an axial direction, the sequencing mechanism being encircled by at least a portion of the undulations; and
wherein the flow control includes a plurality of support rings, each support ring of the plurality of support rings disposed in an undulation of the undulations to reduce the risk that external pressure will cause the undulations to collapse radially.

2. The fluid flow apparatus of claim 1, wherein movement of the flow control causes viscous fluid displacement within the sequencing mechanism such that the movement of the flow control is responsive to persistent external pressure changes and non-responsive to brief pressure variations.

3. The fluid flow apparatus of claim 1, wherein the flow control includes an inside surface defining a chamber and the sequencing mechanism is disposed within the chamber.

4. The fluid flow apparatus of claim 1, wherein the flow control includes a bulb configured to substantially seal to an inside surface of the housing in the closed state.

5. The fluid flow apparatus of claim 1, wherein the flow control forms a circumferential seal with an inside surface of the housing in the closed state.

6. The fluid flow apparatus of claim 1, wherein the flow control and an inside surface of the housing cooperate to form an annular fluid flow path in the open position.

7. The fluid flow apparatus of claim 6, wherein the annular fluid flow path is substantially aligned with an axis defined by the inlet and outlet of the housing and a fluid flow direction is aligned within 45 degrees of the axis at all points between the inlet and outlet.

8. The fluid flow apparatus of claim 6, wherein the annular fluid flow path has a substantially constant cross sectional area perpendicular to the fluid flow direction.

9. The fluid flow apparatus of claim 1, wherein the flow control is a compressible valve having a dual function including a first function whereby the valve (1) protects the sequencing mechanism from particulates and (2) opens and closes in response to cycled pressure at the inlet.

10. The fluid flow apparatus of claim 1, wherein the sequencing mechanism confines motion of the flow control to a linear axial motion relative to the housing.

11. The fluid flow apparatus of claim 1, wherein a motion of the flow control does not rely on a pressure differential applied between the inlet end and the outlet end of the housing.

12. The fluid flow apparatus of claim 1, wherein the sequencing mechanism further comprises at least one extension stop configured to restrict the motion of the flow control to provide a visual identification of the instant state of the valve.

13. The fluid flow apparatus of claim 1, wherein the sequencing mechanism sequences the fluid flow apparatus from a current state to a different one of the plurality of states in a predetermined pattern.

14. A fluid flow apparatus comprising:
a housing having an inlet end, an outlet end, and an inside surface;
a valve disposed within the housing;

a sequencing mechanism containing viscous fluid for dampening movement of the valve, the sequencing mechanism configured to sequence the fluid flow apparatus from a current state to a different one of a plurality of states in response to removal and restoration of pressure at the inlet end, the plurality of states including:

a first state wherein the sequencing mechanism maintains a spacing between the valve and the inside surface of the housing to allow fluid to flow through the apparatus between the inlet and outlet ends of the housing; and a second state wherein the sequencing mechanism substantially seals the valve to the inside surface of the housing to resist fluid flow between the inlet end and the outlet end of the valve housing wherein the outer valve surface includes undulations enabling the valve to expand and contract in an axial direction, the undulations encircling the sequencing mechanism; and wherein the outer valve surface includes a plurality of support rings, each support ring of the plurality of support rings being disposed in an undulation of the undulations to reduce the risk that external pressure will cause the undulations to collapse radially.

15. The fluid flow apparatus of claim 14, wherein the motion of the valve causes viscous fluid displacement within the sequencing mechanism such that the motion of said valve is responsive to persistent external pressure changes and non-responsive to brief pressure variations.

16. The fluid flow apparatus of claim 14, wherein the valve includes an inside surface defining a chamber and the sequencing mechanism is disposed within the chamber.

17. The fluid flow apparatus of claim 14, wherein the valve includes a bulb configured to substantially seal to the inside surface of the housing in the closed state.

18. The fluid flow apparatus of claim 14, wherein the valve forms a circumferential seal with the inside surface of the housing in the closed state.

19. The fluid flow apparatus of claim 14, wherein the valve and inside surface of the housing cooperate to form an annular fluid flow path in the open position.

20. The fluid flow apparatus of claim 19, wherein the annular fluid flow path is substantially aligned with an axis defined by the inlet and outlet and a fluid flow direction is aligned within 45 degrees of the axis at all points between the inlet and outlet.

21. The fluid flow apparatus of claim 19, wherein the annular fluid flow path has a substantially constant cross sectional area perpendicular to a fluid flow direction.

22. The fluid flow apparatus of claim 14, wherein the valve is a compressible valve having a dual function including a first function whereby the valve (1) protects the sequencing mechanism from particulates and (2) provides a valve sealing surface.

23. The fluid flow apparatus of claim 14, wherein the sequencing mechanism confines motion of the valve to a linear axial motion relative to the housing.

24. The fluid flow apparatus of claim 14, wherein a motion of the valve does not rely on a pressure differential applied between the inlet end and the outlet end of the housing.

25. The fluid flow apparatus of claim 14, wherein the sequencing mechanism further comprises at least one extension stop configured to restrict the motion of the valve to provide a visual identification of the instant state of the valve.

26. The fluid flow apparatus of claim 14, wherein the sequencing mechanism sequences the fluid flow apparatus from a current state to a different one of the plurality of states in a predetermined pattern.

27. A fluid flow apparatus comprising:

a housing having an inlet end, an outlet end, and an inside surface;

a valve having an outer valve surface and an inside surface defining a chamber;

a sequencing mechanism configured to sequence the fluid flow apparatus from a current state to a different one of a plurality of states in response to removal and restoration of pressure at the inlet end, the plurality of states including:

a first state wherein the sequencing mechanism maintains a spacing between the outer valve surface and the valve seat to allow fluid to flow through the apparatus; and a second state wherein the outer valve surface seals to the valve seat to resist fluid flow between the inlet end and the outlet end of the valve housing; and a sequencing control cooperatively attached to the sequencing mechanism and configured to alter the sequence of the valve to an alternative instant state;

wherein the outer valve surface includes a plurality of support ring, each support ring disposed adjacent an inner surface of an undulation of the undulations to reduce the risk that external pressure will cause the undulations to collapse radially.

28. The fluid flow apparatus of claim 27, wherein the outer valve surface includes a bulb that forms a circumferential seal with the valve seat in the second state.

29. The fluid flow apparatus of claim 27, wherein the outer valve surface includes undulations enabling the valve to expand and contract in an axial direction, the undulations encircling the sequencing mechanism.

30. The fluid flow apparatus of claim 27, wherein the valve comprises a single flexible member forming a closed vessel that defines the chamber and protects the sequencing mechanism, the sequencing mechanism being entirely positioned within the closed vessel.

31. The fluid flow apparatus of claim 27,
further comprising a mount connected to the housing; and
wherein the sequencing control is cooperatively attached to the sequencing mechanism via the mount.

32. The fluid flow apparatus of claim 27, wherein the sequencing mechanism sequences the fluid flow apparatus from a current state to a different one of the plurality of states in a predetermined pattern.

33. A fluid flow apparatus comprising:

a housing having an inlet end, an outlet end, and an inner surface;

a valve having an outer surface configured to:
cooperate with the housing inner surface to form an annular fluid flow path when the valve is in an open state; and
form a circumferential seal with the housing inner surface when the valve is in a closed state; and a sequencing mechanism containing viscous fluid for dampening movement of the valve, the sequencing mechanism configured to sequence the fluid flow apparatus from a current state to a different one of a plurality of states in response to removal and restoration of pressure at the inlet end wherein a lower end of the outer surface is configured to engage the housing inner surface when the valve is in a closed state;

wherein the sequencing mechanism is disposed between the lower end of the outer surface and the outlet end; and wherein the sequencing mechanism is positioned completely within the outer surface of the valve.

34. The fluid flow apparatus of claim 33, further comprising a sequencing control cooperatively attached to the sequencing mechanism and configured to alter the sequence of the valve to one of the plurality of states.

35. The fluid flow apparatus of claim 33, wherein the housing and valve cooperate in the open state such that the annular fluid flow path does not require a fluid flow direction to substantially change from inlet to outlet.

* * * * *